United States Patent [19]

Callon

[11] Patent Number: 5,430,727
[45] Date of Patent: Jul. 4, 1995

[54] MULTIPLE PROTOCOL ROUTING

[75] Inventor: Ross W. Callon, Bedford, Mass.

[73] Assignee: Digital Equipment Corporation, Maynard, Mass.

[21] Appl. No.: 245,856

[22] Filed: May 19, 1994

Related U.S. Application Data

[60] Continuation of Ser. No. 59,641, May 10, 1993, abandoned, which is a division of Ser. No. 577,437, Sep. 4, 1990, Pat. No. 5,251,205.

[51] Int. Cl.[6] ........................................... H04L 12/46
[52] U.S. Cl. .................................. 370/85.13; 370/94.1
[58] Field of Search .................... 370/85.13, 85.14, 54, 370/94.1

[56] References Cited

U.S. PATENT DOCUMENTS

| | | | |
|---|---|---|---|
| Re. 31,182 | 3/1983 | Crager et al. | 340/825.5 |
| 4,271,507 | 6/1981 | Gable et al. | 370/94.1 |
| 4,316,283 | 2/1982 | Ulug | 370/94.1 |
| 4,577,314 | 3/1986 | Chu et al. | 370/60 |
| 4,706,081 | 11/1987 | Hart et al. | 370/61 |
| 4,755,992 | 7/1988 | Albal | 370/94.1 |
| 4,760,395 | 7/1988 | Katzeff et al. | 340/825.03 |
| 4,766,591 | 8/1988 | Huang | 370/60 |
| 4,768,190 | 8/1988 | Giancario | 370/85.15 |
| 4,831,620 | 5/1989 | Conway et al. | 340/825.05 |
| 4,893,307 | 1/1990 | McKay et al. | 370/94.1 |
| 4,897,841 | 1/1990 | Gang, Jr. | 370/85.13 |
| 4,901,312 | 2/1990 | Hui et al. | 370/85.14 |
| 5,018,133 | 5/1991 | Tsukakoshi et al. | 370/85.13 |
| 5,031,174 | 7/1991 | Natsume | 370/85.14 |

OTHER PUBLICATIONS

"Information Processing Systems—Open Systems Interconnection—Basic Reference Model", International Standard, ISO 7498-1984 (E), pp. 1-39.
"IAB Official Protocol Standards", Internet Activities Board, Apr. 1989, pp. 1-14.
"Transmission Control Protocol", Darpa Internet Program, Protocol Specification, edited by Jon Postel, Sep., 1981, pp. i-iii, 1-85.
"Requirements for Internet Hosts—Communication Layers", Internet Engineering Task Force, edited by R. Braden, Oct., 1989, pp. 1-116.
"Requirements for Internet Hosts—Application and Support", Internet Engineering Task Force, edited by R. Braden, Oct., 1989, pp. 1-98.
Braden, R. and J. Postel, "Requirements for Internet Gateways", RFC 1009, Jun. 1987.
Callon et al., "Routing in Internetwork Environment", pp. 4-9.
Djikstra, E. W., "A Note on Two Problems in Connexion with Graphs", *Numerische Matematki*, pp. 269-271, 1959.

(List continued on next page.)

*Primary Examiner*—Douglas W. Olms
*Assistant Examiner*—Min Jung
*Attorney, Agent, or Firm*—Fish & Richardson

[57] ABSTRACT

A method for connecting a network so that TCP/IP and OSI 8473 packets may be routed in the same domain. The independence of the addresses is maintained: one device in the network may be assigned only a TCP/IP address, and another device may be assigned only a ISO 8473 address. Furthermore, all of the routers share link state information by using a common link state packet format (such as the ISO 10589 format); thus routes through the network may be computed without regard for the protocols supported by the routers along the route. Where necessary, packets are encapsulated and forwarded through routers which are not capable in the protocol of the packet. In some disclosed embodiments, all of the routers in a given area support a given protocol (or, in fact, have identical capabilities, in which case encapsulation is not required). In these embodiments, the encapsulation is performed by suitable modifications to each router's packet forwarding procedures. In other disclosed embodiments, these topological restrictions are removed, and the network is expanded to support additional protocols. In these embodiments, the Dijkstra algorithm is also modified to generate information on how to encapsulate and forward packets through the network.

8 Claims, 20 Drawing Sheets

OTHER PUBLICATIONS

Hendrick, C. L. and L. Boasack, "An Introduction to IGRP", Jul. 26, 1989.

McQuillan, John, et al., "The New Routing Algorithm for the ARPANET", *IEEE, vol. Com-28, No. 5, May 1980.*

Moy, J., "The OSPF Specification", *RFC 1131,* Oct. 1989.

Postel, J., "Internet Control Message Protocol", DARPA Internet, Program Protocol Specification, *RFC 792,* Sep. 1981.

Shoch et al., "Mutual Encapsulation of Internetwork Protocols", IEN 140, Apr. 1980.

"Protocol for Providing the Connectionless-Mode Network Service", ISO 8473, Mar. 1987.

"Intermediate System to Intermediate System Intra-Domain Routing Exchange Protocol for Use in Conjunction with the Protocol for Providing the Connectionless-Mode Network Service", ISO 10589, Oct. 15, 1989.

"Information Processing Systems-Telecommunications and Information Exchange between Systems-End System to Intermediate System Routing Exchange Protocol for Use in Conjunction . . . ", *ISO* 9542, Mar. 26, 1988.

"Internet Protocol", DARPA Internet Program, Protocol Specification, RFC 791, Sep. 1981.

MULTIPLE PROTOCOL ROUTING

This is a continuation of application Ser. No. 08/059,641, filed May 10, 1993, now abandoned, which was a divisional of Ser. No. 07/577,437, filed Sep. 4, 1990, now issued as U.S. Pat. No. 5,251,205.

BACKGROUND OF THE INVENTION

This invention relates to routing algorithms which support multiple protocols.

The end systems (e.g., computers or printers) which form a computer network are interconnected by devices known as routers. Each end system is attached to one of the network's routers and each router is responsible for forwarding communications to and from its attached end systems.

The routers transfer information to and from the end systems and among themselves along communications links in formatted packets. For example, when an originating end system wishes to transmit information to a destination end system, it generates a packet header in an appropriate format (this header includes, among other information, the address of the destination end system), and then fills the remainder of the packet with the information to be transmitted. (In the following description, the term "user data packet" will refer to the entire packet, i.e. the formatted header and the information that is to be transmitted from end system to end system.) The completed user data packet is then provided to the router attached to (and responsible for) the originating end system, which forwards it toward the destination end system. Packets transmitted among the routers themselves (which will be referred to as "control packets") are similarly formatted and forwarded.

When a router receives a user data packet, it reads the user data packet's destination address from the user data packet header, and then transmits the user data packet on the link leading most directly to the user data packet's destination. Along the path from source to destination, a user data packet may be transmitted along several links and pass through several routers, each router on the path reading the user data packet header and forwarding the user data packet accordingly.

To determine how user data packets should be forwarded, each router typically knows the locations of the network's end systems (i.e., which routers are responsible for which end systems), the nature of the connections between the routers, and the states (e.g., operative or inoperative) of the links forming those connections. Using this information, each router can compute effective routes through the network and avoid, for example, faulty links or routers. A procedure for performing these tasks is generally known as a "routing algorithm".

In popular routing algorithms such as that described in "The New Routing Algorithm for the ARPANET" by McQuillan et al., *IEEE Transactions on Communications*, May, 1980, each router determines which end systems are attached to it, what links to other routers are available, the states of those links, and the identities of the routers on the other ends of those links. To initialize the network, each router places this information in a control packet known as a Link State packet (LSP), and transmits this LSP to all of the other routers in the network (i.e., "advertises" its neighbors and end systems to the network). Later, when changes in the network occur (e.g., a link fails), one or more routers may generate new LSPs which supersede previously generated LSPs.

As long as the most recent LSPs are propagated reliably to all of the routers, each router will have complete information about the topology of the network and can generate a routing database describing routes through the network (for example, using the algorithm described in "A Note on Two Problems in Connexion with Graphs" by Edsgar Dijkstra, *Numerische Mathematik*, Vol. 1, 1959, pages 269–271).

In order for user data packets to be delivered to their destinations, each end system on the network must have an unambiguous address. There are several independent standards organizations which document and promulgate address allocation schemes, as well as control and user data packet formats which may be used for communicating under these schemes. Several networks of routers have been configured according to these addressing schemes and formats.

In what follows, the term "routing protocol" will be used to describe the combination of an address allocation scheme and a format (or a group of related formats) that describes control packets and other information to be exchanged among routers, and which is used to calculate the paths which the user data packets will take between routers. Routing protocols are often associated with their own routing algorithms, each routing algorithm being documented and promulgated by the standards organization responsible for the associated routing protocol.

Further, the term "protocol suite" will be used to describe the comprehensive set of protocols that is designed to work together to coherently provide complete communication capabilities. Two examples of protocol suites are the TCP/IP protocol suite and the OSI protocol suite. Each of these protocol suites includes one or more network layer protocols which define the format used for control and user data packets that are to be transferred by the network routers. For example, the IP protocol of the TCP/IP protocol suite defines the network layer protocol which makes up the format of the user data packets that are forwarded by the IP routers. Similarly, the OSI routers forward user data packets following the ISO 8473 network layer protocol.

The Transmission Control Protocol (TCP) RFC 793, Internetwork Protocol (IP) RFC 791, the Internet Control Message Protocol RFC 792, and the TCP/IP protocol suite which is described in RFC 1122, "Requirements for Internet Hosts—Communication Layers," RFC 1123, "Requirements for Internet Hosts Application and Support," RFC 1100, "IAB Official Protocol Standards," and RFC 1009, "Requirements for Internet Gateways," and associated other RFCs, all available from SRI International, DDN Network Information Center, Room EJ291, 333 Ravenswood Avenue, Menlo Park, Calif. 94025, have recently been growing in importance as a multi-vendor communications architecture, and many networks are based on them. (TCP/IP terminology refers to routers as "gateways", and end systems as "hosts".) At the same time, however, existing networks also use the Open Systems Interconnection (OSI) protocols such as described in International Organization for Standardization (ISO) 7498, "Information Processing Systems—Open Systems Interconnection—Basic Reference Model, " ISO 8473, "Protocol for Providing the Connectionless-mode Network Service," ISO 9542, "End System to Intermediate System Routing Exchange Protocol," and ISO DP 10589 "Intermediate System to Intermediate System Intradomain Routing Exchange Protocol," all available from BSi Standards, 2 Park Street, London England, W1A 2BS, and more are expected to be created as OSI is further developed.

Because the several existing protocols (in particular TCP/IP and OSI) have been developed independently, they are largely incompatible.

Networks having incompatible protocols cannot make their links and routers available to each other, which may result in excess redundancy and reduced efficiency. Also, each of the networks must be maintained independently, increasing the total management effort over what would be required by a single, universally compatible network.

One known way to share routing resources among networks having incompatible protocols is known as gateway encapsulation. In gateway encapsulation, a network using protocol A is provided with a path through a second network that uses protocol B. To form the path, two routers are manually configured to provide gateways from protocol A to protocol B, and back.

Each gateway router is configured to be fluent in both protocol A and protocol B. When a user data packet formatted in protocol A is received at a gateway router, the gateway router "encapsulates" the user data packet in a protocol B header (i.e., generates a protocol B header and places the protocol A user data packet, including the protocol A header, into the data area of the protocol B user data packet). The encapsulated protocol A user data packet is then addressed to the second gateway router, and transmitted through the protocol B network.

When the encapsulated protocol A user data packet is received at the second gateway router, the protocol B encapsulation header is removed, and the protocol A user data packet is forwarded to its destination through the protocol A network.

The routing algorithm used in the protocol A network is suitably modified to make the protocol A routers aware of the gateway, so that user data packets destined to routers at the other end of the gateway are forwarded to one of the gateway routers.

One disadvantage of gateway encapsulation is that the gateway must be manually configured, and thus must also be manually maintained. If a change to the gateway path is desired, or if an additional gateway path is added, the gateway routers must be manually adjusted to effect the desired changes. Furthermore, the gateway path is only available to the protocol A network as long as the gateway routers themselves are operational. If a gateway router fails, the pre-established path through the protocol B network is severed, and communications must be re-routed through the protocol A network.

Another way to route multiple incompatible protocols is known as "ships in the night" (SIN). In the SIN approach, the same physical resources (e.g., routers and links) are used to route completely separate protocols. The shared resources multiplex between the supported protocols, and the protocols themselves operate more or less independently.

With SIN, there is some degree of competition for resources, because implementing two protocols requires additional programming time as well as additional CPU and memory resources in the routers. Furthermore, SIN requires that two complete sets of control packets be distributed through the two independent networks, which doubles the control traffic overhead over that of a single integrated network. Finally, configuring and managing multiple independent networks is less efficient than configuring and managing a single integrated network of the same total size: multiple networks must be configured independently, increasing overhead; and multiple networks cannot be managed as efficiently as a single network because the implicit interactions between the networks (such as the shared loads placed on routers and links) cannot be well characterized and controlled.

SUMMARY OF THE INVENTION

In one aspect, the invention features a method of calculating routes for sending user data packets through an interconnected network of information handling devices. Each of the user data packets includes destination address information conforming to an addressing convention of any one of two or more different independent protocol suites. The routes for user data packets are always calculated using a single route calculation algorithm corresponding to the same routing protocol (which is chosen from an arbitrary protocol suite) regardless of the addressing convention to which the user data packet conforms. This calculation does not involve converting the destination information from one addressing convention to another.

Preferred embodiments of this aspect include the following features.

There are exactly two protocol suites.

Link state packets conforming to the routing protocol used to compute routes are sent to the information handling devices, and routes are calculated based on information contained in the link state packets.

The OSI IS—IS routing protocol is used to compute routes.

In another aspect, the invention features a method for calculating routes for sending user data packets via information handling devices which are interconnected in a communications network. The information handling devices include (a) single-protocol information handling devices capable of recognizing and forwarding only user data packets which conform to a single protocol suite, and (b) multi-protocol information handling devices capable of recognizing and forwarding user data packets which conform to any one of two or more protocol suites. A routing protocol is used to automatically predetermine at which information handling devices to encapsulate and to decapsulate a given packet.

Preferred embodiments of this aspect include the following features.

The information handling devices are organized in areas and all of the information handling devices within a single area are at least capable of recognizing and forwarding user data packets which conform to the same one of the protocol suites. This common protocol suite may be different for different areas.

A given area may include (a) single-protocol information handling devices capable of recognizing and forwarding only user data packets which conform to a first protocol suite, (b) single-protocol information handling devices capable of recognizing and forwarding only user data packets which conform to a second different protocol suite, and (c) at least one multi-protocol information handling device capable of recognizing and forwarding user data packets which conform to the first and second protocol suite (and/or every other protocol suite that is used by any other information handling device in the area).

There are exactly two protocol suites, one which is the TCP/IP protocol suite and another which is the OSI protocol suite.

Link state packets conforming to the routing protocol used to compute routes are sent to the information handling devices, and routes are calculated based on information contained in the link state packets.

The OSI IS—IS routing protocol is used to compute routes and determine at which information handling devices to encapsulate and to decapsulate.

In another aspect, the invention features a method of enabling user data packets to be forwarded from one local area network to another by a device which is capable of acting as a router to recognize and forward user data packets which conform to a first protocol suite and is capable of acting as a bridge to recognize and forward user data packets which conform to at least a second protocol suite. For a user data packet which conforms to the first protocol suite and is addressed to a single address which is not an address of the device, the devices acts as a bridge rather than as a router.

Other features and advantages of the invention will be apparent from the following description of the preferred embodiments and from the claims.

DESCRIPTION OF THE PREFERRED EMBODIMENTS

We first briefly describe the drawings.

GENERAL DESCRIPTION

Figure 1A:
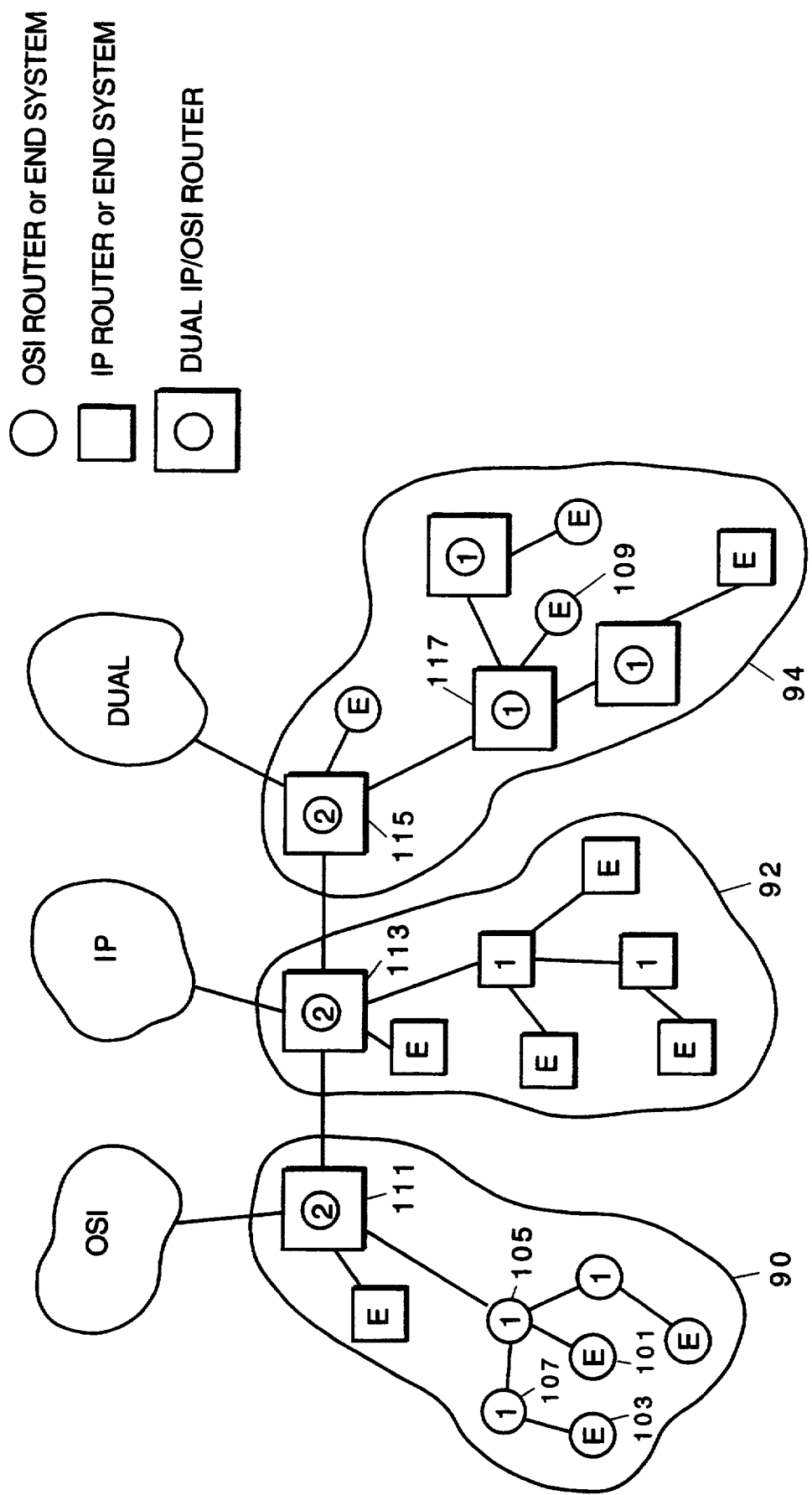
FIG. 1A is a diagram of a dual-protocol network segregated on a per-area basis which does not require encapsulation.

Before discussing the invention, it will be useful to define some terminology.

A router that is fluent in only one of the protocols supported by the multi-protocol network will be generally referred to as a "single-protocol" router. Where necessary, the protocol supported by a single-protocol router may be indicated by explicit reference to the protocol. For example, a single-protocol router which is fluent in only protocol P1 may be referred to as a "P1-only" router.

Routers that are fluent in more than one of the supported protocols interconnect the dissimilar single-protocol routers. A router that is fluent in more than one of the supported protocols will be generally referred to as a "multi-protocol" router. Routers that are fluent in two protocols will be referred to as "dual-protocol" routers; routers that are fluent in three protocols will be referred to as "three-protocol" routers, and so on. Multi-protocol routers that are fluent in all of the protocols supported by a given network will be referred to as "all-protocol" routers. (Note that where only two protocols are supported, the terms multi-protocol, dual-protocol, and all-protocol are synonymous; however, this synonymity does not apply when more than two protocols are supported.)

There are two types of multi-protocol routers. A "simple multi-protocol router" will route user data packets conforming to two or more protocols. However, a simple multi-protocol router is only able to forward the user data packets; it is not able to perform encapsulation or decapsulation to make user data packets in one protocol compatible with another protocol. An "enhanced multi-protocol router" will not only route user data packets conforming to two or more protocols, but is also able to perform encapsulation or decapsulation to make user data packets in one protocol compatible with another protocol. The extent to which enhanced multi-protocol routers may or may not support complex combinations of the other three types of routers is described in detail below.

Note that there is a distinction between the capabilities of a particular router, and its operation at any one time. For example, a router may be a multi-protocol router, but may be configured to operate as a single-protocol router. This would allow it to interoperate with other single-protocol routers in a network which only supports one protocol. The term P1-capable will be used to refer to any router which is able to forward user data packets formatted (and addressed) in accordance with protocol P1. Thus the set of P1-capable routers includes P1-only routers and any multi-protocol routers which include P1 among the set of protocols that they are capable of handling.

Also, note that an end system that communicates with routers and other end systems in accordance with a given protocol can only be connected to a router that is capable in that protocol. For example, an end system designed to communicate in protocol P1 can only connect to routers that are P1-capable. This has implications on the network architectures, as will be seen more fully below.

In one particular embodiment, the invention is applied to a dual-protocol network supporting the TCP/IP protocol suite defined by the Internet Engineering Task Force (IETF) as well as the OSI protocol suite defined by ISO. The following discussion will be directed to this particular set of protocols, although the invention is not limited to these protocols, and the inventive concepts set forth below may be applied to other groups of protocols.

To apply the invention to TCP/IP and OSI, these protocols are slightly modified. Primarily, the format of various control packets such as the link state packets and the router to router "hello" packets are normalized so that all of the routers can connect to each other and become aware of the full topology of the multi-protocol network. In one embodiment, the common format comprises the current ISO DP 10589 format, with additional fields appended to the format, as allowed by the current format. In particular, additional optional fields are added to the hello packets, link-state packets, and sequence number packets. The other packet formats (in particular user data packet formats defined by ISO 8473 and IP, as well as control packet formats for router to end system communications), and the addressing schemes of the various different protocols, are not modified. ISO 9542 defines the control packet formats that are used for communications between routers and end systems in an OSI environment. Since one particular type of ISO 9542 packet format (the Intermediate System Hello packet) performs "double duty", and is also used for communications between routers over point-to-point links, this packet type will be modified by the addition of information in a manner that routers can interpret correctly, and that standard OSI end systems will ignore.

Particular modifications to the protocols suitable for one embodiment of the invention will be discussed under the heading "Detailed Description", below. The following general discussion of the invention will assume that the modifications described above have been made to the underlying protocols. Therefore, any reference to a particular protocol should be understood as a reference to the protocol as modified to conform with the goals of the preceding paragraph.

In an IP-OSI dual-protocol network, the types of routers discussed above can be further defined as follows:

(1) An "IP-only router" can understand and forward only user data packets conforming to RFC 791. Such a router conforms to the requirements for Internet gateways (as currently defined in RFC 1009, available from SRI International at the above address). However, an IP-only router will not be able to forward 8473 packets, and may operate without regard for ISO packet and addressing standards, except that IP-only routers may use OSI 10589 as their routing protocol.

(2) An "OSI-only" router can understand and forward only user data packets conforming to OSI 8473. Such a router conforms to the other requirements for OSI routers (including the end system-intermediate system protocol, ISO 9542, available from BSi Standards at the above address). However, an OSI-only router will not forward TCP/IP packets, and may operate without regard for IETF packet and addressing standards.

(3) A "simple dual-protocol router" can understand and forward both 8473 and IP user data packets simultaneously. However, a simple dual-protocol router is not be able to encapsulate IP user data packets inside OSI user data packets for transmission through an OSI-only router, or alternatively, encapsulate OSI user data packets inside IP user data packets for transmission through an IP-only router.

(4) An "enhanced dual-protocol router" can understand and forward both 8473 and IP user data packets simultaneously. In addition, an enhanced dual-protocol router can encapsulate IP user data packets inside OSI user data packets for transmission through an OSI-only router, and similarly can encapsulate OSI user data packets inside IP user data packets for transmission through an IP-only router. The way in which the encapsulation is performed will be discussed below.

Note that, of the four types of routers described above, types 1, 3, and 4 are all IP-capable. Similarly, types 2, 3, and 4 are all OSI-capable.

Even though dual-protocol routers are more flexible than IP-only or OSI-only routers, some vendors may still wish to implement single-protocol routers. Thus, even in a dual-protocol network, there may be IP-only and OSI-only routers, which will have to connect to and coexist with dual-protocol routers, and with each other. A main issue that must be confronted is how to control this interaction to provide for the correct forwarding of user data packets. Several options are proposed below.

Figure 2A:
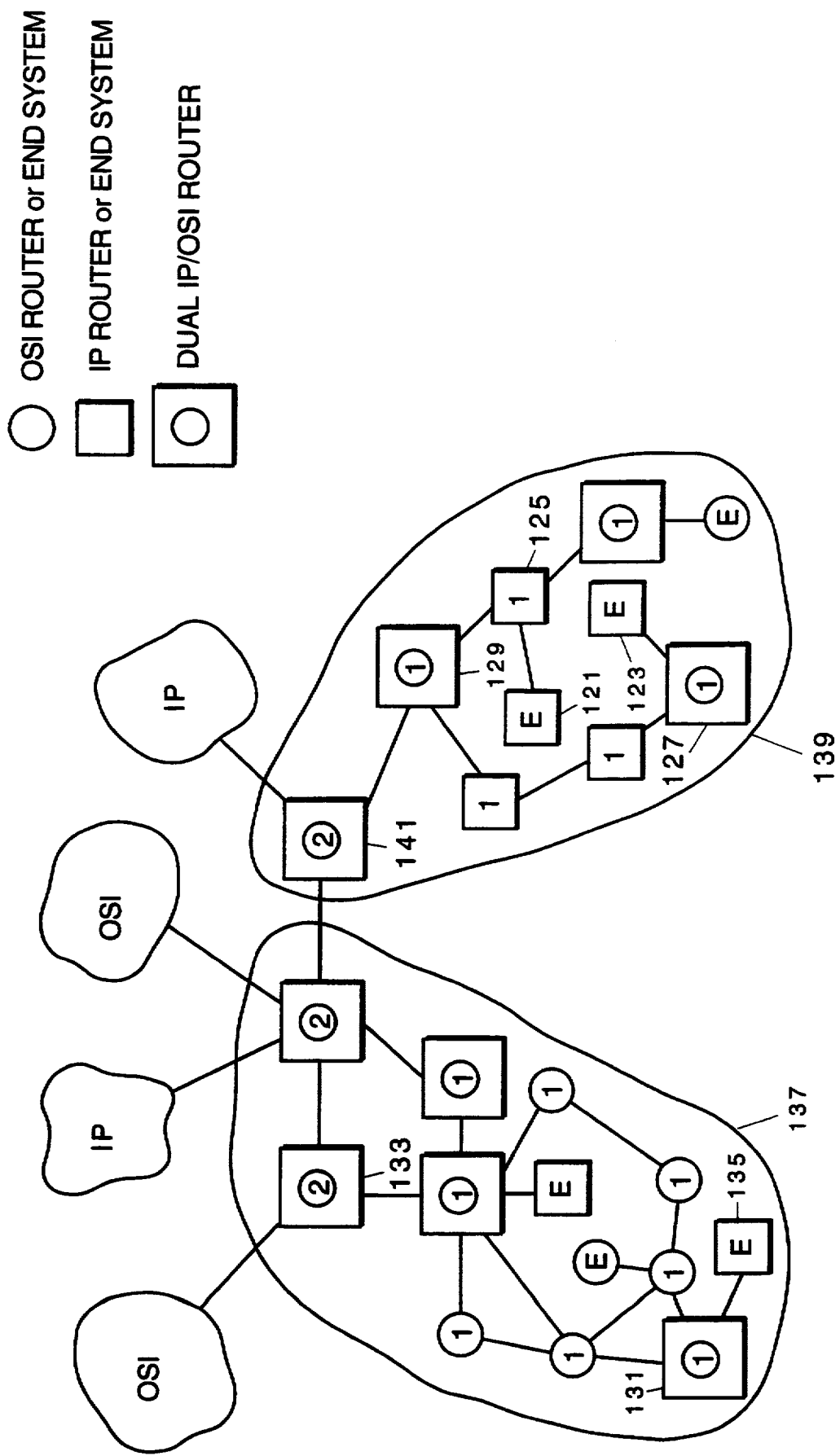
FIG. 2A is a diagram of a dual-protocol network segregated on a per-area basis which requires encapsulation.

The most direct way to allow interaction between the protocols is on a "per-area" basis. Referring to FIGS. 1A and 2A, large networks are often organized hierarchically; that is, partitioned into smaller networks 90, 92, 94, 137, 139. For the purposes of this discussion, these smaller partitions of the large network will be referred to as "areas"; routing within an area will be referred to as Level-1 routing, and routing between areas will be referred to as Level-2 routing.

TCP/IP routers and OSI routers are arranged into a common area structure. (Maintenance of an independent two level hierarchy for the two protocols is possible, but is complex, and does not benefit from the advantages of a common area structure discussed below.) The detailed description, which follows later, discusses methods for creating a common area structure while allowing independent use of the existing addressing schemes and packet formats, e.g., OSI and TCP/IP addressing schemes and packet formats, without requiring modification of those addressing schemes and packet formats. In the following general description, it will be assumed that a suitable method has been employed to create such a common area structure.

In FIGS. 1A and 2A, those routers that are OSI-only, and the end systems designed to communicate with the OSI protocols, are indicated by circles. Those routers that are IP-only, and the end systems designed to communicate with the TCP/IP protocols, are indicated by squares. Those routers that are dual-protocol (either simple dual or enhanced dual) are indicated by circles within squares. The Level-1 routers (which reside within the areas 100) are marked with a "1". The Level-2 routers which connect the areas 100 are marked with a "2". The end systems are marked with an "E".

In a hierarchical network such as in FIGS. 1A and A, the Level-1 routers need not share link state information with all of the other Level-1 routers, rather, this information is only shared with those Level-1 routers in the same area. To permit routing of user data packets between areas, end system addresses are assigned such that, by observing an end system address, the routers in an area can determine whether the end system having that address is in the local area. (Typically this observation involves reading the more significant bits of the address and/or applying bit masks to the address). When a user data packet is sent from an end system in a given area to another end system in the same area, the user data packet is forwarded via Level-1 routing. Otherwise, if the user data packet is sent to an end system in another area, Level-1 routers in the originating area forward the user data packet to an appropriate Level-2 router in their area. In the most common embodiment, this involves forwarding to the nearest Level-2 router in their area. Level-2 routers then forward the user data packet to the nearest Level-2 router in the destination area. Then the user data packet again travels via Level-1 routing to the destination end system.

There are several embodiments of the invention which organize the dual-protocol network on a per-area basis. Two of these embodiments are illustrated in FIGS. 1A and 2A.

In the embodiment illustrated in FIG. 1A, the topology of the network is restricted such that no user data packet encapsulation is required. In each area, one of the following is true: (1) every router in the area operates as OSI-only (e.g., the area 90 on the left of FIG. 1A); (2) every router in the area operates as IP-only (e.g., the area 92 in the center of FIG. 1A); or (3) every router in the area operates as dual-protocol (e.g., the area 94 on the right of FIG. 1A). Similarly, the Level-2 backbone operates entirely as IP-only, entirely as OSI-only, or entirely as dual-protocol.

In some embodiments, all areas operate as dual-protocol. In other embodiments, some areas operate as OSI-only, and some as dual-protocol. In other embodiments, some areas operate as IP-only, and others as dual-protocol. As illustrated in FIG. 1A, in some embodiments, some areas operate as IP-only, some areas as OSI-only, and some areas as dual-protocol. Any of these combinations are possible as long as (i) the Level-2 backbone operates in dual-protocol mode (as in FIG. 1A) or (ii) the protocol which is not supported by the Level-2 backbone is prohibited from operating outside of the individual areas.

In the architecture of FIG. 1A, there is no need for encapsulation, and thus all of the dual-protocol routers are "simple dual" routers. It may not be immediately evident that encapsulation is not necessary in the architecture of FIG. 1A; therefore, some discussion will be dedicated to this point.

First, note that encapsulation is only necessary if some of the paths that may be followed by a user data packet pass through routers that are not capable in the protocol of the user data packet. If every router in the path is capable in the protocol of the user data packet, then every router can forward the user data packet in accordance with that protocol, and the user data packet will successfully reach its destination without being encapsulated.

Given the above paragraph, it is clear by inspecting FIG. 1A that any path that may be taken by a TCP/IP user data packet or an OSI user data packet can only pass through IP-capable or OSI-capable routers, respectively. Therefore, there will never be any need to encapsulate user data packets.

To be more rigorous with the above proof (this discussion will be of use in analyzing more complex multi-protocol networks to be presented below) note that, in any dual-protocol network, the first router on any path followed by an OSI-formatted user data packet must be OSI-capable. To prove this assertion, remember that OSI-formatted user data packets can only be generated by OSI end systems or (in some special cases) by OSI-capable routers. Because all OSI end systems must be connected to OSI-capable routers, the first router on any path followed by an OSI-formatted user data packet must be an OSI-capable router. For similar reasons, the last router on any path followed by an OSI-formatted user data packet must be OSI-capable. This is true because an OSI-formatted user data packet must be addressed to an OSI end system or (in some special cases) to an OSI-capable router. (A non-OSI end system or router could not interpret or use the contents of an OSI-formatted user data packet, and even if it could, the address of a non-OSI end system or router would not be an OSI address and could not be placed in an OSI user data packet header). Again, because all OSI end systems must be connected to OSI-capable routers, the last router on a path followed by any OSI-formatted user data packet must be OSI-capable.

For the reasons given above, the first and last routers along any path followed by an OSI-formatted user data packet must be OSI-capable. For similar reasons, the first and last routers along any path followed by an IP-formatted user data packet must be IP-capable.

Now note that, within any given area in FIG. 1A, all of the routers have the same capabilities. As stated above, the first router in the path of a user data packet must be capable in that user data packet's protocol: because all of the routers in an area have the same capabilities, this means that all of the routers in the area originating a user data packet must be capable in that user data packet's protocol. Similarly, the last router in the path of a user data packet must be capable in that user data packet's protocol; because all of the routers in an area have the same capabilities, this means that all of the routers in the area to which a user data packet is addressed must be capable in that user data packet's protocol. Thus all of the routers in the areas where a user data packet starts and ends (which may be the same) are capable in that user data packet's protocol. The only other routers through which the user data packet travels are the Level-2 routers, and the Level-2 routers have sufficient capability to forward any user data packets that may be presented to them: either the Level-2 routers are dual-protocol, or, if they are not dual-protocol, the protocol which is not supported by the Level-2 routers is prohibited from operating outside of the individual areas. Thus, in the FIG. 1A architecture, all of the routers along any user data packet's path must be capable in that user data packet's protocol, and no encapsulation is required.

Figure 1B:
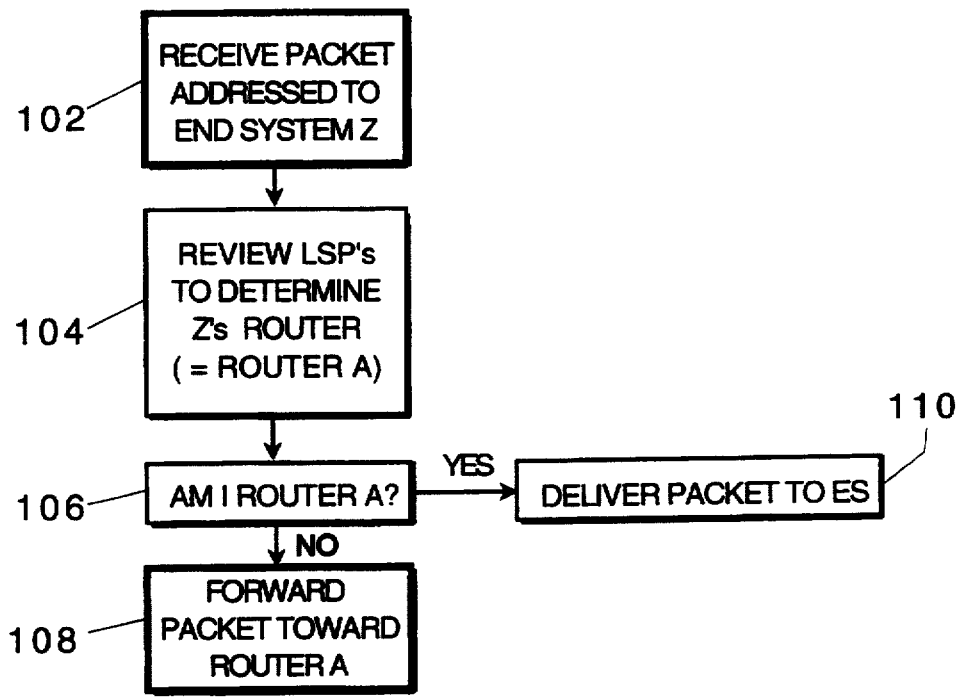
FIG. 1B is a flow diagram of the user data packet receiving algorithm to be followed by the routers of FIG. 1A.

One algorithm that may be used by the routers of FIG. 1A when receiving user data packets is illustrated in FIG. 1B. Referring to FIG. 1B, when a router of FIG. 1A receives 102 (either from another router or from an attached end system) a user data packet addressed to an end system Z, the receiving router first reviews 104 the LSPs it has stored to determine if there is a router that has "advertised" a connection to end system Z. The router connected to end system Z will be called router A (note that if end system Z is not in the same area as the receiving router, router A is the nearest level-2 router in the local area). Next, the receiving router checks 106 if router A is itself, i.e., if end system Z is connected to the receiving router. If not, the user data packet is forwarded 108 to the appropriate next router on the path to router A. However, if end system Z is connected to the receiving dual-protocol router, then the receiving dual-protocol router delivers 110 the user data packet to the appropriate end system.

Figure 1C:
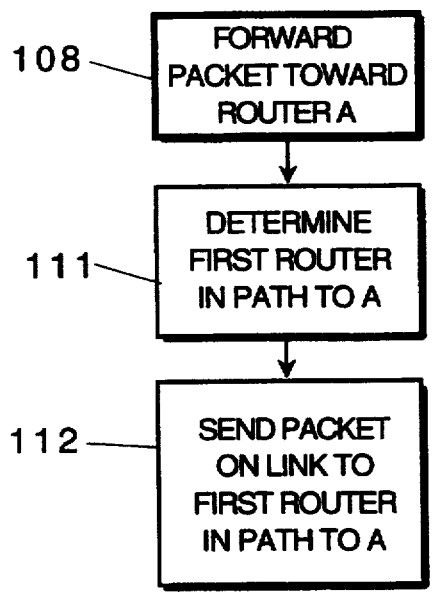
FIG. 1C is a flow diagram of the user data packet forwarding algorithm to be followed by the routers of FIG. 1A.

Referring to FIG. 1C, when a dual-protocol router forwards 108 a user data packet toward router A, it determines 111 the first router in the path to router A and then sends 112 the user data packet on the link to that first router.

The operation of the algorithms discussed above can best be shown by example. Two examples of routing in the network of FIG. 1A are provided below. The first example does not involve Level-2 routing; the second example does.

In the first example, OSI end system 101 wishes to send a user data packet to OSI end system 103. To this end, it generates an OSI header addressed to end system 103, and forwards the user data packet to OSI-only router 105. Following the flow charts of FIGS. 1B and 1C, router 105 determines that the user data packet should be forwarded to OSI-only router 107, because router 107 has advertised a connection to end system 103 in its most recent LSP. Therefore, router 105 forwards the user data packet to router 107. Following the flow chart of FIG. 1B, router 107 determines that the user data packet is addressed to one of the end systems connected to it, and thus delivers the user data packet to end system 103.

In the second example, OSI end system 103 wishes to forward a user data packet to OSI end system 109. To this end, end system 103 generates a user data packet in OSI format, which it forwards to OSI-only router 107. Following the flow charts of FIGS. 1B and 1C, router 107 determines that the user data packet is not addressed to an end system in the local area, and thus it determines that the user data packet should be forwarded to dual-protocol router 111, which is the nearest Level-2 router in router 107's local area. Thus, router 107 forwards the user data packet on the link to OSI-only router 105 (which leads most directly to router 111). Following the flow charts of FIGS. 1B and 1C, router 105 then independently determines that the user data packet is not addressed to an end system in the local area, and thus determines that the user data packet should be forwarded to dual-protocol router 111. Thus router 105 forwards the user data packet on the link to router 111. Router 111, following the flow charts of FIGS. 2B and 2C, recognizes that the OSI user data packet should be forwarded toward the area router 115. The user data packet is then forwarded through the Level-2 dual-protocol routers 113 and 115, eventually arriving at dual-protocol router 117. Following the flow charts of FIGS. 1B and 1C, router 117 determines that the user data packet is addressed to an OSI end system which is attached to it. Therefore, it delivers the user data packet to end system 109.

Before discussing other possible embodiments of the invention which involve encapsulation, it is useful to make the following observation: most of the complications associated with single-protocol routers occur when more than one type of single-protocol router appears in the same area. If there is only one type of single-protocol router in an area, all user data packets can be placed in the protocol of the single-protocol routers (by encapsulation if necessary), and then easily routed within the area.

Therefore, referring to FIG. 2A, a second embodiment of the invention explicitly prohibits the use of IP-only and OSI-only routers in the same area. In each area, one of the following is true: (1) the area is an "OSI-preferred area", and every router in the area operates as OSI-only or dual-protocol (e.g., the area 137 on the left of FIG. 2A); or (2) the area is an "IP-preferred area", and every router in the area operates as IP-only or dual-protocol (e.g., the area 139 in the right of FIG. 2A). Although the areas are designated as OSI-preferred or IP-preferred, because both types of areas include dual-protocol routers, there may be an IP end system in an OSI area (e.g., IP end system 135), and vice-versa. As a result, IP user data packets will be transmitted through OSI areas, and vice-versa. These packets may need to be encapsulated to traverse the single-protocol routers within the areas. For this reason, in the embodiment of FIG. 2A, all of the dual-protocol routers are "enhanced dual" routers.

The Level-2 backbone may be composed entirely of dual-protocol routers, as illustrated in FIG. 2A. Alternatively, the Level-2 router in an area may be single-protocol if the protocol not supported by the Level-2 router will be not be routed outside the area. One restriction that ensures that this will be the case is as follows: the Level-2 routers for an area must support the protocol used by any end system in the area. For example, for an area to have an IP-only Level-2 router, all of the end systems in that area must be IP. This restriction ensures that the single-protocol Level-2 routers will never be expected to perform Level-2 routing on a user data packet having an incompatible protocol (because all user data packets travelling into or out of an area must be to or from and end system in the area). However, it may be desireable to allow an area to use a protocol which is not supported by its Level-2 router(s), for example if the protocol is still being tested and has not been universally adopted. In the embodiments illustrated in FIG. 2A, there must be one common protocol which is supported by all Level-2 routers. For example, it is not permitted to have an OSI-only Level-2 router and an IP-only Level-2 router in the same routing domain (this topological restriction is removed in other embodiments of the invention).

Encapsulation is necessary within areas of the architecture of FIG. 2A because, within an area, all of the routers do not have the same capabilities. In addition, if there are single-protocol Level-2 routers, encapsulation may also be necessary at Level-2, because not all of the Level-2 routers would have the same capabilities. (Compare this situation to the discussion of FIG. 1A above, where all of the routers within an area and at Level-2 have the same capabilities, and because of this, encapsulation is not required.)

The following discussion of encapsulation will be directed to encapsulation at Level-1. However, for embodiments which have single-protocol routers at Level-2, the same techniques may be used to encapsulate at Level-2. To implement encapsulation, several issues must be confronted. First, there must be a way for routers to decide when encapsulation is necessary.

In known routing algorithms, when a router seeks to forward a user data packet, it consults a network map (generated from the link state packets) to determine the "best" path for the user data packet to follow to its destination. The user data packet is then forwarded on the link connecting to the first router on this path. (Note that the first router on the path must be on the other end of a link connected to the forwarding router.) Here, the user data packet's path is mapped in a similar manner; however, the mapping is done without regard for the protocols supported by the routers on the path.

Once the user data packet's path is chosen, the forwarding router attempts to forward the user data packet to the first router on the path. If the first router on the path does not support the user data packet's protocol, then encapsulation is required, and the forwarding router encloses the user data packet in a suitable encapsulation header before the user data packet is forwarded.

Note that only dual-protocol routers need to perform the analysis of the previous paragraph. The analysis of the previous paragraph is not necessary in single-protocol routers because they cannot encapsulate user data packets. Furthermore, the restrictions on the topology of FIG. 2A prevent any circumstances in which a single-protocol router would need to perform encapsulation (these circumstances can also be prevented in less restricted architectures, as discussed below), as follows: (1) any user data packet being forwarded by a single-protocol router is by definition formatted in the protocol supported by the single protocol router; (2) the topology of FIG. 2A prevents single-protocol routers from being connected to other routers which do not support their protocol. Thus, there are no circumstances in which a single-protocol router would need to encapsulate a user data packet.

Once a dual-protocol router decides that a user data packet needs to be encapsulated, it must have some way to address the encapsulation header so that the user data packet will arrive at the router which is expected to decapsulate the user data packet, and this destination router will know to do so. Such a mechanism prevents the user data packet from being lost in the network, and prevents the destination router from treating an encapsulated user data packet as an ordinary, non-encapsulated user data packet, and accidentally misinterpreting its contents or forwarding it without decapsulating it. To achieve these goals, encapsulated user data packets are uniquely addressed, in a manner consistent with the encapsulating protocol.

One possible way to properly address encapsulated user data packets is to assign a "dummy" end system address to each dual-protocol router (only dual-protocol routers are capable of decapsulating user data packets, therefore, only dual-protocol routers need to have such addresses). The link state packets of the dual-protocol routers "advertise" their dummy end system addresses along with other "real" end system addresses. Thus, within the LSPs, the dummy addresses are treated the same way as the addresses of real end systems connected to the dual-protocol router. When a dual-protocol router wishes to encapsulate a user data packet (only dual-protocol routers encapsulate user data packets) and send it to another dual-protocol router, it generates an encapsulation header, which it addresses to the dummy address for the destination router (the dummy address is placed in a predetermined location in the dual-protocol routers' LSPs, for example, it can be added to the beginning or end of the list of real end system addresses).

Between the encapsulating router and the decapsulating router, the encapsulated user data packet may pass through many other single- or dual-protocol routers. Each of these routers simply reads the user data packet's encapsulation header and, because the LSP of the destination router advertised the dummy address as an end system to which it is connected, the intermediate routers simply forward the encapsulated user data packet toward the destination router, in the same manner that ordinary, unencapsulated user data packets are forwarded.

When the encapsulated user data packet arrives at the destination router, the destination router recognizes the dummy address as indicating that the user data packet is encapsulating another user data packet. The destination router then removes the encapsulation header, and interprets the contents of the user data packet as a newly received user data packet.

Although the above methods determine when to encapsulate, and illustrate how to address user data packets so that they can be recognized and decapsulated, the dual-protocol router encapsulating a user data packet must also know where to send the encapsulated user data packet, i.e., which of the other dual-protocol routers to which the encapsulated user data packet should be addressed. Remember that the encapsulating router maps out the path the user data packet should follow to its destination before it decides if the user data packet should be encapsulated. Once a decision to encapsulate has been made, to minimize the number of encapsulations and decapsulations, the encapsulated user data packet should be addressed so that it passes through as many routers as possible before it needs to be decapsulated. However, the user data packet cannot travel through a router that does not support the encapsulating protocol. Therefore, the user data packet must be encapsulated before the first router on the path which does not support the encapsulating protocol. In the following, the router on the path just prior to the first router which does not support the encapsulating protocol will called the "last capable router on the path" (because this router is the last router in the chain of routers, starting at the router encapsulating the user data packet, which support the encapsulating protocol).

In some architectures (in particular, the architecture of FIG. 2A) the above-described "last capable router along the path" will always be the router to which the destination end system is connected. This is an advantage of the .FIG. 2A architecture because, as discussed above, even in known networks which do not support dual-protocol protocols, routers forwarding user data packets must first determine the router to which the destination end system is connected. Thus, in the FIG. 2A architecture, this computation not only determines how to forward the user data packet, it also determines how to address the encapsulation header. (In other multi-protocol architectures—see the discussion of FIG. 3 below—the "last capable router along the path" will not always be the router to which the destination end system is connected. In these architectures, extra computation is required to determine how to address the encapsulation header).

Because the single-protocol routers in FIG. 2A do not perform encapsulation and therefore need not determine when to encapsulate, the algorithm used by the routers in FIG. 1A, i.e., that illustrated in FIGS. 1B and 1C, can be used by the single-protocol routers in FIG. 2A.

Figure 2B:
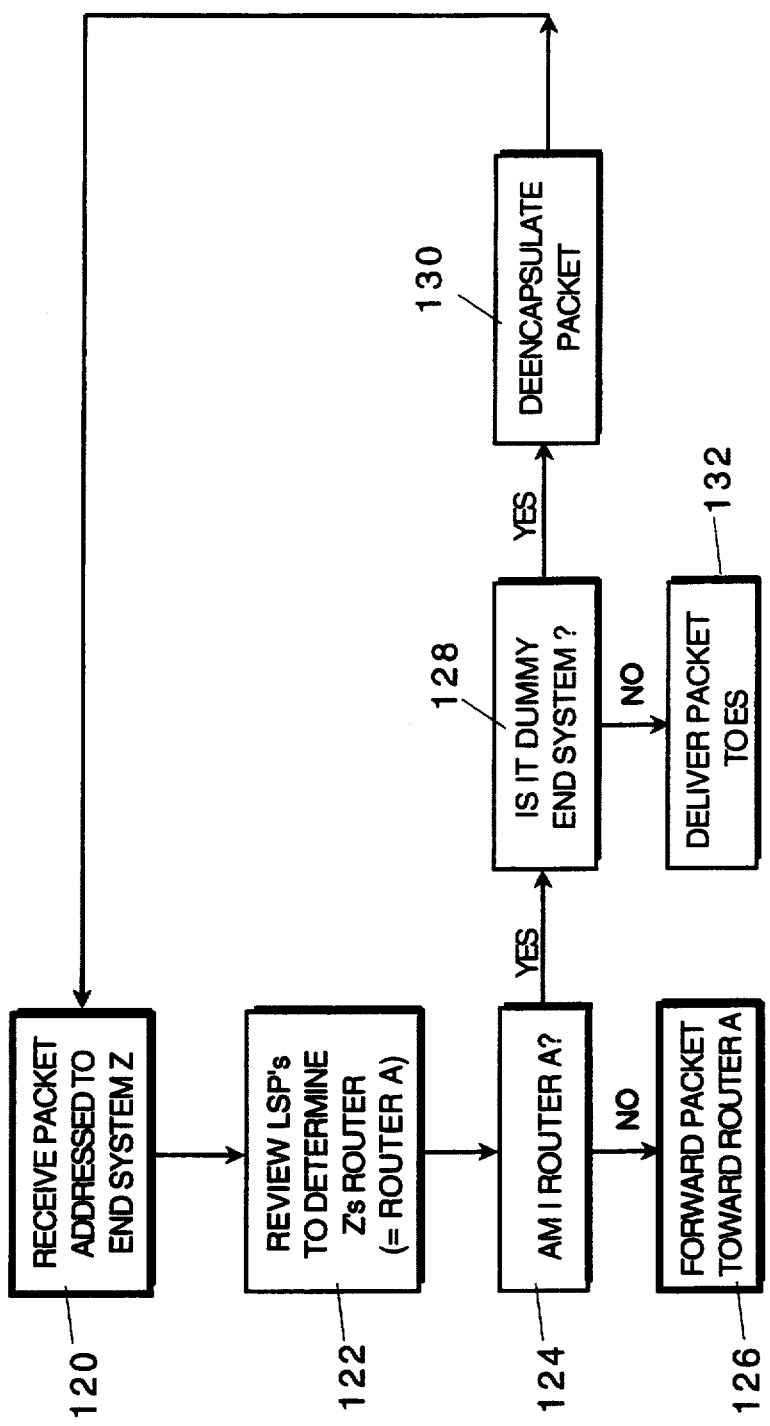
FIG. 2B is a flow diagram of the user data packet receiving algorithm to be followed by the dual-protocol routers of FIG. 2A.

However, the dual-protocol routers of FIG. 2A must use a more complex algorithm for receiving and forwarding user data packets. Referring to FIG. 2B, when a dual-protocol router of FIG. 2A receives 120 (either from another router or from an attached end system) a user data packet addressed to an end system Z, the receiving dual-protocol router first reviews 122 the LSPs it has stored to determine if there is a router that has "advertised" a connection to end system Z. The router connected to end system Z will be called router A. If end system Z is not in the same area as the receiving dual-protocol router, router A is the nearest Level-2 router in the local area. Next, the receiving dual-protocol router checks 124 if router A is itself, i.e., if end system Z is connected to the receiving dual-protocol router. If not, the user data packet is forwarded 126 to the appropriate next router on the path to router A. However, if end system Z is connected to the receiving dual-protocol router, then the receiving dual-protocol router checks 128 if end system Z is the "dummy" end system, i.e., if the user data packet is an encapsulated user data packet. If not, the user data packet is delivered 132 to the appropriate end system. However, if the user data packet is an encapsulated user data packet, the encapsulation header is removed 130, and the user data packet contained therein is treated as a newly received user data packet by returning to step 120.

Figure 2C:
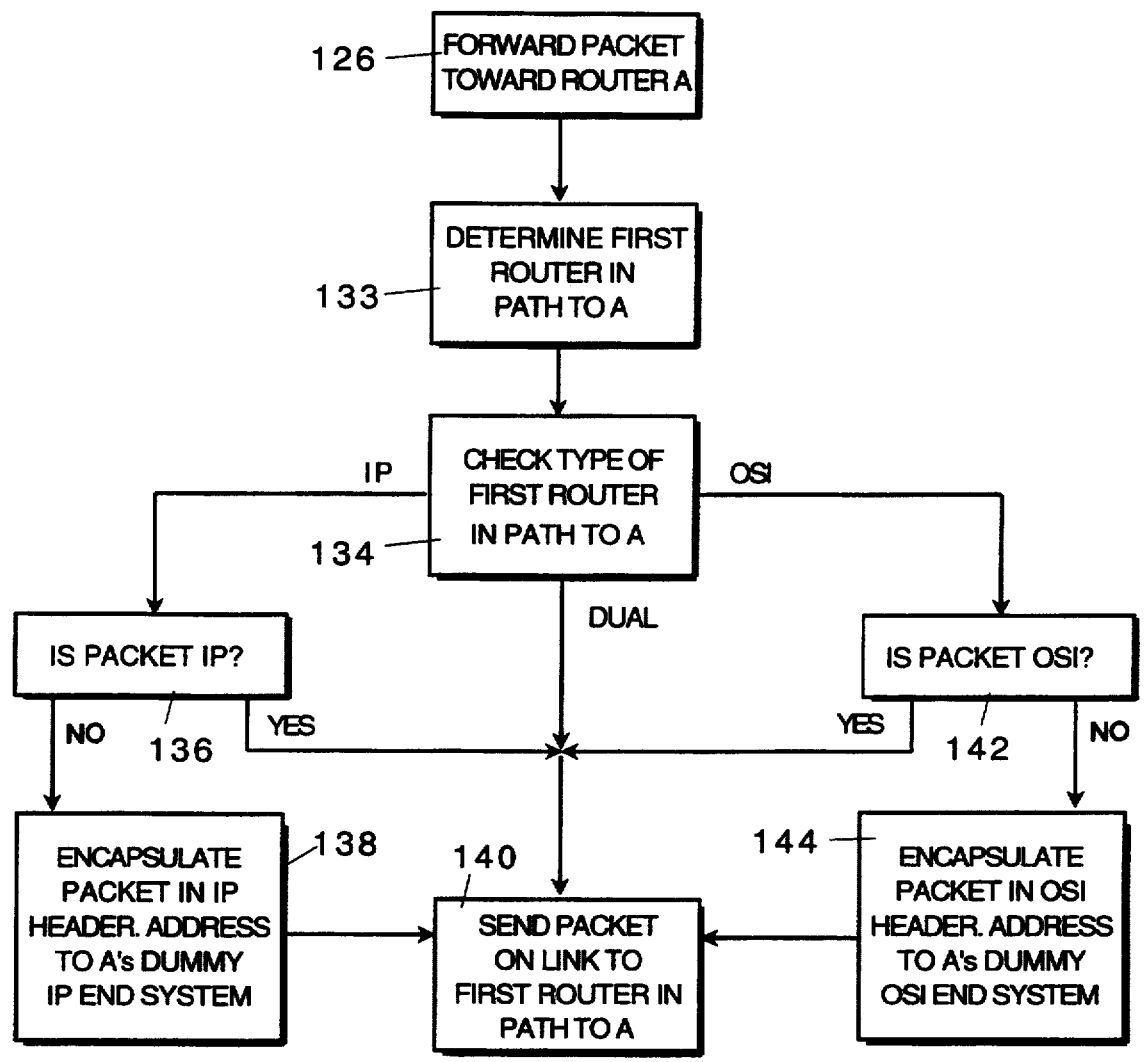
FIG. 2C is a flow diagram of the user data packet forwarding algorithm to be followed by the dual-protocol routers of FIG. 2A.

Referring to FIG. 2C, when a dual-protocol router forwards 126 a user data packet toward router A, it first determines 133 the first router in the path to router A. The dual-protocol router then checks 134 whether the first router in the path to router A is an OSI router, an IP router, or a dual IP-OSI router.

If the first router is a dual IP-OSI router, the forwarding router directly sends 140 the user data packet on the link to that first router without the need for any encapsulation.

If the first router is IP-only, the forwarding router checks 136 if the user data packet is formatted in IP. (The detailed description below discusses how the user data packet protocols may be properly recognized.) If not, the user data packet is encapsulated 138 in an IP header, which is addressed to router A. Note that, if the destination end system is in the local area, then router A is the "last capable router on the path" as discussed above. However, if the destination end system is not in the local area, then router A is the nearest Level-2 router in the local area, which will decapsulate the user data packet (the Level-2 router must be dual-protocol if OSI and IP traffic is being routed outside the local area) and forward it via Level-2 routing to the correct area (which may involve additional encapsulations and decapsulation) where the Level-1 routing will deliver the packet (possibly after further encapsulation and decapsulation) to the destination end system. Regardless of whether the user data packet is encapsulated, it is sent 140 on the link to the first router in the path to router A.

Similarly, if the first router is OSI-only, the forwarding router checks 142 if the user data packet is formatted in OSI. If not, the user data packet is encapsulated 144 in an OSI header, which is addressed to router A. Regardless of whether the user data packet is encapsulated, it is sent 140 on the link to the first router in the path to router A.

The use of the above algorithms can be best shown by example. Two examples of routing in this architecture are provided below; the first example does not involve encapsulation, whereas the second requires encapsulation.

In the first example, TCP/IP end system 121 wishes to forward a user data packet to TCP/IP end system 123. To this end, end system 121 forms an IP user data packet addressed to end system 123. This user data packet is forwarded to IP-only router 125. Router 125, following the flow charts of FIGS. 1B and 1C, determines that the user data packet should be forwarded toward dual-protocol router 127. The user data packet is then forwarded to dual-protocol router 129, which is the first router on the path to router 127. Router 129 receives the user data packet, and following the flow charts of FIGS. 2B and 2C, also determines that the user data packet should be forwarded toward dual-protocol router 127, and that it need not be encapsulated because the next router is IP-capable (router 125 did not need to decide whether to encapsulate the user data packet because it is an IP-only router). In this way, the user data packet eventually arrives at dual-protocol router 127. Router 127 then follows the flow chart of FIG. 2B and determines that IP end system 123 is attached to it, and that the address of end system 123 is not its dummy address. Therefore, it delivers the user data packet to end system 123.

In the second example, TCP/IP end system 135 wishes to forward a user data packet to TCP/IP end system 123. To this end, end system 135 generates a user data packet in IP format, which it forwards to dual-protocol router 131. Following the flow chart of FIG. 2B, dual-protocol router 131 determines that the user data packet is not addressed to an end system in the local area, and thus it determines that the user data packet should be forwarded to dual-protocol router 133, which is the nearest Level-2 router in router 131's local area. Also, router 131 determines that the user data packet should be encapsulated because the next router is OSI-only and the user data packet is formatted for IP. Thus, router 131 generates an encapsulation header addressed to router 133's dummy address, and forwards the user data packet on one of the links leading to router 133. The OSI-only and dual-protocol routers in router 133's area then forward the user data packet as any other OSI user data packet until it reaches dual-protocol router 133. Router 133, following the flow chart of FIG. 2B, determines that the user data packet is addressed to its dummy address, and therefore is an encapsulated user data packet. The encapsulation header is removed, and router 133 analyzes the internal user data packet. Following the flow charts of FIGS. 2B and 2C, router 133 then recognizes that the IP user data packet should be forwarded toward the nearest Level-2 router in the destination area (i.e., router 141). The user data packet is then forwarded, without encapsulation, through the Level-2 dual-protocol routers, eventually arriving at router 141 (alternatively, where there are single-protocol routers at Level-2, there may also be encapsulation at Level-2). Following the flow charts of FIGS. 2B and 2C, router 141 determines that the user data packet should be forwarded toward router 127, and that it need not be encapsulated because the next router can understand IP. Therefore, router 141 forwards the user data packet toward router 127. When the user data packet arrives at router 127, it follows the flow chart of FIG. 2B and determines that TCP/IP end system 123 is attached to it, and that the address of end system 123 is not its dummy address. Therefore, it delivers the user data packet to end system 123.

In two simplified forms of the embodiment illustrated in FIG. 2A, either OSI-only or IP-only routers are prohibited from the network. In these embodiments, FIG. 2C can be simplified by simplifying the check at step 134, and removing either steps 142 and 144, or steps 136 and 138. In either embodiment, the Level-2 backbone may operate as all dual-protocol, or may be a mixture of dual-protocol and single-protocol routers, as long as the restriction discussed above is met (i.e., that any protocol not supported by an area's Level-2 router cannot be routed outside that area).

One advantage of the "per-area" embodiments discussed above is that they allow for a graceful evolution of the network from one protocol to another. Currently, TCP/IP is the dominant protocol suite (at least in most environments in the United States). Thus it is likely that, initially, users would choose to implement a network of IP-only and dual-protocol routers. These will operate together in a graceful manner (for example, where necessary, encapsulation will occur automatically). As OSI becomes more important, the IP-only routers would be upgraded to dual-protocol routers, probably eventually resulting in an all-dual routing domain. Assuming that OSI will eventually supersede TCP/IP, then during the last step of migration, users will gracefully replace some of the dual-protocol routers with OSI-only routers, and/or add additional OSI-only routers. All of this will be quite graceful, as long as the OSI-only and IP-only routers are never placed in the same area.

The per-area embodiments of the invention described above are quite flexible and have several advantages which have been disclosed. One drawback of these embodiments is that they have topological restrictions, namely, OSI-only and IP-only routers cannot be placed in the same area. However, if there are three types of routers (IP-only, OSI-only, and dual-protocol), some users may desire (and can be expected) to connect the routers together in the same area regardless of the restrictions imposed by the routing algorithm. Therefore, in another embodiment of the invention, these per-area topological restrictions are eliminated.

Figure 3:
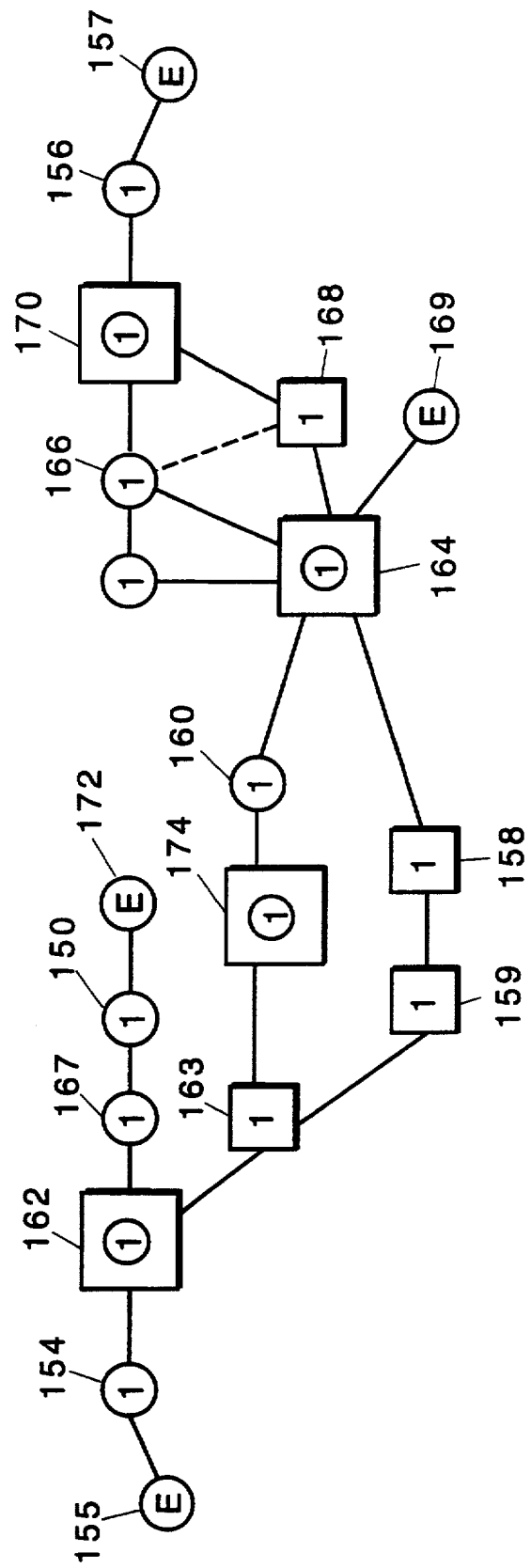
FIG. 3 is a diagram of a dual-protocol network which is not segregated on a per-area basis.

The embodiment of the invention illustrated in FIG. 3 has fewer topological restrictions than the preceding embodiments, in particular, OSI-only and IP-only routers are allowed to coexist in a given area. The network of FIG. 3 may represent one area of a larger network, or it may represent the Level-2 backbone of a network, where the depicted routers reside in local areas. (Note that if FIG. 3 represents an area, the Level-2 router in the area must be dual-protocol if both OSI and IP traffic is to be routed outside of the local area.)

The topology of FIG. 3 is more flexible than the topologies of FIGS. 1A or 2A, but routing user data packets through this topology is more complicated. Specifically, the following complications arise when OSI-only and IP-only routers are mixed within an area.

A first complication is that users may accidentally connect links between routers that do not support a common protocol. There must be a mechanism to ensure that such links are never recognized or used by the routers because all user data packets sent along such links will be lost. For example, the erroneously connected link between OSI-only router 166 and IP-only router 168 (indicated by a dotted line) must never be used. There are several possible ways to prevent such links from being used.

One solution is to configure the OSI-only and IP-only routers to use different values in the protocol data unit (PDU) type field (see Section 9 of the above-referenced 10589 specification) of their hello packets. Therefore, OSI-only routers would think that the hello packets sent by the IP-only routers are invalid, and vice-versa.

Another solution is to encapsulate the hello packets sent by IP-only routers inside other IP packets, so that they are ignored by OSI-only routers.

A third solution is to alter the sub-network dependent link initialization procedures in IP-only routers or OSI-only routers (or both), so as to prevent the link from becoming valid. It may be more convenient to perform these modifications in the IP-only routers because, currently, the IP specification is less rigid.

A second complication with the FIG. 3 embodiment is that IP-only and OSI-only routers can occur on the same LAN. (Note that if a LAN spans two areas, ISO 10589 ensures than the Level-1 routers from different areas on the LAN will ignore each other. This ensures that this issue does not arise in the previous "per-area" embodiments.) Providing dual protocols on LANs raises several issues that must be confronted.

Each LAN has an elected "designated router". The designated router is responsible for updating the LAN routers about the LAN topology. Although the actual topology is a single link connecting all of the routers, the topology reported by the designated router is a star, where the center of the star is a "pseudonode". (The designated router generates a link state packet for the pseudonode indicating a star connection to all of the other routers on the LAN.) As a result, the first router on the path to the user data packet's destination is always the pseudonode, and the second router on the path is the router to which the user data packet should be directly transmitted. The pseudonode is a notational convention when transmitting a user-data packet over a LAN, the user data packet is typically forwarded to the second router on the path to its destination, rather than to the first router.

The above mechanism works properly when the routers on the LAN all support one of the protocols. For example, if there are no IP-only routers on the LAN, then OSI-only routers may forward user data packets on the LAN in the normal fashion (because any user data packets forwarded by an OSI-only router must be formatted for OSI, and all routers on the LAN support OSI). Also, dual-protocol router may forward user data packets on the LAN in the manner described above (i.e., OSI user data packets are forwarded in the normal fashion, and IP user data packets are encapsulated if the next router is OSI-only). The designated router may be chosen to be an OSI-only or dual-protocol router, because either will be able to exchange control packets with the remainder of the routers on the LAN, and thus learn the full topology of the LAN. The situation is similar where there are no OSI-only routers on the LAN.

If there are OSI-only and IP-only routers on the LAN, then several difficulties arise. First, an appropriate "designated router" must be elected for the LAN. IP-only routers cannot correctly interpret fields in control packets exchanged with OSI-only routers (and vice-versa); therefore, the designated router cannot be either IP-only or OSI-only, because neither can correctly learn the entire LAN topology and generate the appropriate link state packet for the pseudonode. There are two possible solutions.

The first solution is to elect a dual-protocol router as the designated router. The dual-protocol router can correctly exchange control packets with all of the other routers, and thus can learn the entire LAN topology. To do this, the dual-protocol designated router send two sets of hello packets, one of which is interpreted by dual-protocol and IP-only routers and one of which is interpreted by dual-protocol and OSI-only routers. Once it has learned the LAN topology, the dual-protocol router then generates a link state packet for the pseudonode, which lists all of the routers on the LAN, regardless of their protocol capabilities. Note that if there are no single-protocol routers on the LAN, the dual-protocol routers send hello packets in a "preferred" format, for example the OSI format, elect one dual-protocol router as designated router, and use the "preferred" format for control and user data packets on the LAN.

The first solution can only be used if there is a dual-protocol router on the LAN. If there are no dual-protocol routers on the LAN, the second solution must be used. In the second solution, two designated routers are elected, one which is IP-capable and one which is OSI-capable. To do this, the IP-capable routers on the LAN exchange control packets with other IP-capable routers, and elect one as an IP-capable designated router, and similarly, the OSI-capable routers exchange control packets with other OSI-capable routers, and elect one as an OSI-capable designated router. (If there is a dual-protocol router on the LAN and the second solution is chosen, then the dual-protocol router may be elected as both pseudonodes.) The IP-capable and OSI-capable pseudonodes then exchange control packets with the other IP-capable or OSI-capable routers, respectively, and learn that portion of the LAN topology which is capable in their protocol. Next, the two pseudonodes generate two link state packets, one for an "IP pseudonode" and one for an "OSI pseudonode". The IP pseudonode link state packet lists only the IP-capable routers on the LAN, and the OSI pseudonode link state packet lists only the OSI-capable routers on the LAN. (If there is one or more dual-protocol router on the LAN and the second solution is chosen, then the dual-protocol router(s) will be listed in both pseudonode link state packets,)

When IP-only and OSI-only routers occur on the same LAN, the forwarding of user data packets on that LAN may also be more complicated.

As discussed above, when forwarding a user data packet on a LAN, typically the user data packet is sent to the second router on the path to its destination (i.e., the packet is sent to the router after the pseudonode). To allow OSI-only and IP-only routers on the same LAN, the following restrictions are added: (i) if the router doing the forwarding is dual-protocol, it first determines whether the user data packet is compatible with the second router..if not, it encapsulates the packet before forwarding it; (ii) if the router doing the forwarding is a single-protocol router, and there are two pseudonodes, then all routers that the single-protocol router is aware of (i.e., those listed in the appropriate pseudonode LSP) will be capable in the protocol of the single-protocol router, and the user data packet can be forwarded in the normal fashion; however (iii) if the router doing the forwarding is a single-protocol router, and there is only one pseudonode, then it is possible that the second router (i.e., the router after the pseudonode) may be a single-protocol router supporting the wrong protocol suite. Therefore, in this case the single-protocol router forwards the user data packet to a dual-protocol router on the LAN (perhaps to the designated router, which must be dual), rather than to the second router. The dual-protocol router can then encapsulate the packet if required.

A third complication with the FIG. 3 embodiment is that encapsulation is more complex. Note that, in the topology of FIG. 3, user data packets may need to be encapsulated to traverse the single-protocol routers within the areas; therefore, all of the dual-protocol routers must be "enhanced dual" routers. For example, consider an OSI user data packet which needs to traverse a path from OSI end system 155 connected to OSI-only router 154 to OSI end system 157 connected to OSI-only router 156. The user data packet (at minimum) must be encapsulated by dual-protocol router 162, so that it can traverse IP-only router 163. Also, the user data packet must be decapsulated by router 164 before it can be sent to router 166, however, it must remain encapsulated if it is to be sent through router 168 and then decapsulated at router 170.

In the above discussion of FIG. 2A, it was asserted that, to minimize the number of encapsulations and decapsulations, an encapsulated user data packet should be addressed so that it passes through as many routers as possible before it needs to be decapsulated, i.e., to the last router along the path that supports the encapsulating protocol. It was also noted that, in more complex architectures, the "last capable router along the path" will not always be the router to which the destination end system is connected. This is clear from the above example, as the "last capable router on the path" may be router 164 (if it is desirable to route through router 166), or it may be router 170 (if it is desirable to route through router 168).

The encapsulation header must be addressed to the "last capable router along the path" for the user data packet to be correctly decapsulated. To allow this, the above-referenced Dijkstra algorithm must be modified so that it not only indicates which neighboring router to forward the user data packet to, but (where necessary) also specifies which destination address needs to be used for the encapsulating header (i.e., which router is the "last capable router along the path").

Figure 4A:
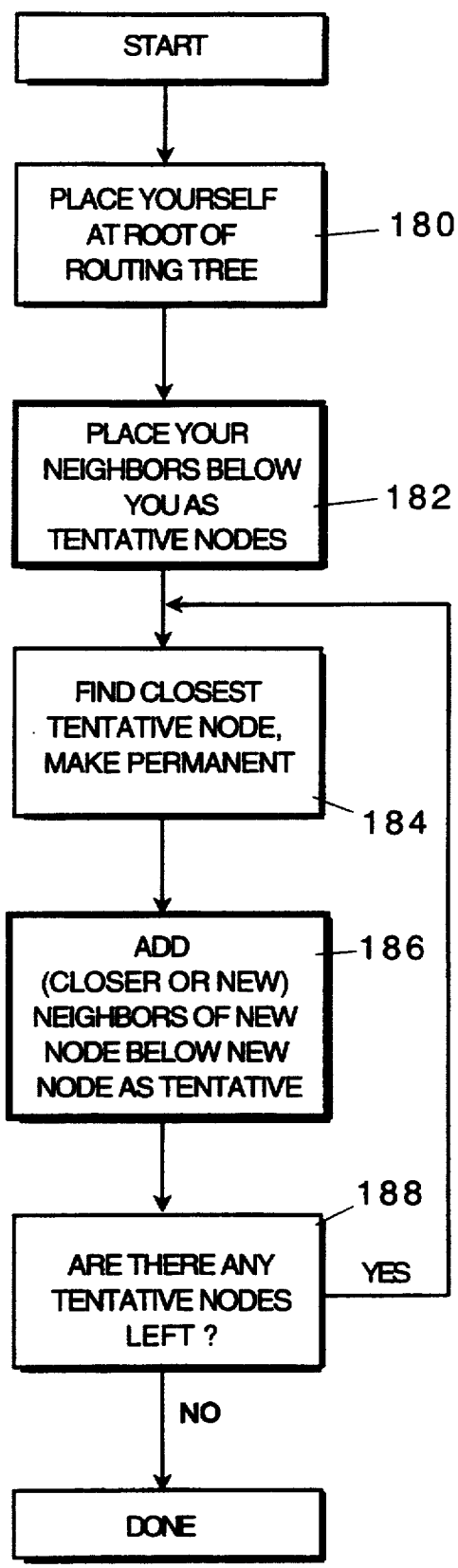
FIG. 4A is a flow diagram of an algorithm used to build routing trees.
Figure 4B:
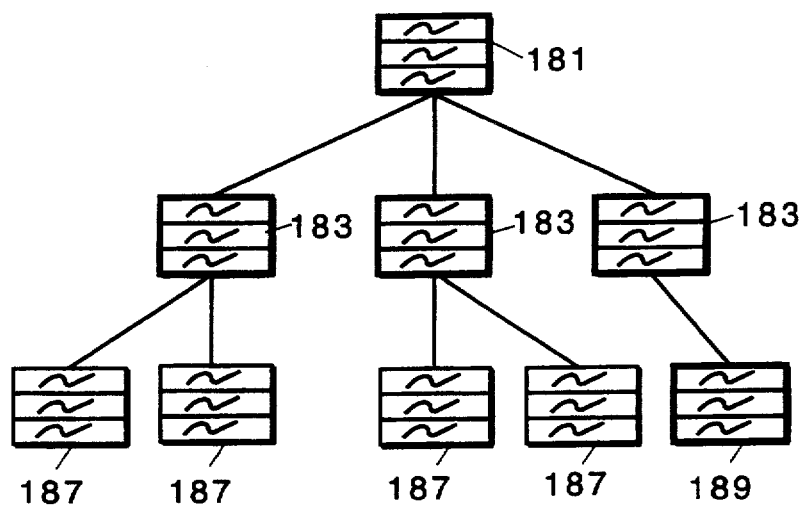
FIG. 4B is a diagram of a routing tree.

A routing tree such as illustrated in FIG. 4B is generated by the Dijkstra algorithm of FIG. 4A. Referring to FIGS. 4A and 4B, to initialize the Dijkstra algorithm, the router generating the tree first creates 180 (FIG. 4A) a node 181 (FIG. 4B) representing itself at the root of the tree. Next, nodes 183 representing the neighbors of the router generating the tree are placed 182 below the root of the tree as "tentative". The relationship of node 181 to 183 is a parent-child relationship. In the following, the node further from the root node 181 may be referred to as the "child", and the node closer to the root node 181 may be referred to as the "parent".

When a node representing a router is placed on the tree tentatively, it indicates that one path through the network to the router has been located (namely, the path through the routers represented by the nodes between the tentative node and the root node 181). As will be seen below, tentative nodes are made permanent once the Dijkstra algorithm verifies that the tentative path to the represented router is the best possible path. To perform this verification, the algorithm performs a loop, locating permanent paths to each router in the network, until paths to all routers have been determined. The routing tree in FIG. 4B represents a tree in the midst of construction. The nodes in FIG. 4B with a dark outline are permanent, whereas the nodes in FIG. 4B with a light outline are tentative-nodes 187 have been added as tentative nodes, and node-189 has been made permanent.

In each pass of the Dijkstra loop, the "closest" tentative node to the root node 181 is located 184 and made permanent (the length, or "cost", of a path from the router represented by the root node to the router represented by another node is calculated using a suitable metric such as link delay times). The closest tentative node may be made permanent because the path from the root to the closest tentative node must be the best path to the router represented by the tentative node; any other possible paths to the represented router would have to pass through one of the other tentative nodes, and thus would by definition be "longer" paths (because links never have negative cost).

Once the closest tentative node is made permanent, the routers which neighbor the router represented by the newly permanent node are added 186 tentatively to the tree as children of the newly permanent node. However, if any of these neighboring routers is already represented by permanent node on the tree, then a tentative node representing the neighboring router is not added to the tree (because a better path to the neighboring router has already been found). Also, if any of the neighboring routers is already represented by a tentative node on the tree, then a comparison is made between the existing path to the neighboring router (i.e., the path represented by the existing tentative node) and the new path to the neighboring router. If the new path is "shorter" (in the sense discussed above) than the existing path, a new tentative node representing the new path is added to the tree, and the existing tentative node is removed. Otherwise, the existing tentative node is retained, and no new tentative node is added.

There is the possibility that two paths to the same router will be equal in "length" or very similar in length. In these cases, it is necessary and/or useful to implement a tie-breaking routine, which breaks such ties or near ties in a well-behaved manner. This can help to share network traffic loads between paths of equal or almost-equal cost.

Finally, 188, the algorithm checks if there are any tentative nodes left (i.e., if there are any routers to which paths have been established, but to which best paths have yet to be determined). If not, the algorithm ends. Otherwise, the algorithm proceeds to step 184, and makes another tentative node permanent.

Figure 5A:
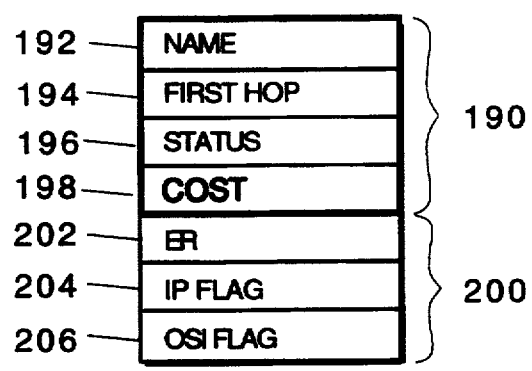
FIG. 5A is a diagram of a data structure of the routing tree of FIG. 4B as used in a dual-protocol router of FIG. 3.

Referring to FIG. 5A, several fields of data may be contained in each of the node data structures of the tree of FIG. 4B. Fields 190 contain general information useful for performing the Dijkstra algorithm.

The name field 192 contains the name of the router which a node represents. The name of the router represented by a node is placed in the name field when the node is first created.

The first hop field 194 contains the name of the first router on the path from the router generating the routing tree to the router which the node represents. This field is used by the router generating the routing tree to determine where (i.e., to which of its neighboring routers) a user data packet should be forwarded. This information is generated as follows: when a node 183 representing a router which directly neighbors the router generating the routing tree (represented by node 181) is added to the tree (step 182, FIG. 4A), the name of the neighboring router (i.e., the router represented by the node 183) is placed in the name field 192 and in the first hop field 194 of the node 183. Thereafter, when another tentative node is added to the tree (step 186, FIG. 4A) below a parent permanent node, the first hop field 194 in the new node is set to the value of the first hop field 194 in the parent node. In this way, the first hop values are established when the nodes 183 are added to the tree, and these values are maintain throughout the branches of the tree leading from the nodes 183.

The status field 196 indicates whether the router represented by a node is in operation, and may also represent the level of operability of the router or its links. This information may be used to route user data packets around faulty routers, or to wait for a router to become operable before sending user data packets.

The cost field 198 indicates the total cost of the route from the router represented by the root node 181 to the router represented by the node. This information is used when comparing two tentative nodes to determine which is closer to the root node 181. The cost information may be derived from one of many well known metrics. The cost is determined by adding the cost of the link from the parent node to a new child node to the cost of the parent node. The cost of the root node 181 is defined to be zero, or another predetermined value.

Fields 190 contain enough information to generate a routing tree from LSPs, and to forward user data packets along a path having the lowest cost according to the selected cost metric. However, as discussed above, the embodiment illustrated in FIG. 3 is complex because, if encapsulation is required, it is necessary for the Dijkstra algorithm also to specify which destination address needs to be used for the encapsulating header.

To this end, additional fields 200 are added to the node data structures. These fields contain information used in encapsulation, and are filled out as described below. Because single-protocol routers in FIG. 3 do not perform encapsulation, the single-protocol routers generate a routing tree having only the fields 190. However, dual-protocol routers in FIG. 3 also generate fields 200, because they perform encapsulation.

The encapsulation router (ER) field 202 indicates the name of the last router along the path to the router represented by the node which supports the encapsulating protocol. This is the router to which the encapsulating header should be addressed.

To clarify this idea, refer to the example of FIG. 3, where an OSI user data packet was being sent from OSI end system 155 to OSI end system 157. For the purpose of this example, assume that the lowest cost path passes from OSI-only router 154 through routers 162, 163, 159, 158, 164, 166, 170, and 156. Then dual-protocol router 162 must encapsulate the user data packet in an IP header, and address the IP header to dual-protocol router 164, because dual-protocol router 164 is the last router along the path which supports the IP protocol.

Now assume that the lowest cost path passes from OSI-only 154 through routers 162, 163, 159, 158, 164, 168, 170, and 156. In this case, dual-protocol router 162 must still encapsulate the user data packet in an IP header, but the header must be addressed to dual-protocol router 170, because router 170 is now the last router along the path which supports the IP protocol.

Note that alternative encapsulation methods are possible: for example, user data packets can be encapsulated to the first dual-protocol router along the path to the user data packet's destination. In this case, router 162 would address the IP encapsulation header to dual-protocol router 164. However, if the lowest cost path passed through router 168, router 164 would remove the header, determine that the user data packet should be forwarded through router 168, and then add a new encapsulation header addressed to dual-protocol router 170, and finally forward the user data packet to router 168. This method involves an additional encapsulation and decapsulation, which is avoided by sending the encapsulated user data packet to the "last capable router along the path".

Note that the "last capable router along the path" may simply be the last router along the path. For example, consider a user data packet being sent from OSI end system 155 to OSI end system 169. In this case, when dual-protocol router 162 encapsulates the user data packet in an IP header, the last capable router along the path will be dual-protocol router 164. Therefore, the encapsulation header should be addressed to dual-protocol router 164.

Furthermore, note that a dual-protocol router may not always need to encapsulate a user data packet. For example, consider an OSI user data packet being forwarded from OSI end system 155 to OSI end system 172. In this case, when the user data packet arrives at dual-protocol router 162, there is no need for encapsulation, and it can be simply forwarded in OSI format to router 167. Therefore, for some destination routers, there is no "last capable router along the path", simply because every router along the path is capable.

A value of "?" in the ER field indicates that the value for the "last capable router along the path" is not needed. This may be because, even though encapsulation is required, the last router along the path is the last capable router (as in the embodiment of FIG. 2A), or, alternatively, because encapsulation is not required.

Referring to FIG. 5A, as the routing tree is being generated, two flags are used to determine whether encapsulation is required, and which router "is the last capable router along the path". These flags are referred to as the IP flag 204 (which indicates whether the first router along the path is IP-capable) and the OSI flag 206 (which indicates whether the first router along the path is OSI-capable). These flags are used to determine the value of the ER field as the routing tree is built.

Figure 5B:
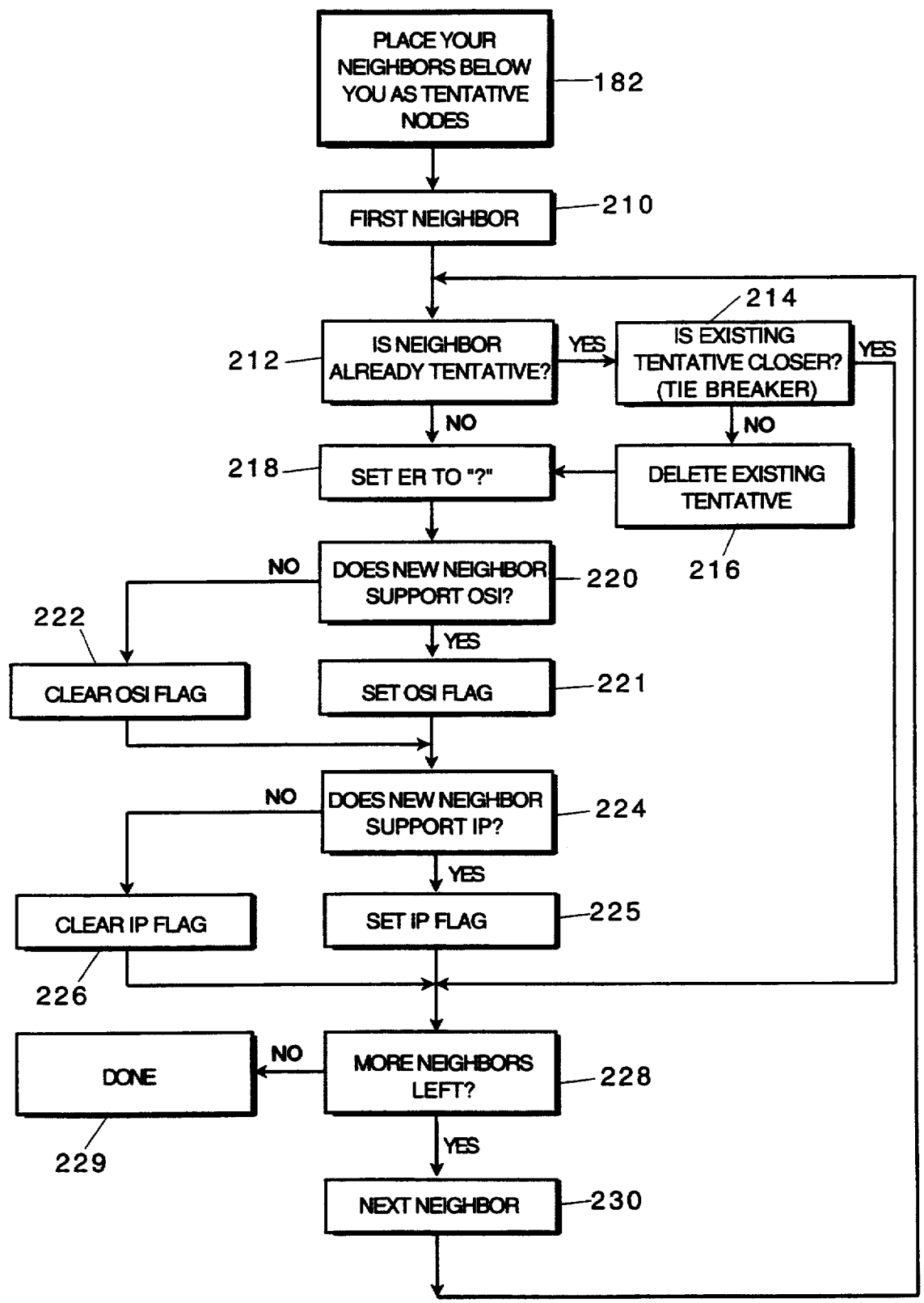
FIG. 5B is a flow diagram of an algorithm for initializing the routing trees in the dual-protocol routers of FIG. 3.

Referring to FIG. 5B, during step 182 of the Dijkstra algorithm, nodes for the routers neighboring the router generating the tree are added to the tree. For dual routers, this step involves updating the ER field and the OSI and IP flags. A loop is initialized 210 at the first neighbor, and for each neighbor, the loop analyzes 212 if the neighbor is already tentative. If there is not an existing tentative node for the neighbor, then a new tentative is added 218 to the tree. If there is a tentative node for the neighbor, then the cost of the known path to the neighbor (as represented by the tentative node) is compared 214 to the cost of the new path to the neighbor. If the new path is shorter, the existing tentative is deleted 216, and a new tentative is added 218 to the tree. If the new path is longer, then the new path is ignored by skipping to step 228. A tie-breaking mechanism is used to choose between paths having equal or near equal cost. (See the discussion of FIG. 5C below for a review of the considerations involved in tiebreakers).

When a node for the new neighbor is added 218 to the tree, the ER field for the new node is set to "?". This is because all of the nodes added to the routing tree in FIG. 5B are the immediate neighbors of the router generating the tree. For these nodes, the ER field will always be set to "?" because immediate neighbors are the only routers along the path to themselves, and thus must be the "last capable router along the path". That is, there is never a need to encapsulate user data packets which are destined to an immediately neighboring router, because the end system to which the user data packet is direct must be capable in the user data packet's protocol, and the neighbor must be capable in the protocol of the end system because the end system is connected to it.

After the ER field is set to "?" the IP and OSI flags are set for future use. If 220 the neighbor supports OSI, the OSI flag is set 221, otherwise the OSI flag is cleared 222. If 224 the neighbor supports IP, the IP flag is set 225, otherwise the IP flag is cleared 226.

After the node is created and the ER field and IP flag are initialized (or after it is determined in step 214 that a known path to the neighbor is shorter than the new path to the neighbor), the algorithm of FIG. 5B checks 228 whether there are additional neighbors that may be added to the tree. If not, the algorithm ends 229, otherwise, the algorithm moves 230 to the next neighbor and returns to step 212.

During each loop of the Dijkstra algorithm, the neighbors of a newly permanent node are added as tentative nodes below the newly permanent node (step 186, FIG. 4A). In the dual-protocol routers of FIG. 3, step 186 also involves manipulating the ER field and the IP flag.

Figure 5C:
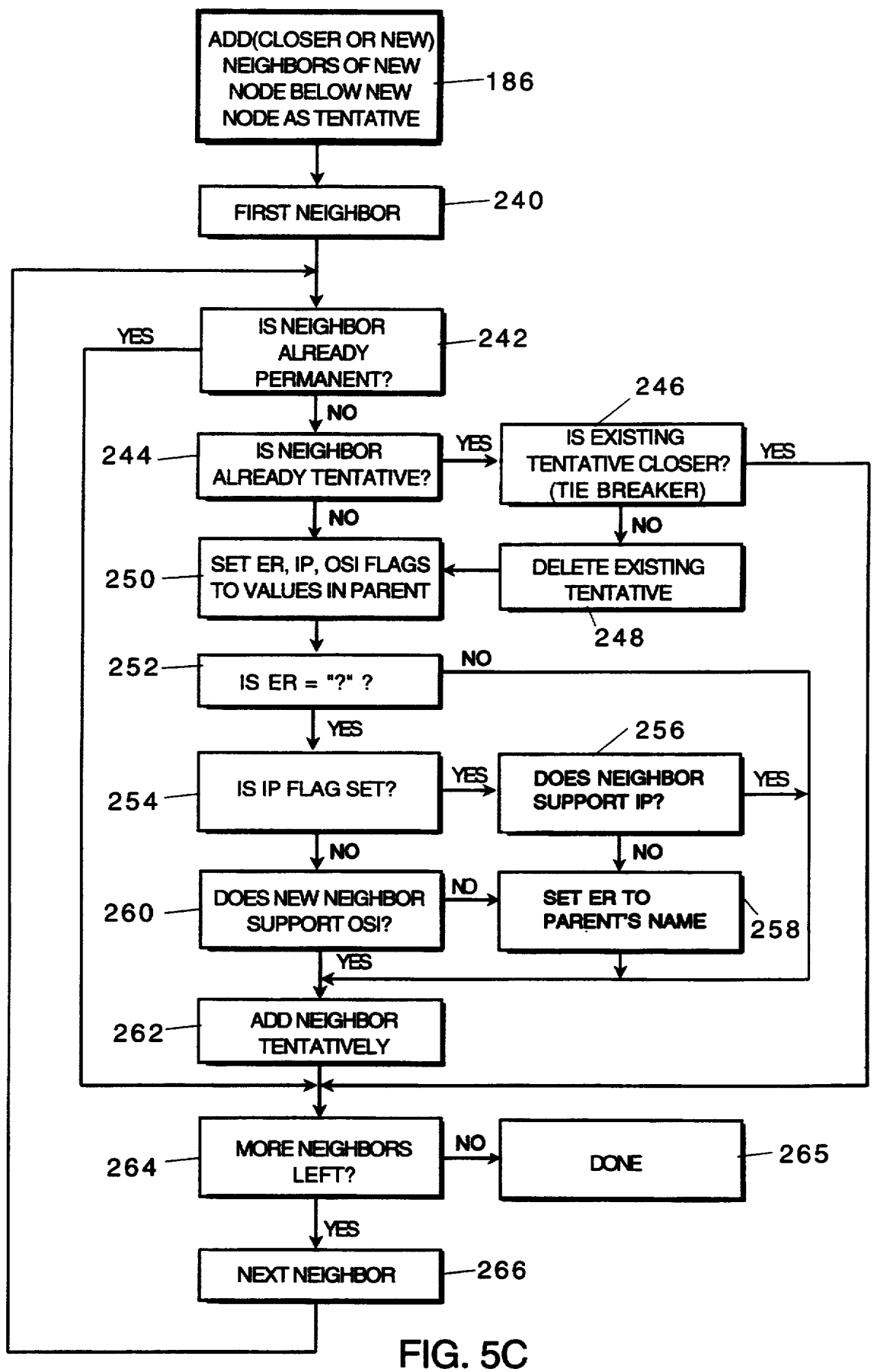
FIG. 5C is a flow diagram of an algorithm for building the routing trees in the dual-protocol routers of FIG. 3.

Referring to FIG. 5C, an algorithm for adding new tentative nodes forms a loop similar to that of FIG. 5B. The loop is initialized 240 at the first neighbor. For each neighbor, the loop checks 242 if the neighbor is already permanent on the routing tree. If the neighbor is already permanent on the routing tree, then the shortest path to the neighbor has already been located, and the new path is ignored by skipping to step 264. (Note that the algorithm of FIG. 5B does not check if nodes are already permanent because none could be permanent at that point in the Dijkstra algorithm).

However, if the neighbor is not already permanent, the loop checks 244 if a tentative node for the neighbor already exists. As in FIG. 5B, if no tentative node for the neighbor exists, a new tentative node for the neighbor is added 250. If a tentative node for the neighbor already exists, the loop checks 246 if the new path to the neighbor has a lower cost than the known path to the neighbor. If the known path is shorter, then the new path is ignored by skipping to step 264. Otherwise, the existing tentative is removed 248, and a new tentative is added 250.

A tiebreaking mechanism is used in step 246 to choose between paths of equal or near equal cost. However, this tiebreaking mechanism must be carefully selected, to avoid the possibility that routers between the source of an encapsulated user data packet and the destination of the user data packet disagree over the outcome of the tiebreak, and thus route the user data packet in a manner not anticipated by the encapsulating router. If a disagreement occurs, user data packets may accumulate more than one encapsulation header on the way to their destination.

For example, referring to FIG. 3, consider an OSI user data packet that is to be transmitted from OSI-only router 155 to OSI-only router 157. The user data packet is forwarded unencapsulated to dual-protocol router 162, at which point it must be encapsulated to travel through IP-only router 163. There are two paths from IP-only router 163 to dual-protocol router 164. The first path travels through IP-only routers 159 and 158, and the second path through dual-protocol router 174 and OSI-only router 160. Assume that these paths are very close in cost, and that dual-protocol router 162 has performed a tiebreaker to determine that the path through IP-only routers 158 and 159 should be used.

As a result, dual-protocol router 162 generates an IP encapsulation header addressed to dual-protocol router 170 (assume that the shortest path to OSI end system 157 passes through IP-only router 168, and thus dual-protocol router 170 is the last IP-capable router on the path to router 156). This IP header is prepended to the OSI user data packet, and the user data packet is forwarded to IP-only router 163.

On receipt of the IP user data packet addressed to router 170 (i.e., the encapsulated OSI user data packet), IP-only router 163 consults its routing tree. Assume that IP-only router 163 has also performed a tiebreaker to determine which path to use to forward user data packets toward dual-protocol router 164. However, IP-only router 163 has decided that the path through dual-protocol router 174 and OSI-only router 160 should be used. Therefore, on receipt of the IP user data packet addressed to router 170, IP-only router 163 forwards the user data packet to dual-protocol router 174.

Dual-protocol router 174, on receipt of the IP user data packet addressed to router 170, also consults its routing tree. Its routing tree indicates that the best path to router 170 is through OSI-only router 160, dual-protocol router 164, and IP-only router 168. Therefore, not realizing that the received IP user data packet is in fact an encapsulated OSI user data packet, dual-protocol router places an OSI encapsulation header on top of the IP encapsulation header already present on the user data packet. This second encapsulation header is addressed to router 164 because router 164 is the last OSI capable router along the path to router 170. The doubly-encapsulated user data packet is then forwarded to router 160.

OSI-only router 160 then forwards the doubly-encapsulated user data packet to dual-protocol router 164. Dual-protocol router 164, recognizing the user data packet as addressed to its dummy encapsulation address, removes the outer OSI header, and analyzes the inner encapsulation header, which is addressed to router 170. Dual-protocol router 164 then consults its routing tree, and determines that the best route to dual-protocol router 170 is through IP-only router 168. As the user data packet is already formatted in IP, it is forwarded without encapsulation to router 168. Router 168 then forwards the user data packet to router 170, which removes the IP encapsulation header and forwards the OSI user data packet to router 156 and from there to OSI end system 157.

The difficulty with the above scenario is that the OSI user data packet accumulated two encapsulation headers in the course of its transmission. This increases the overhead at the dual-protocol routers, and also increases the load on the links because the user data packet size is larger. The extra headers were caused by the fact that two of the routers in the network (in particular, routers 162 and 163) disagreed on how to break a tie between equal cost paths. Thus, to prevent extra headers, the tiebreaking algorithm must be consistent, i.e., all of the routers in the network must agree on which path wins a tie. (See the discussion of FIG. 6 below for a description of other ways that tiebreak algorithms that are not consistent can also be used,)

One consistent tiebreaking mechanism breaks ties based on the names of the routers involved in the paths. For example, consider the case where two paths through the network join at router A, and the two paths have equal (or near equal) cost. On the first path, the router just before router A is router B, and on the second path, the router just before router A is router C. This tie is broken by comparing the names of routers B and C, for example, the tie can be broken in favor of the path passing through router B because B is alphabetically prior to C. (Router names may be interpreted as multi-bit characters or as binary strings; in either case the names are unique and can be used to break ties.)

In the algorithm of FIG. 5C, when two paths join, one of the paths is chosen at step 246. For example, consider the following sequence of events: first, a node representing router C is made permanent on the routing tree, and a node representing router A is then added as a tentative node below the node representing router C. Later, a node representing router B is made permanent on the routing tree, and the algorithm of FIG. 5C attempts to add a node representing router A below the node representing router B. The algorithm would then notice (at step 244) that there is already a tentative node for router A, and would compare (at step 246) the cost of the known path to the existing tentative (i.e., the path through C) to the cost of the new path (i.e., the path through B). Noting that these paths are equal (or nearly equal), the algorithm then breaks the tie by comparing the names of two parents. Because the parent of the existing tentative is router C, whereas the parent of the new tentative would be router B, the algorithm breaks the tie in favor of the new path, and continues to step 248.

Note that all of the routers in the network will break ties in the same way if the above mechanism is used, and therefore, assuming that the LSPs are reliably propagated to all routers, all of the routing trees will be consistent. Also, note that this mechanism cannot be used in FIG. 5B because, in FIG. 5B, all of the routers added directly neighbor the router generating the routing tree, and thus the "parents" of the two tentative nodes are the same. However, the tiebreaking mechanism used in FIG. 5B may be selected at will (for example, it may be random) because there are no routers between the source and destination that could disagree over the outcome of the FIG. 5B tiebreakers.

Returning to FIG. 5C, when a new tentative node is added 250, the ER field, IP and OSI flags are initialized to their values in the parent of the new tentative node. This is done so later comparisons can determine whether the "last capable router along the path" has been located. First, the loop checks 252 if the ER field is set to "?". If not, then the "last capable router along the path" has already been located, and there is no need for further analysis, so the loop skips to step 262. However, if the ER field is set to "?" then the loop analyzes if the "last capable router along the path" has now been located.

To determine if the "last capable router along the path" has been located, the loop first checks 254 if the IP flag is set If the IP flag is set and the ER field is "?" it indicates that all of the routers along the path from the router generating the tree to the router which is currently being added to the tree are IP-capable routers. This continuous chain of IP-capable routers will be broken only if the router currently being added to the tree is not IP-capable. Therefore, if the IP flag is set, the loop checks 256 if the neighbor currently being added to the tree is IP-capable—if it is, then the chain of IP-capable routers remains unbroken, and the loop skips to step 262. However, if the router currently being added to the tree does not support IP, the chain of IP-capable routers has been broken, and the "last capable router along the path" is the parent of the new tentative node (i.e., the node most recently made permanent in step 184, FIG. 4A). Therefore, the ER field is set 258 to the name of the parent of the new tentative node.

Similarly, if the IP flag is cleared, then the OSI flag must be set (because the IP flag will only be cleared if the first router along the path was OSI-only) o If the IP flag is cleared and the ER field is "?" it indicates that all of the routers along the path from the router generating the tree to the router which is currently being added to the tree are OSI-capable routers. This continuous chain of OSI-capable routers will be broken only if the router currently being added to the tree is not OSI-capable. Therefore, if the IP flag is cleared, the loop checks 260 if the neighbor currently being added to the tree is OSI-capable—if it is, then the chain of OSI-capable routers remains unbroken, and the loop skips to step 262. However, if the router currently being added to the tree does not support OSI, the chain of OSI-capable routers has been broken, and the "last capable router along the path" is the parent of the new tentative node (i.e., the node most recently made permanent in step 184, FIG. 4A). Therefore, the ER field is set 258 to the name of the parent of the new tentative node.

Note that, if the first router along the path is a dual-protocol router, no encapsulation is necessary, and both the OSI and IP flags will be set. However, the above algorithm will treat this case as if the first router along the path were IP-only; i.e., the algorithm will set the ER field to the last IP-capable router on the path. However, as encapsulation will not be done, this value will never be used, and it is merely an artifact of the algorithm's implementation. Alternative algorithms could avoid determining a value for ER when the first router on the path is dual-protocol. For example, a "dual" flag, indicating whether the first router on the path was dual-protocol, could be added to the node data structure—this flag could then be checked before any other tests were made, and the tests skipped if the flag is set. The same function could be achieved without storing an additional flag by simply checking if both the IP and OSI flags are set, and skipping the rest of the operations if they are. However, these alternative algorithms involve data storage and true/false comparisons not required by the algorithm presented.

After the ER field is modified as appropriate, a new tentative node for the neighbor is added 262 to the routing tree. Then (or after it is determined in either steps 242 or 246 that a better path to the neighbor is already known) the algorithm checks 264 whether there are additional neighbors that may be added to the tree. If not, the algorithm ends 265, otherwise, the algorithm moves 266 to the next neighbor and returns to step 242.

The above algorithms are used by the dual-protocol routers of FIG. 3 to generate their routing trees. The single protocol routers of FIG. 3 do not encapsulate user data packets, and thus do not include the fields 200 (FIG. 5A) in their routing tree, and do not perform the more complex algorithms of FIGS. 5B and 5C to form their routing trees.

The single-protocol routers of FIG. 3 receive and forward user data packets in accordance with the algorithms of FIG. 1B and 1C. The dual-protocol routers of FIG. 3 receive user data packets in accordance with the algorithm of FIG. 2B, and forward user data packets (step 126, FIG. 2B) in accordance with the algorithm of FIG. 6.

Figure 6:
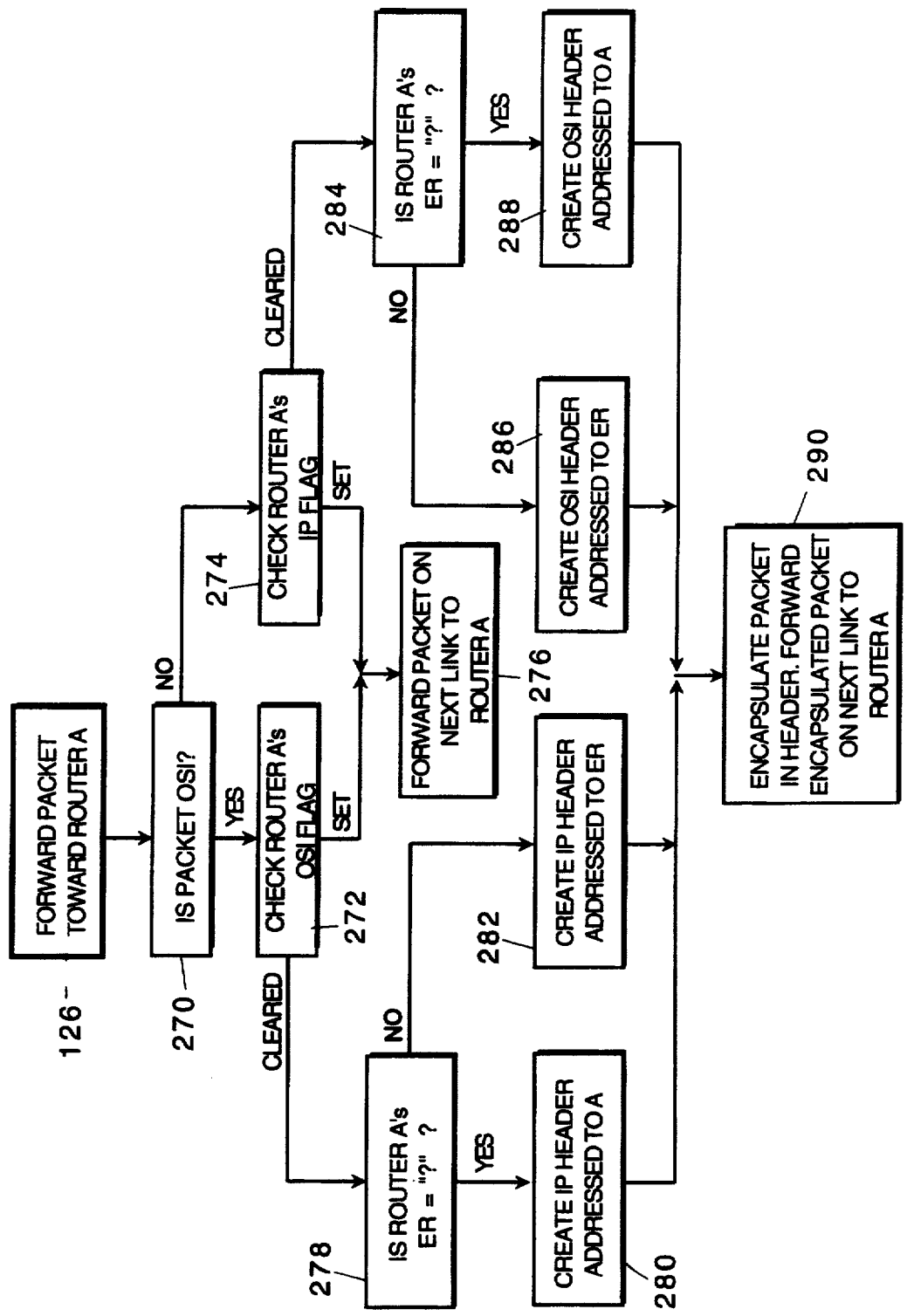
FIG. 6 is a flow diagram of the user data packet forwarding algorithm to be followed by the dual-protocol routers of FIG. 3.

Referring to FIG. 6, when a user data packet is to be forwarded from a dual-protocol router, the router first determines 270 if the user data packet is OSI. If the user data packet is OSI, the OSI flag of the node in the routing tree which represents router A is checked 272. If the user data packet is not OSI, the IP flag of the node in the routing tree which represents router A is checked 274. If the respective flag is set at step 272 or step 274, then the first router along the path to router A is capable in the protocol of the user data packet, and that the user data packet is forwarded unencapsulated at step 276.

However, if the respective flag is not set at step 272 or 274, then the first router along the path to router A is not capable in the protocol of the user data packet. Therefore the user data packet must be encapsulated.

If the user data packet is OSI and router A's OSI flag is not set, then the algorithm checks 278 if router A's ER is set to "?" If ER is "?" then there is no encapsulation router (as discussed above), and the user data packet can be encapsulated directly to router A. Therefore, if ER is "?" an IP encapsulation header addressed to router A is generated 280. Otherwise, an IP encapsulation header addressed to the encapsulation router is generated 282.

Similarly, if the user data packet is IP and router A's IP flag is not set, then the algorithm checks 284 if router A's ER is set to "?" If ER is "?" then there is no encapsulation router (as discussed above), and the user data packet can be encapsulated directly to router A. Therefore, if ER is "?" an OSI encapsulation header addressed to router A is generated 280. Otherwise, an OSI encapsulation header addressed to the encapsulation router is generated 282.

After the encapsulation header is generated, the user data packet is encapsulated 290 in the header, and the encapsulated user data packet is forwarded on the next link to router A.

As described above, if an inconsistent tiebreaking mechanism (such as a random mechanism) is used in generating the network's routing trees, there is the possibility that user data packets gain multiple encapsulation headers as they are forwarded through the network.

One way to avoid this situation is to modify the forwarding algorithm of FIG. 6 so that, before user data packets are encapsulated, the algorithm checks whether the user data packet is already encapsulated. If there is already an encapsulation header on the user data packet, and the encapsulation header is incompatible with the next router's protocol, the user data packet can be made compatible by simply removing the previous encapsulating header, instead of adding a second header. In this way, multiple encapsulations can be avoided even where inconsistent tiebreaking mechanisms are used.

For this scheme to be feasible, there must be a mechanism for marking user data packets so that they can be recognized as encapsulated user data packets.

One way this can be done is to check if the user data packet is addressed to a "dummy address". (The dummy address appears in a predetermined position of the LSPs, and thus can be distinguished from real addresses.)

Another way this can be done is by marking all encapsulated user data packets so they may be immediately recognized as such. User data packets can be marked in several ways, depending on the encapsulating protocol. OSI user data packets can be marked by reserving one of the possible values of the 8473 select field ("SEL"). When the SEL field is set to this reserved value, it is an indication that the OSI header is encapsulating another user data packet. TCP/IP user data packets can be marked by reserving one of the possible values of the IP "User Protocol" field, which appears in an IP user data packet header. Again, when the User Protocol field is set to this reserved value, it is an indication that the IP header is encapsulating another user data packet.

The routing trees in the network may disagree even if a consistent tiebreaking algorithm is used. For example, the network topology (particularly the location or cost of links) may change, and while the changes are being propagated (via new LSPs) to all of the routers in the network, the routing trees of the various routers will be inconsistent. As a result, user data packets may temporarily follow loops in the network, and may accumulate extra encapsulation headers. Temporary packet looping is a well-known side effect of topological changes, and will occur regardless of whether the network uses dual protocols. However, the accumulation of extra encapsulation headers is an effect peculiar to dual-protocol networks, and can be avoided by the modification of the FIG. 6 algorithm described above.

The above embodiments, which support two protocols, may be enhanced to support three or more protocols. Because of their topological restrictions and resulting simplicity, it is most straightforward to add a third protocol (which will be referred to as "P3") to the per-area embodiments of FIGS. 1A and 2A. However, it is more complex to add a third protocol to the less restricted embodiment of FIG. 3.

To adapt the FIG. 1A embodiment for a third protocol, areas routing in the third protocol may simply be added to the network, and the Level-2 backbone reconfigured to support all three protocols (if routing in the third protocol is not allowed outside of the local areas, this latter step is not necessary). Note that, with three protocols, there are four possible types of multi-protocol routers: OSI-IP dual-protocol routers, OSI-P3 dual-protocol routers, IP-P3 dual-protocol routers, and OSI-IP-P3 triple-protocol routers. However, as in the two protocol embodiment illustrated in FIG. 1A, all routers in a given area must have the same capabilities -thus an area having an OSI-P3 dual-protocol router cannot also have an IP-P3 dual-protocol router, because their capabilities are not the same, even though both are dual-protocol.

Subject to the above, a third protocol may be easily added to the FIG. 1A architecture. Encapsulation is not required, for the same reasons as set forth in the discussion of FIG. 1A, and thus all of the multi-protocol routers are "simple". The algorithms described by the flow charts of FIGS. 1B and 1C are implemented by each of the routers in the network to receive and forward user data packets.

The embodiment illustrated in FIG. 2A may also be adapted for a third protocol. In FIG. 2A, all routers in a local area must be capable in at least one common protocol. Thus, the FIG. 2A network may be adapted for a third protocol by adding IP-P3 dual-protocol routers to the existing IP areas (e.g., area 139), by adding OSI-P3 dual-protocol routers to the existing OSI areas (e.g., area 137), and/or by adding new P3 areas, which may have P3-only routers and/or any other P3-capable routers. In either embodiment, the Level-2 backbone may support all three protocols, or may support only one or two of the protocols if the unsupported protocols is not allowed outside of the local areas. Furthermore, the Level-2 backbone may be a mixture of triple-protocol, dual-protocol and single-protocol routers, as long as the Level-2 routers can correctly receive user data packets from their local areas and forward them appropriately. Furthermore, as encapsulation is required in the FIG. 2A architecture, all multi-protocol routers are "enhanced".

In a three protocol embodiment of the FIG. 2A network, the single-protocol routers use the routing and forwarding algorithms of FIGS. 1B and 1C, and the multi-protocol routers (e.g., IP-OSI, IP-P3, OSI-P3, and IP-OSI-P3 routers) use the receiving and forwarding algorithms of FIGS. 2B and 2C. If the network has P3 areas (i.e., areas where all routers must support P3), then step 134 of FIG. 2C is modified to check if the area is a P3 area; subsequent additional steps check if the user data packet is a P3 user data packet (by operations analogous to those of steps 136 and 142) and, if not, encapsulate the user data packet in a P3 header (by operations analogous to those of steps 138 and 144).

The topological restrictions of the above three protocol embodiments simplify the receiving and forwarding algorithms. However, they also make the network less flexible. Therefore, in another embodiment, a three protocol network is formed with fewer topological restrictions. The legend of FIG. 7A illustrates the icons used to represent routers in these three protocol networks. Triangles are used to represent P3 routers and end systems. The icons for the 7 different router types are illustrated in the legend, namely: IP-only, OSI-only, P3-only, IP-OSI dual-protocol, P3-OSI dual-protocol, P3-IP dual-protocol, and P3-IP-OSI all-protocol.

In the embodiment illustrated in FIG. 3, routing was performed in a two protocol network having no topological restrictions (with the exception that two incompatible single-protocol routers could not be connected together, a restriction which applies to every multi-protocol network, and is enforced by implementing one of the link initialization processes as described above). However, the algorithms used to route in FIG. 3 do not support routing in three protocol networks. The reasons are for this are clarified in the discussion of FIG. 7A below.

The embodiment of FIG. 7A is a three protocol network having no topological restrictions. Each router has a common protocol with its neighboring routers, and thus the links between the routers initialize. Routing in this network is quite complex.

Consider an IP user data packet which is to be routed from IP end system 300 to IP end system 302 via the network of routers 304, 306, and 308. The IP user data packet is first forwarded from end system 300 to router 304. Router 304 must then forward the user data packet to router 306. However, router 306 is not IP-capable. The only protocol supported by both routers 304 and 306 is P3, therefore, the user data packet must be encapsulated in a P3 header before it is forwarded to router 306.

The P3 encapsulation header must be addressed to a P3 address. However, only P3-capable routers, i.e., routers 304 and 306, have P3 addresses. Thus, the P3 encapsulation header must be addressed to either router 304 or router 306. Clearly, the header should not be addressed to router 304, as router 306 would then simply return the user data packet to router 304, and no progress will be made. The only other choice is to address the header to router 306.

Therefore, the P3 header is addressed to router 306, and the user data packet is forwarded to router 306. However, on receiving the encapsulated user data packet, router 306 has no information on how to forward the user data packet. When router 306 receives the user data packet, router 306 recognizes it as an encapsulated user data packet, because it is addressed to the dummy P3 address advertised by router 306. Therefore, router 306 removes the user data packet's header and attempts to interpret its contents. However, because router 306 does not support IP, it cannot interpret the encapsulated contents (i.e., the IP user data packet), and therefore has no idea how to forward them.

One possible solution to the above problem is to program all routers so that, if a user data packet is decapsulated and the contents are found to be unintelligible, the contents of are blindly forwarded on one of the links connected to the router, preferably on a link other than the one on which the user data packet was received. If router 306 used such a strategy, it would choose at random between the link to router 308, the link to router 310, and the link to router 312, and forward the contents. Using such a strategy, in the architecture of FIG. 7A, there is a 67% probability that the user data packet will arrive at the IP end system 302, because there is a 33% chance that it will be forwarded to router 308, which can deliver it to end system 302, and there is a 33% chance that it will be forwarded to router 312, which is IP-capable, and can interpret the user data packet and to forward it to router 308. However, there also is a 33% probability that the user data packet would be lost, because if the user data packet is forwarded to OSI-only router 310, it will not be recognized, and will be simply discarded.

Note that, depending on the information available from the common LSP format, router 306 may be able to determine that routers 308 and 312 support protocols not supported by router 306 (and conversely know that router 310 does not support any other protocols). Router 306 can make 62 use of this type of information by choosing to send the unknown encapsulated user data packet to either router 308 or 312, and not to router 312. The logic for this is as follows: routers 308 and 310 at least understand a protocol not understood by router 306, therefore, they have a chance of understanding a user data packet which is unintelligible to router 306. However, router 310 does not understand any protocols not understood by router 306, and thus does not have any chance of understanding the user data packet. Using this type of elimination process, the reliability of a three-protocol networks having no topological restrictions can approach 100%.

The above mechanism is less useful for four- or more protocol networks. In a three-protocol network, there is only one protocol not known by the dual-protocol routers from the perspective of the dual routers, if another router supports an "unknown" protocol, this unknown protocol must be the same protocol as that of an unintelligible user data packet. However, this reasoning only applies to four- or more protocol networks if all of the multi-protocol routers support all but one of the protocols. For example, in a four-protocol network, a user data packet that is unintelligible to a triple-protocol router must be in the one protocol not supported by the triple-protocol router. However, a user data packet that is unintelligible to a dual-protocol router may be in one of two protocols.

Another mechanism for dealing with the user data packet forwarding problems of FIG. 7A is to program all routers so that, if a user data packet is decapsulated and its contents are unintelligible, the contents are blindly forwarded on all of the links connected to the router (except the link on which the user data packet was received). Using this strategy, there is a 100% probability that the user data packet will arrive at its destination. However, there is also a probability that the user data packet will arrive more than once. For example, if the IP user data packet was sent to router 308 and router 312, both would be able to interpret its contents, and both copies would eventually be forwarded to end system 302. Such multiplicity of user data packets is likely to be undesirable.

Figure 7B:
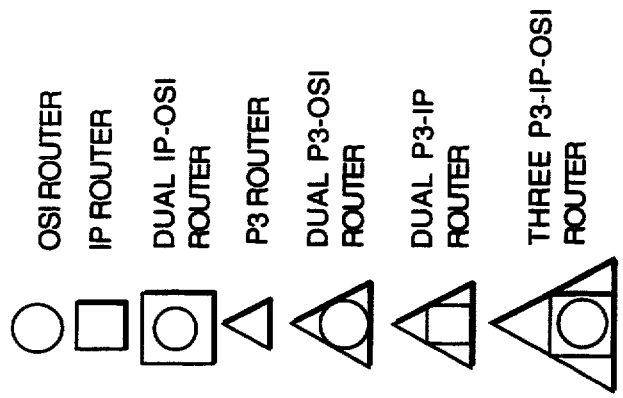
FIG. 7B illustrates a three-protocol network having an all-protocol router.
Figure 7B:
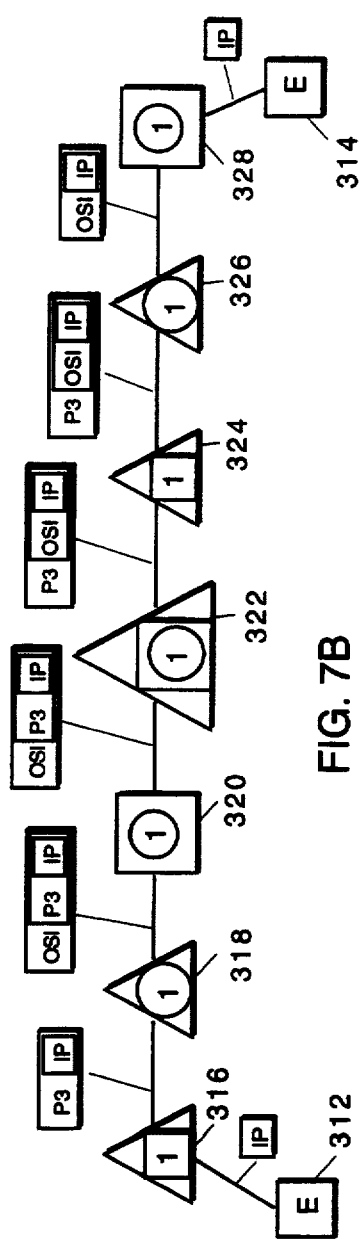
Figure 7A:
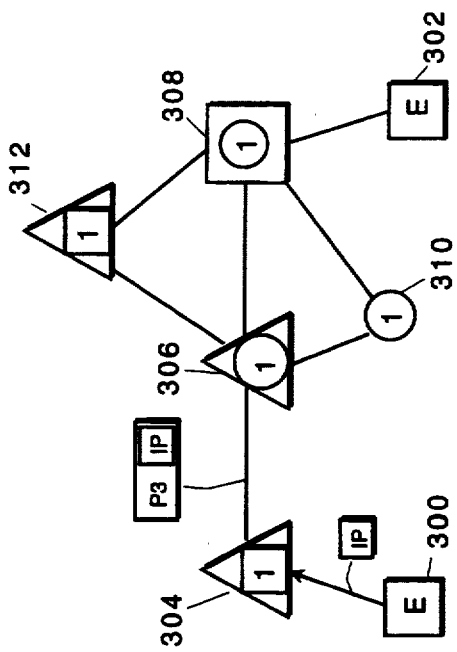
FIG. 7A illustrates a three-protocol network which does not have an all-protocol router.

To avoid the above difficulties, the embodiment of FIG. 7B establishes one topological restriction: there must be at least one all-protocol router in each area. When a user data packet needs to be encapsulated, it is addressed to one of the all-protocol routers in the area (the all-protocol router has an address in all of the protocols).

On receipt of an encapsulated user data packet, the all-protocol router removes the encapsulation header(s) from the user data packet, and determines which encapsulation headers should be added for the user data packet to arrive at its destination.

This procedure may best be explained by example. Consider an IP user data packet sent from IP end system 312 to IP end system 314. The user data packet is first forwarded from IP end system 312 to router 316. Router 316 uses its routing tree to determine that the user data packet should be forwarded to router 318. However, router 318 is not IP-capable. Therefore, router 316 encapsulates the user data packet in a P3 header (P3 being the common protocol between router 316 and router 318), addresses the header to all-protocol router 322, and forwards the encapsulated user data packet to router 318.

When it receives the user data packet, router 318 uses its routing tree to determine that the user data packet (which is addressed to the OSI address of all-protocol router 322) should be forwarded to router 320. However, router 320 is not P3-capable. Therefore, router 318 encapsulates the user data packet in an OSI header (OSI being the common protocol between router 318 and router 20), addresses the header to all-protocol router 322, and forwards the encapsulated user data packet to router 320.

Similarly, when router 320 receives the user data packet, it uses its routing tree to determine that the user data packet (which is addressed to the OSI address of all-protocol router 322) should be forwarded to router 322. Router 322 is OSI-capable, therefore, router 320 forwards the user data packet to router 322.

When router 322 receives the user data packet, it first interprets the OSI header, and determines that it is addressed to the dummy OSI address of router 322, i.e., to itself. Therefore, it removes the OSI header, and interprets the contents (which is a P3 header). It then determines that this header is similarly addressed to the dummy P3 address of router 322. Therefore, it removes the P3 header, and interprets the contents (which is the original IP user data packet).

The original IP user data packet is addressed to end system 314. Router 322 reviews its recently-received link state packets, and determines that to reach end system 314, the user data packet should be forwarded to router 328. Next, router 322 reviews the path that the user data packet will-follow to router 328, and determines that OSI and P3 encapsulation headers need to be added to the user data packet. Therefore, router 322 generates an OSI encapsulation header, addressed to router 328, and adds this to the user data packet. Next, router 322 generates a P3 encapsulation header, addressed to router 326, and adds this to the user data packet. The doubly encapsulated user data packet is then forwarded to router 324.

When it receives the user data packet, router 324 uses its routing tree to determine that the user data packet (which is addressed to the P3 address of router 326) should be forwarded to router 326. Router 326 is P3-capable, therefore, router 324 forwards the user data packet to router 326.

When router 326 receives the user data packet, it first interprets the P3 header, and determines that it is addressed to the dummy P3 address of router 326, i.e., itself. Therefore, it removes the P3 header, and interprets the contents (which is an OSI header). Router 326 then uses its routing tree to determine that the user data packet (which is addressed to the OSI address of router 328) should be forwarded to router 328. Router 328 is OSI-capable, therefore, router 326 forwards the user data packet to router 328.

When router 328 receives the user data packet, it first interprets the OSI header, and determines that it is addressed to the dummy OSI address of router 328, i.e., to itself. Therefore, it removes the OSI header, and interprets the contents (which is the original IP user data packet). Router 328 then determines that the IP user data packet is addressed to end system 314, which is attached to router 328. Therefore, router 328 delivers the user data packet to end system 314.

To implement the above strategy, the information stored by the routers is somewhat different than that stored by the routers of FIG. 3. In particular, referring to FIG. A, the additional fields 200 in the nodes of the routing trees in the dual-protocol routers are somewhat different from those of FIG. 4B. In particular, each node includes an OSI flag 330, an IP flag 332, and a P3 flag 334.

If the OSI flag 330 is set in a particular node, it indicates that there is an unbroken chain of OSI-capable routers between the router storing the routing tree and the router represented by the node. If the OSI flag is cleared, this is not the case. The IP flag 332 and P3 flag 334 indicate similar conditions relative to IP-capable and P3-capable routers.

These flags are set or cleared as appropriate as the routing tree is generated. In step 182 of FIG. 4A, the neighbors of the router forming the routing tree are placed below the root node. Referring to FIG. 8B, this operation is performed by a loop, which is initialized at the first neighbor (step 340) and sequences to each new neighbor (step 362) until all of the neighbors have been processed (step 360), at which point the loop terminates (step 364).

Each neighbor is checked to see if a tentative node for the neighbor already exists (step 342). If not, a new node is added by sequencing to step 348. If a tentative node already exists, then the cost of the existing path is compared to the new path (step 344). If the new path is shorter, the old tentative is deleted (step 346) and the new tentative is added by sequencing to step 348. If the new path is longer, the new path is ignored by sequencing to step 360.

As in FIG. 5B, any tiebreaking mechanism may be used in step 344, as all of the nodes added in FIG. 8B represent routers which are the immediate neighbors of the router that is generating the routing tree.

Three tests are made in the main portion of the loop of FIG. 8B. First, if (step 348) the new neighbor supports OSI, the OSI flag in the neighbor's node is set (step 350), otherwise it is cleared (step 349). Second, if (step 352) the new neighbor supports IP, the IP flag in the neighbor's node is set (step 354), otherwise it is cleared (step 353). Third, if (step 356) the new neighbor supports P3, the P3 flag in the neighbor's node is set (step 358), otherwise it is cleared (step 357).

Thus, each neighbor of the router generating the routing tree is added to the routing tree with an indication of the protocols it supports.

Referring to FIG. 5C, as additional neighbors are added to the routing tree in step 186 of FIG. 5C, the OSI, IP, and P3 flags are updated. The operations of step 186 form a loop, which is initialized at the first neighbor (step 370) and sequences to each new neighbor (step 406) until all of the neighbors have been processed (step 402), at which point the loop terminates (step 404).

For each neighbor, the algorithm determines whether a permanent node for the neighbor already exists in the routing tree (step 372); if so, the neighbor is skipped by sequencing to step 402. Otherwise, the algorithm determines whether a tentative node for the neighbor already exists (step 374). If not, a new node is added by sequencing to step 380. If a tentative node already exists, then the cost of the existing path is compared to the new path (step 376). If the new path is shorter, the old tentative is deleted (step 378) and the new tentative is added by sequencing to step 380. If the new path is longer, the new path is ignored by sequencing to step 402.

As in FIG. 5C, a consistent tiebreaking mechanism must be used in step 376.

The flags in the new node for the neighbor are initially set to the values in the node's parent (step 380). However, the values of the flags are adjusted by three tests. In the first test, the algorithm checks if the OSI flag is set (step 382). If the OSI flag is set, it indicates that all of the routers on the path from the router generating the tree to the new neighbor are OSI-capable. In this case, the algorithm determines whether the chain of OSI-capable routers ends at the new neighbor, by determining whether the new neighbor supports OSI (step 384). If the new neighbor does not support OSI, the chain has broken, and the OSI flag is cleared (step 386). Otherwise, the chain remains intact, and the algorithm performs similar operations to determine the settings of the IP flag (steps 388, 390, 392) and the P3 flag (steps 394, 396, 398).

Figure 9:
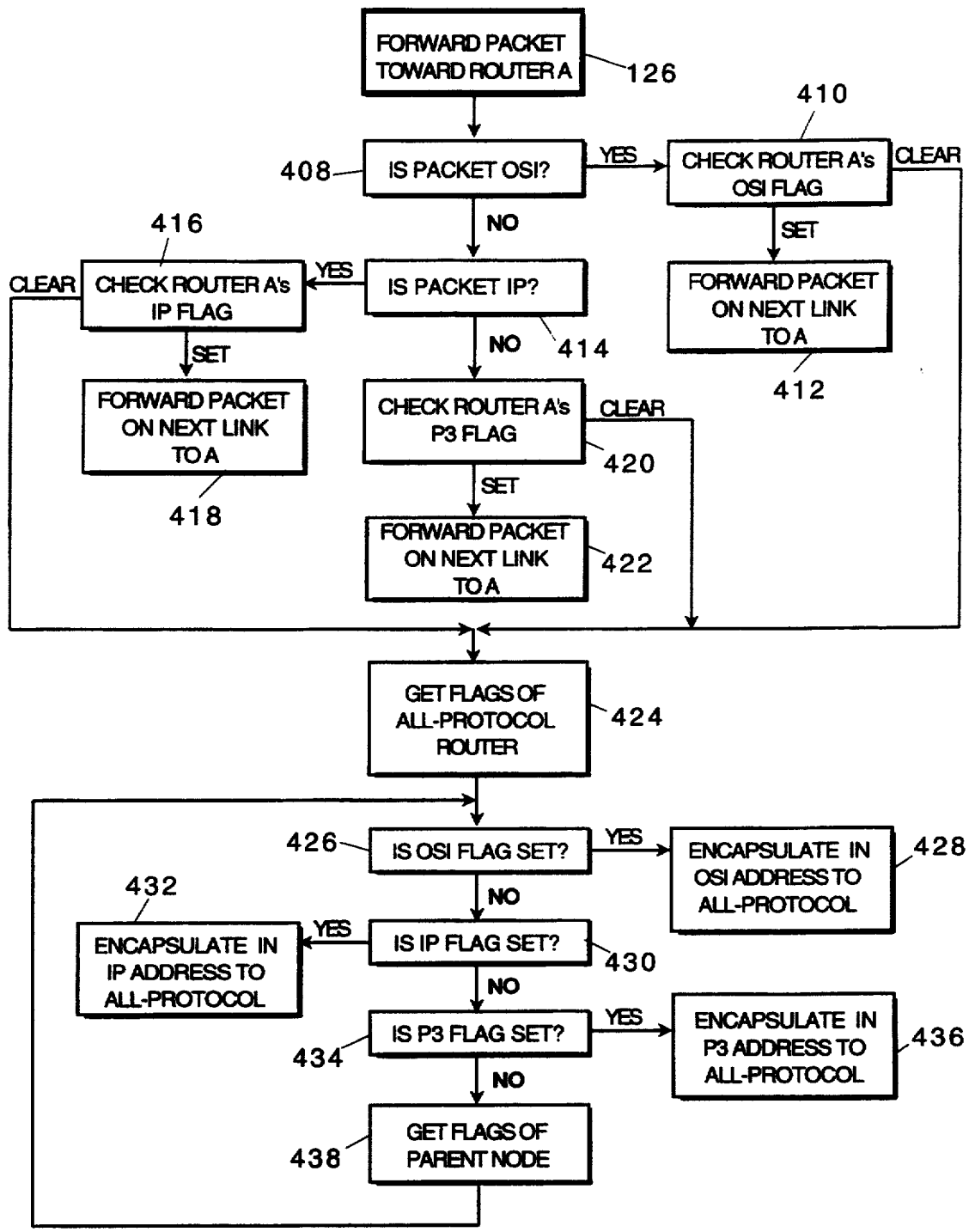
FIG. 9 is a flow diagram of the user data packet forwarding algorithm to be followed by the dual-protocol routers of FIG. 7B.

As a result of the operations described above, the OSI, IP, and P3 flags in each node of the routing tree indicate whether all of the routers leading to that node support OSI, IP, and P3, respectively. This information is used by the routers when forwarding user data packets, as illustrated in FIG. 9. (Note that algorithm of FIG. 9 includes tests which relate to all three of the protocols. However, routers which do not support one of the protocols will never forward user data packets in the unsupported protocol, and thus may eliminate the tests and results that relate to the protocol they do not support.)

When a user data packet is to be forwarded toward a router A (step 126, FIG. 2B), the dual-protocol routers of FIG. 7B first check the user data packet type. If (step 408) the user data packet is OSI, the algorithm checks if the OSI flag of the node for router A is set (step 410). That is, it checks if all of the routers on the path to router A support OSI. If this is the case, the user data packet does not need to be encapsulated, and it may be sent directly on the next link to router A (step 412). However, if the OSI flag is not set, it indicates that the user data packet will have to be encapsulated. Therefore, the algorithm proceeds to send the user data packet to an all-protocol router, by sequencing to step 424.

If the user data packet is not OSI, similar steps are performed to determine whether the user data packet is IP (step 414), and if so, whether (step 416) it is to be encapsulated, or sent directly (step 418). If the user data packet is not OSI or IP, the algorithm assumes that it is P3, and checks if (step 420) it is to be encapsulated, or sent directly (step 422).

As described above, user data packets that must be encapsulated are sent to an all-protocol router. To accomplish this, the user data packet is enclosed in an encapsulation header addressed to one of the all-protocol routers in the network. The encapsulation header must be included even if it is not necessary for protocol compatibility, because the encapsulation header effectively changes the address of the user data packet to that of the all-protocol router.

The protocol of the encapsulation header is chosen so that the encapsulated user data packet travels as far as possible before it needs to be encapsulated again. To accomplish this, the algorithm first retrieves the OSI, IP, and P3 flags of the desired all-protocol router (step 424). (In one embodiment, the closest all-protocol router is used; the closest all-protocol router may be located during the creation of the routing tree.)

If (step 426) the OSI flag of the desired all-protocol router is set (indicating that all of the routers on the path to the desired all-protocol router support OSI), an OSI encapsulation header is used (step 430). However, If the OSI flag is not set, then the IP flag is checked (step 430) If the IP flag is set (indicating that all of the routers on the path to the all-protocol router support IP), an IP encapsulation header is used (step 432). Finally, if (step 434) the P3 flag is set, a P3 encapsulation header is used (step 436).

If none of the flags of the node representing the desired all-protocol router are set, it indicates that no protocol is supported by all of the routers on the path to the all-protocol router. Thus, the user data packet will have to be encapsulated again before it arrives at the all-protocol router. To determine which protocol to use for the encapsulation header, the algorithm retrieves the OSI, IP, and P3 flags of the parent of the node representing the desired all-protocol router, i.e., the flags of the router which is one step closer along the path to the all-protocol router. If any of the flags of this node are set (steps 426, 430, 434), the user data packet is encapsulated in the appropriate protocol. If none of the flags are set, the algorithm steps to the next closer node (step 438). This process continues until a node with at least one flag set is located, at which point the encapsulation protocol is determined, and the user data packet is forwarded.

Figure 8A:
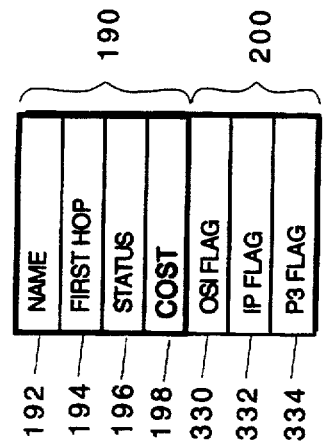
FIG. 8A is a diagram of a data structure of the routing tree of FIG. 4B as used in a dual-protocol router of FIG. 7B.
Figure 8B:
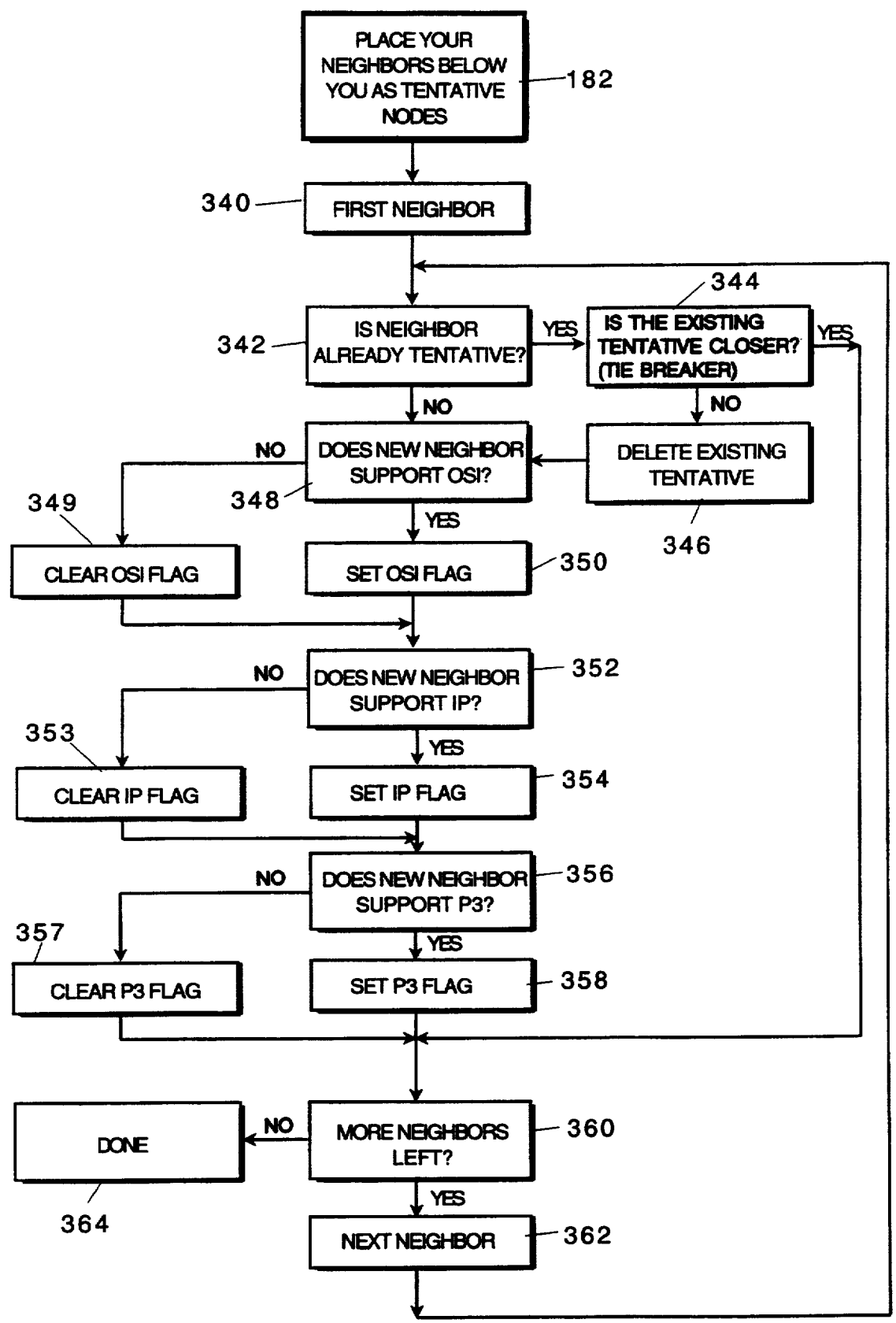
FIG. 8B is a flow diagram of an algorithm for initializing the routing trees in the dual-protocol routers of FIG. 7B.
Figure 8C:
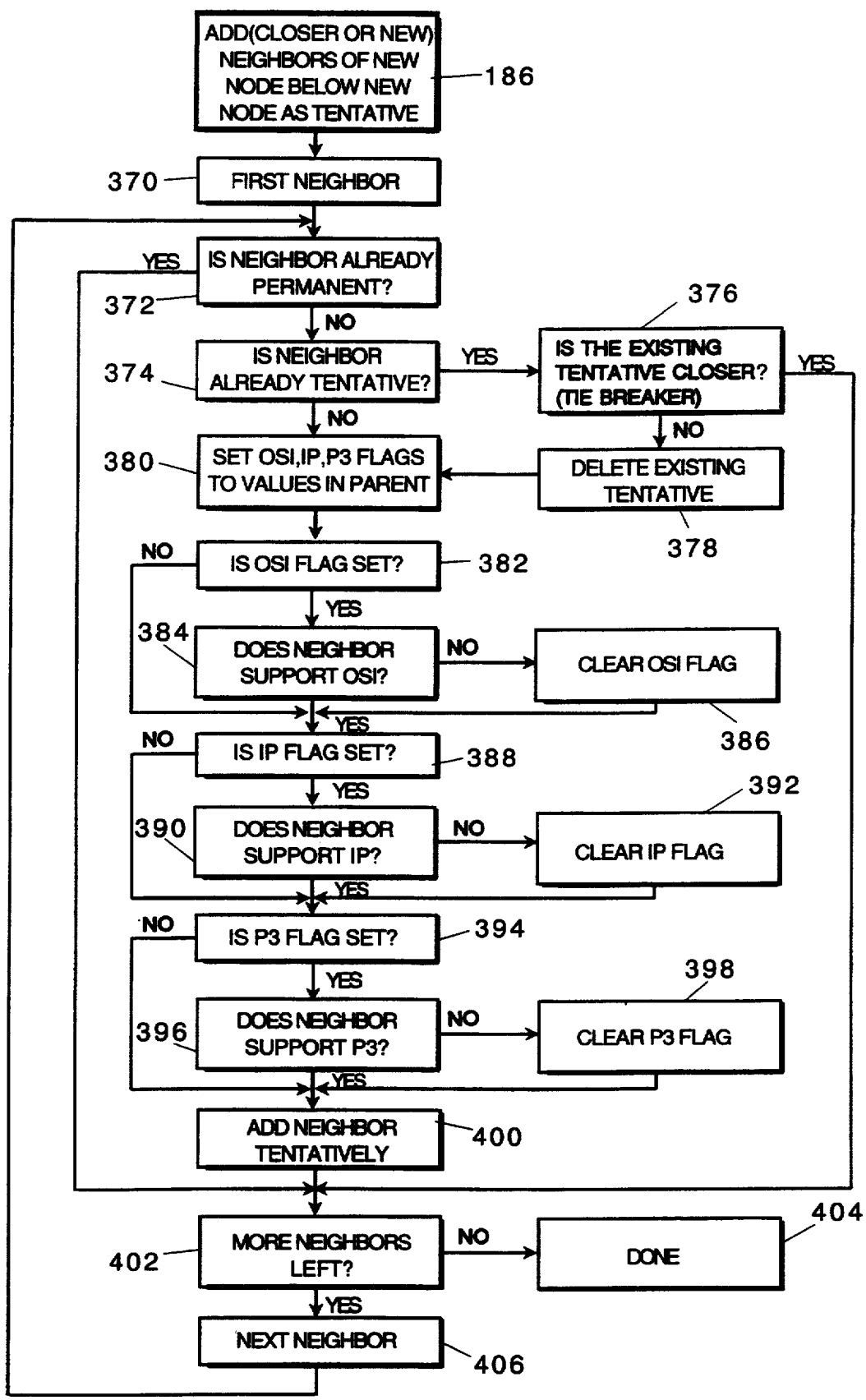
FIG. 8C is a flow diagram of an algorithm for building the routing trees in the dual-protocol routers of FIG. 7B.

The data structure of FIG. 8A, and the algorithms of FIGS. 8B, 8C, and 9 are used by the dual-protocol routers of FIG. 7B in generating routing trees and forwarding user data packets. However, at least one all-protocol router in the local area must be capable of performing more complex operations. In particular, the all-protocol router must be capable of adding a sequence of encapsulation headers to a user data packet to allow the user data packet to travel to its destination. The enhancements of the above algorithms necessary to allow this functionality are described below.

In one embodiment, more than one all-protocol router perform the functions described below (i.e., receives user data packets from other routers and adds the appropriate encapsulation headers). In this embodiment, the dual-protocol routers forward user data packets to the nearest all-protocol router, as discussed above.

In another embodiment, some all-protocol routers may choose not to perform the functions described below; those all-protocol routers which do not perform the functions described below use the data structures and algorithms of FIGS. 8A through 9 to forward user data packets. In this embodiment, a notification mechanism (or an election, such as on a LAN) may be used to indicate which of the all-protocol routers are currently "on duty" i.e. providing the functions described below.

Figure 10A:
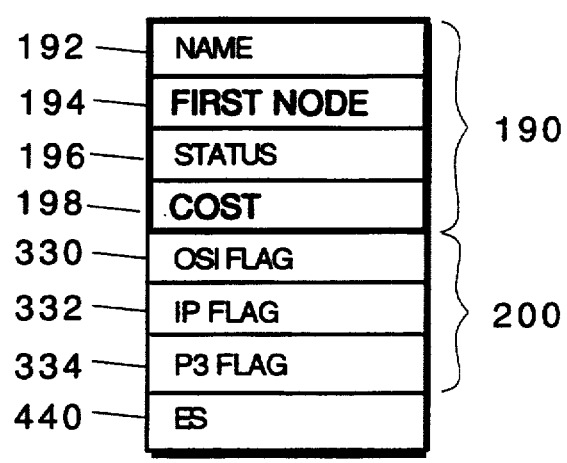
FIG. 10A is a diagram of a data structure of the routing tree of FIG. 4B as used in the all-protocol router of FIG. 7B.

Referring to FIG. 10A, to provide additional functionality, the routing database of an "on duty" all-protocol router includes an additional field, and the OSI, IP, and P3 flags are used in a slightly different manner, as discussed below.

The additional field is the encapsulation string field (ES) 440, which stores a list of the protocols and router addresses to be used in encapsulation headers to be added to a user data packet before it is forwarded toward its destination. As illustrated by the above example, these headers are exactly those needed to allow the user data packet to reach its destination without further encapsulation. The algorithm described below attempts to locate the longest possible chains of routers which support one of the protocols, thereby minimizing the number of encapsulating headers to be added to the user data packet.

Figure 10B:
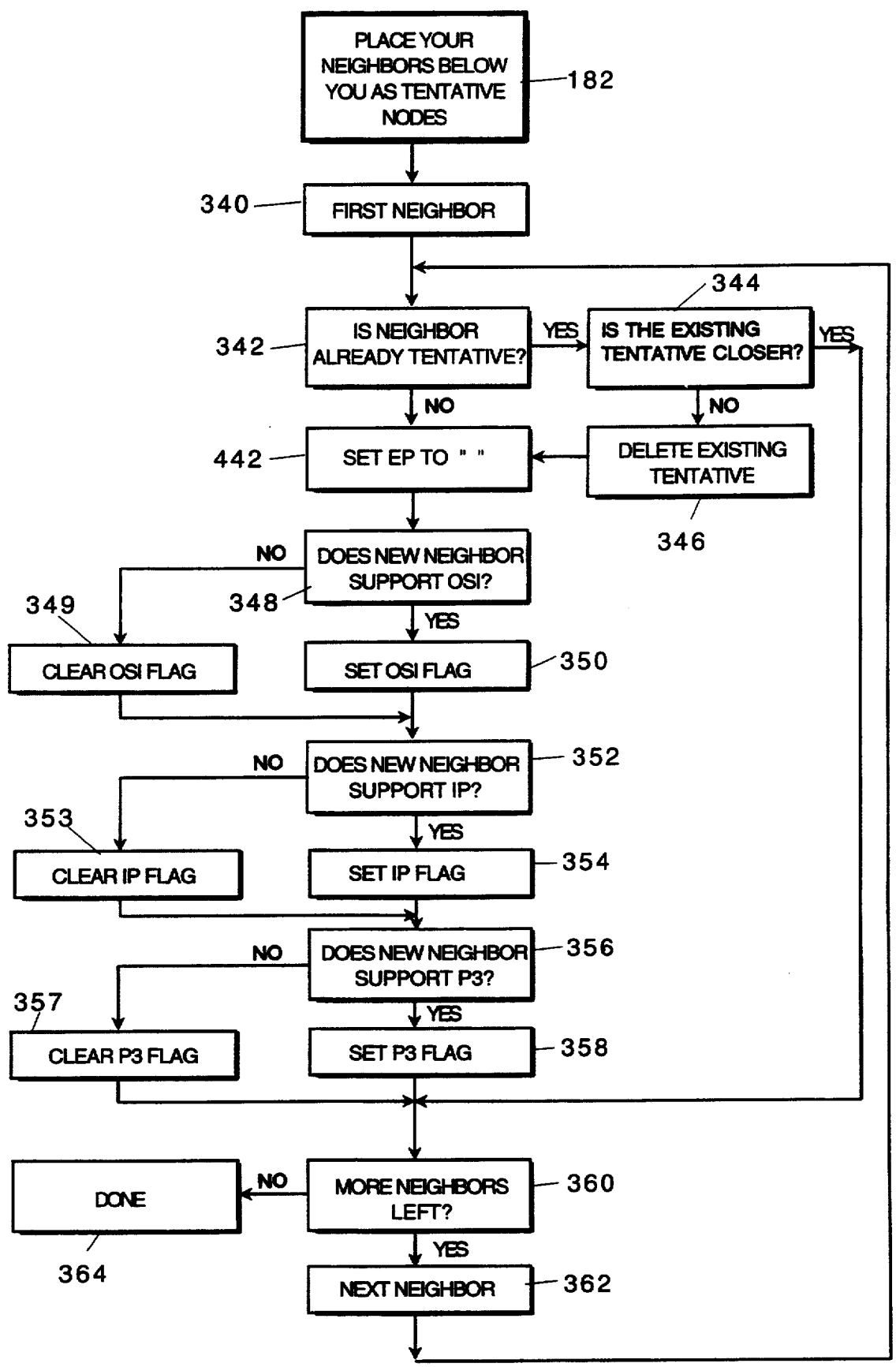
FIG. 10B is a flow diagram of an algorithm for initializing the routing tree in the all-protocol router of FIG. 7B.

To obtain the encapsulation string, the algorithms which generate the routing tree are slightly modified. The modifications to the algorithm of FIG. 8B (i.e., the algorithm of step 182, FIG. 4A, which places the neighbors of the router generating the tree on the tree) are illustrated in FIG. 10B. The flow control of the main loop, and the initialization of the OSI, IP, and P3 flags is identical to that of FIG. 8B, and will not be described again. The only modification is that the ES field is initialized to a null value for each node (step 442).

Figure 10C:
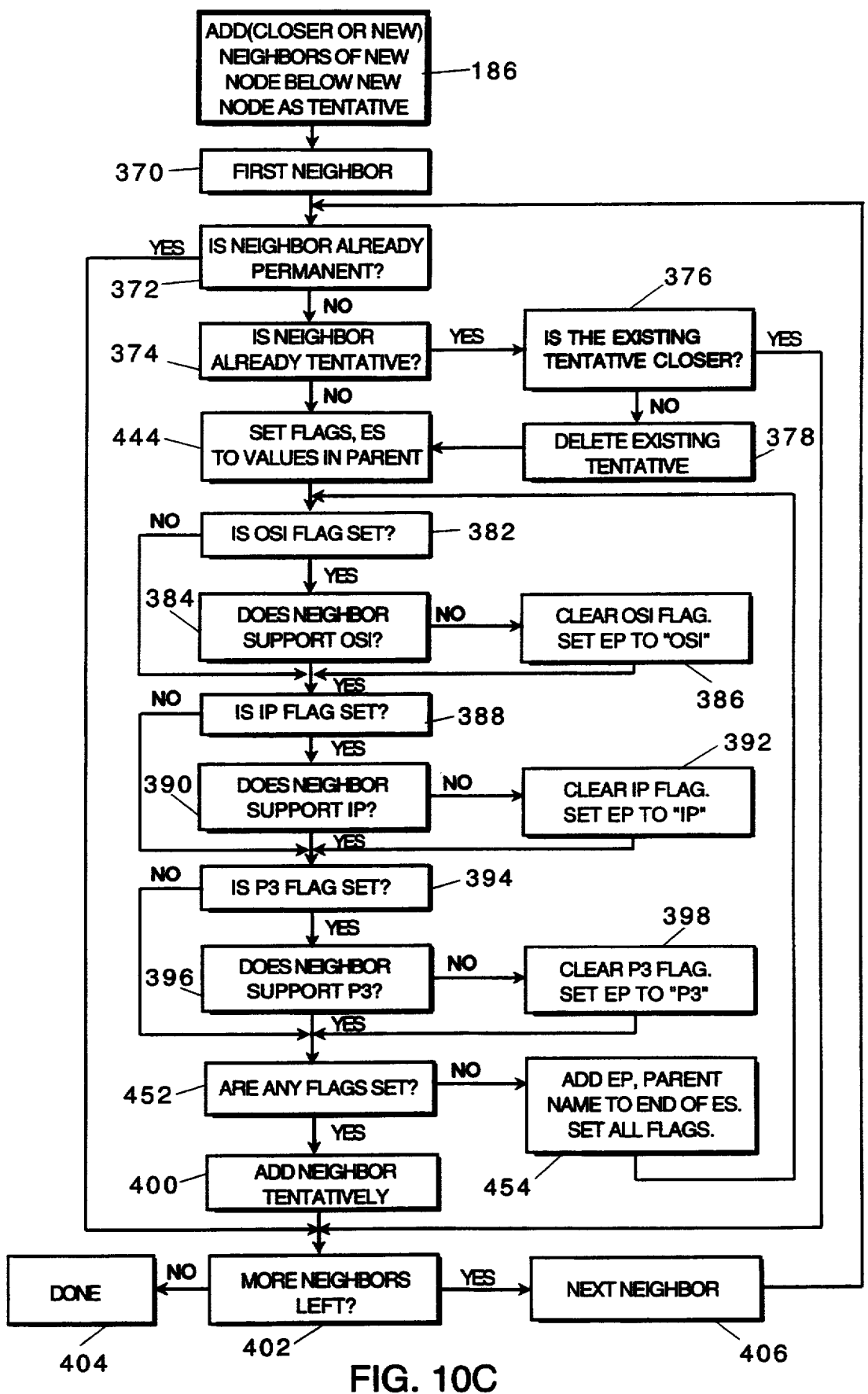
FIG. 10C is a flow diagram of an algorithm for building the routing tree in the all-protocol router of FIG. 7B.

The algorithm of FIG. 8C (i.e., the algorithm of step 186, FIG. 4A, which places the neighbors of a newly permanent node on the tree) is also slightly modified, as illustrated in FIG. 10C. The flow control of the main loop, and tests performed on the OSI, IP, and P3 flags, are identical to those of FIG. 8C, and will not be described again. However, there are several modifications to the actions performed within the loop.

First, when a node is added to the tree, the values of the flags and of the encapsulation string field are copied from the parent node (step 444).

Second, when the algorithm discovers a break in a continuous chain of routers supporting a given protocol, additional operations are performed. For example, in step 382, the algorithm checks if the OSI flag is set, i.e., if there has been a continuous chain of OSI-capable routers thus far. If this is the case, the algorithm then checks (step 384) if the chain has not been broken, i.e., if the new neighbor supports OSI. If the chain is broken, the OSI flag-is cleared (step 446). However, unlike step 386 of FIG. 8C, the algorithm also indicates the identity of the protocol of the broken chain, by setting a variable EP (encapsulation protocol) to the value OSI. This variable is used later in the loop, as discussed below. Similar operations are performed for the other protocols in steps 388, 390, and 448, and steps 394, 396, and 450.

Thus, when the algorithm reaches step 452, the flags have been appropriately modified. At this point, the algorithm checks (step 452) if any of the flags remain set, i.e., if there are any protocols supported by all of the routers thus far. If so, the algorithm proceeds to step 400, adding the node for the new neighbor to the tree.

However, if all of the flags are cleared, then the algorithm sequences to step 454. When the algorithm reaches step 454, the end of a continuous chain of routers which support a given protocol has been reached. In fact, because all of the flags have been cleared, the end of the longest such chain has been reached. The last router in this chain was the router immediately prior to the router whose node is currently being added to the tree, i.e., the parent node on the tree. Furthermore, the protocol of the chain was the protocol of the last flag to be cleared, which is stored in the EP variable.

The goal of the FIG. 10C algorithm is to store in the encapsulation string the list of protocols and addresses which collectively represents the longest chain of routers which lead to the destination. Thus, once the end of such a chain is reached, the name of the last router in the chain, and the protocol of the chain, are stored in the encapsulation string. Therefore, in step 454, the value of the encapsulation protocol variable, and the name of the parent of the node currently being added, are added to the end of the encapsulation string.

At this point, the algorithm begins to search for a second such chain of routers. This is done by setting all of the flags, and returning to step 382. The algorithm then passes through steps 382 through 452 a second time for the same neighbor. When the algorithm reaches step 452 the second time, the flags for the protocols not supported by the new neighbor will be cleared in this way, the algorithm has re-initialized the flags to search for the next continuous chain of protocols.

Figure 11:
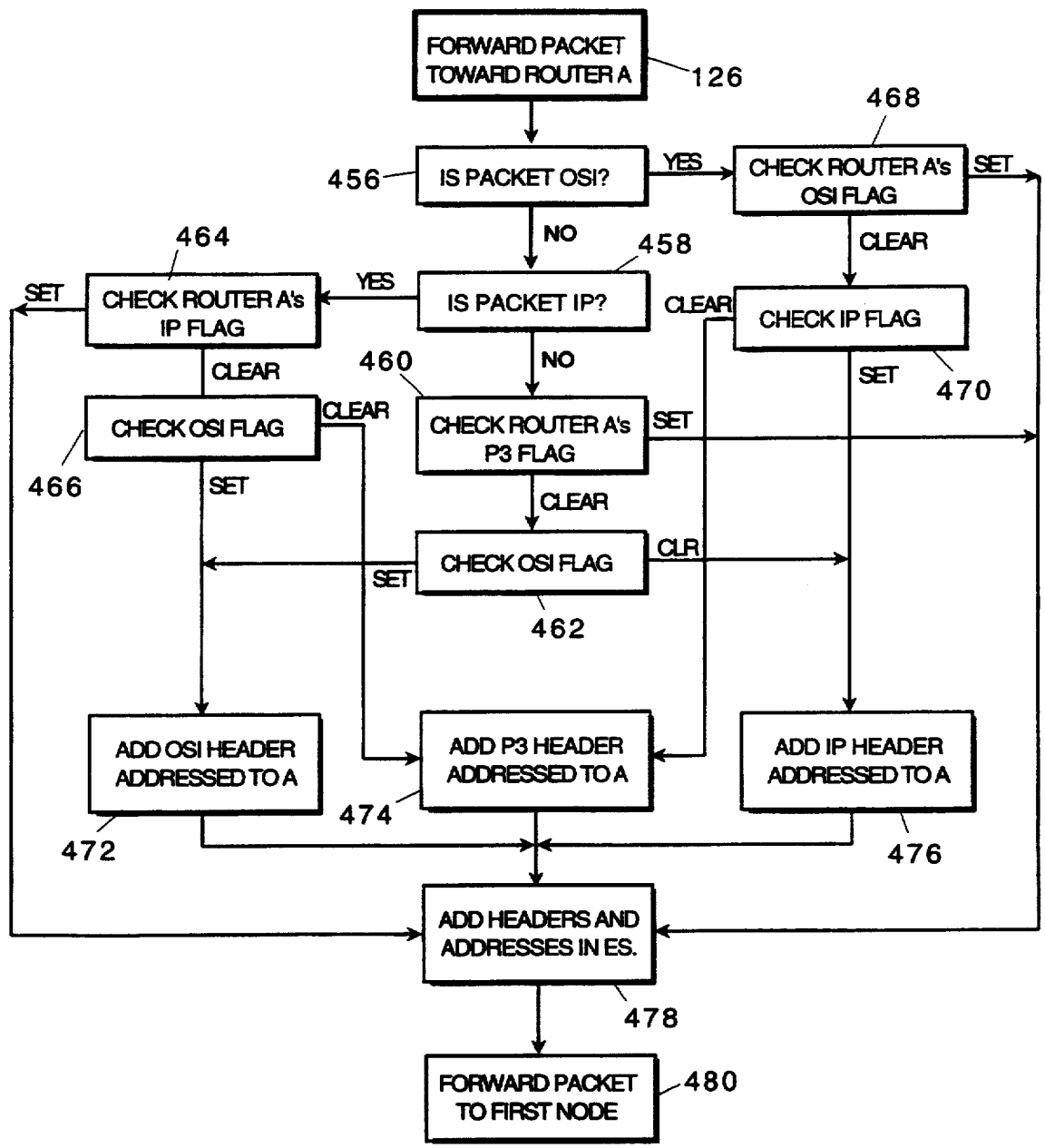
FIG. 11 is a flow diagram of the user data packet forwarding algorithm to be followed by the all-protocol router of FIG. 7B.

The algorithm used by all-protocol routers to forward received user data packets is illustrated in FIG. 11. This operation primarily involves generating encapsulation headers having the protocols and addresses specified in the encapsulation string (step 478), and forwarding the thus encapsulated user data packet to the first router on the route to its destination (step 480).

However, before the headers from the encapsulation string are added, the algorithm determines if an innermost encapsulation header is required. To make this determination, the algorithm first determines if the user data packet is OSI (step 456) or IP (step 458); failing these tests, the user data packet is assumed to be P3.

If the user data packet is OSI, the OSI flag of the destination router is checked (step 468). As described above, the OSI flag of the destination router indicates whether all the routers after the last router specified in the encapsulation string support OSI. Therefore, if the user data packet is OSI, and the OSI flag is set, no encapsulation header is required, and the algorithm sequences directly to step 478.

Similarly, if the user data packet is IP, the IP flag of the destination router is checked (step 464). If the IP flag is set, no encapsulation is required, and the algorithm sequences directly to step 478. Also, if the user data packet is P3, the P3 flag of the destination router is checked (step 460). If the P3 flag is set, the algorithm sequences directly to step 478.

If the appropriate flag is not set in steps 460, 464, or 468, then an innermost encapsulation header is required. The protocol of this header may be OSI (in which case the algorithm sequences to step 472), IP (in which case the algorithm sequences to step 474), or P3 (in which case the algorithm sequences to step 476). To determine which header to use, the other flags are tested. For example, if the user data packet is OSI and the OSI flag is not set, the algorithm checks the IP flag (step 470). If the IP flag is set, then an IP header is used, otherwise, a P3 header is used. Similarly, if the user data packet is IP and the IP flag is not set, the algorithm checks the OSI flag (step 466). If the OSI flag is set, then an OSI header is used, otherwise, a P3 header is used. Finally, if the user data packet is P3 and the P3 flag is not set, the algorithm checks the OSI flag (step 462). If the OSI flag is set, then an OSI header is used, otherwise, an IP header is used.

Using the algorithms and data structures described in FIGS. 8A through 11, the dual-protocol routers can recognize the need for encapsulation, and forward user data packets that require encapsulation to an "on duty" all-protocol router; the "on duty" all-protocol router may then use the algorithms to correctly encapsulate user data packets so that they may be transmitted to their destinations.

It is important to note that, if the tiebreaking mechanism used by different routers is inconsistent, or if changes to LSPs are not propagated to all routers, routing loops may form. This effect also occurs in known networks under these conditions, but is more prevalent using the algorithms described above because user data packets to be encapsulated are always forwarded to the all-protocol router.

As an example, consider the case where the all-protocol router has placed a sequence of encapsulation headers on a user data packet to allow the user data packet to be forwarded along a particular path to its destination. If one of the routers along the path disagrees on the path, then the user data packet may need to obtain an additional encapsulation header. In this case, the disagreeing router sends the user data packet back to the all-protocol router. The all-protocol router will then re-encapsulate the user data packet for the same path it previously encapsulated it for, and send it back toward the disagreeing router. In this way, the user data packet will loop to and from the all-protocol router and the disagreeing router, until the routers reach a consensus on the correct path, at which time the user data packet will reach its destination.

DETAILED DESCRIPTION

The following describes in detail one method for configuring a single network to run in the OSI and TCP/IP protocol suites. In this proposal, IP-only, OSI-only, and dual-protocol routers exist and can be mixed within a single area.

Control Packet Formats

As discussed above, where the invention is applied to routing in the TCP/IP and OSI protocols, the formats of the hello, LSP, and sequence number packets are normalized. In particular, the formats are substantially similar to the 10589 formats currently in use, but additional optional fields are added.

The approach described below does not change the way that OSI user data packets are handled. There are no changes to the contents or handling of ISO 8473 user data packets and error reports, nor to ISO 9542 Redirects, end system hello packets, and intermediate system hello packets. The approach described below does not change the way that OSI user data packets are handled. Specifically, there are no changes to the contents nor to the handling of ISO 8473 user data packets and error reports. Similarly, ISO 9542 Redirects and End System Hello packets are unchanged. ISO 9542 Intermediate System Hello packets do "double duty" and are used both for communication from routers to end systems, and for communications between routers on point-to-point links. The ISO 9542 Intermediate System Hello packets are modified by the addition of IP information in a way which OSI-only end systems will ignore. Other control packets (those associated with ISO 10589) remain unchanged except for the addition of IP information.

To allow easy parsing of the control packets, the optional fields are encoded in type-length-value (TLV) format. For example, the first octet indicates the type of the field, the second octet indicates the length of the field's value, and the third and following octets contain the value. The first two octets are read by a router before the contents of the field are interpreted. If the field type is recognized by the router, the contents of the fields are interpreted appropriately. However, if the field type is not recognized by a router, the entire field is ignored (by skipping the number of octets indicated in the length field). Regardless of whether the field was interpreted or ignored, if the control packet is forwarded to another router (as is the case with LSPs) it is passed on unchanged, i.e., including any ignored fields.

Hello Packets

Three additional fields are added to the 10589 hello packet format:

A "Protocols Supported" field identifies the protocols which are supported by the router generating the hello packet. This field must be included in all hello packets transmitted by IP-capable routers. If the field is omitted, it is assumed that the router transmitting the hello packet is OSI-only. The data protocols supported can be indicated by one-octet Network Layer Protocol Identifiers (NLPIDs) (as assigned by ISO/TR 9577).

An "IP Interface Address" field is included in all hello packets transmitted by IP-only and dual-protocol routers. This field contains the IP address of the interface on which the hello packet is transmitted. The address is formatted in four octets.

An "Authentication" field may be included to error-check the hello packet.

Link State Packets

Six additional fields are added to the 10589 link state packet format. A "Protocols Supported" field identifies the protocols which are supported by the router generating the LSP. This field must be included in all LSPs transmitted by IP-capable routers. If the field is omitted, it is assumed that the router transmitting the link state packet is OSI-only. The data protocols supported can be indicated by one-octet NLPIDs (as assigned by ISO/TR 9577, available from BSi standards at the above address).

One or more "IP Interface Address" field are included in all LSPs transmitted by IP-only and dual-protocol routers. These fields contain a list of one or more of the IP addresses of the interfaces of the router which originates the LSP. The address is formatted in four octets.

An "IP Internal Reachability Information" field may be included in LSPs transmitted by IP-capable routers. If present, this field identifies a list of zero or more entries of the format [metrics, IP address, subnet mask] which identify addresses reachable by the router which originated the LSP. Each entry must contain a default metric, and may contain delay, expense, and error metrics. If an IP-capable router does not directly reach any IP addresses, then it may omit this field, or may include the field with zero entries. In Level-1 LSPs, this field includes only entries directly reachable (via one of its interfaces) by the router originating the LSP. If included in a Level-2 LSP, this field includes entries reachable by the router which originates the LSP either via one of its interfaces, or indirectly via Level-1 routing. The metrics are preferably formatted as six bit fields, with the most significant bits used to indicate whether the metric is supported by the originating router. The IP address and subnet mask are both formatted as four octets.

An "IP External Reachability Information" field may be included in Level-2 LSPs transmitted by Level-2 IP-capable routers. If present, this field identifies a list of zero or more entries of the format [IP address, subnet mask, metrics] which identify addresses reachable, via a direct link to an external router, by the router which originated the LSP. Each entry must contain a default metric, and may contain delay, expense, and error metrics. If a Level-2 router does not have any external routes (via neighboring routers in other routing domains), it may omit this field, or may include the field with zero entries. The metrics are preferably formatted as six bit fields, with the most significant bits used to indicate whether the metric is supported by the originating router. The IP address and subnet mask are both formatted as four octets.

External routes may make use of "internal" or "external" metrics. Internal metrics are comparable with the metrics used for internal routes. Thus in choosing between and internal route and an external route using internal metrics, the metric values may be directly compared. In contrast, external metrics cannot be directly compared with internal metrics. Any route defined solely using internal metrics is always preferred to any route defined using external metrics, but when an external route using external metrics must be used, the lowest values of the external metric is preferred regardless of the internal cost to reach the appropriate exit point. (To identify whether a metric is internal or external, an extra bit may be added to the fields described in the previous paragraph. In one embodiment, this bit may be placed in one of the reserved bit positions of TCP/IP metric fields.)

It is useful, in the operation of external routing protocols, to provide a mechanism for border routers (i.e., routers in the same routing domain, which have the ability to route externally to other domains) to determine each other's existence, and to exchange external information (in a form understood only by the border gateways themselves). This is made possible by inclusion of an "Inter-Domain routing protocol Information" field, which may be present in Level-2 LSPs transmitted by Level-2 IP-capable routers. This field is transmitted for the convenience of the external routing protocol, and is not used by internal protocols.

An "Authentication" field may be included to error-check the hello packet.

Sequence Number packets

Sequence number packets (which list the names of the network's routers and the sequence numbers of the most recently received LSPs from those routers) are exchanged between routers to verify that all routers have the most recent version of the link state packets from the other routers.

An "Authentication" field may be included in these control packets for the purpose of error-checking.

Distingishing Protocols

Dual-protocol routers may receive a combination of OSI control and user data packets and IP control and user data packets. It is necessary for the dual-protocol routers to be able to clearly and unambiguously distinguish the two protocol suites. This fact is complicated by the fact that the two protocols were developed independently, with no explicit effort to have the two protocol suites use different protocol type fields, or to otherwise distinguish the two.

There are several different cases which need to be handled separately. The first case is on LANs, or over other underlying sub-networks and links which provide a link level demultiplexing function (such as Ethernet, FDDI, all 802.x sub-networks, and the IETF point-to-point protocol PPP) o In these cases, the underlying demultiplexing function is used. OSI and IP packets are encapsulated in underlying subnet headers without any intervening demultiplexing protocol.

On HDLC lines there is no link layer demultiplexing function. Similarly, on X.25 virtual circuits, to mix both OSI and TCP/IP packets on the same virtual circuit, there is no way to demultiplex. Therefore, in these cases the network level demultiplexing is used. The network layer protocol ID field, which comprises the first octet of 8473 packets, is used to perform the demultiplexing. OSI packets are encapsulated in link level packets without additional headers. IP packets are pre-appended with a single octet using a special value chosen from the ISO network protocol space, which indicates that the packet is IP. (When dual-protocol routers encapsulate IP user data packets in OSI user data packets, no additional IP demultiplexing field is necessary, as other mechanism are used to recognize encapsulated user data packets.)

Other Issues

Several other issues relating to an implementation of a dual-protocol network are discussed below.

Area Structure

A two level hierarchical approach is used to route OSI and IP traffic. Both protocols make use of a common area structure. Similarly, the amount of knowledge maintained by routers about specific IP destinations is as similar as possible to that for OSI. For example, IP-capable Level-1 routers are not expected to know the location of IP destinations outside of their area.

IP uses a very different addressing scheme from OSI. OSI addressing explicitly identifies the area. This makes it very easy for OSI Level-1 routers to identify user data packets going to destinations outside of their area, which need to be forwarded to Level-2 routers. However, IP addressing does not identify the area. For an IP Level-1 router to determine that given a particular IP destination address, a user data packet must be forwarded to a Level-2 router, the router must determine that the address is not reachable via any Level-1 router in its area.

Generally, the IP addresses that are reachable by a particular interface of an IP-capable router can be described by a single [IP address, subnet mask] pair. Here both the IP address and subnet mask are 32 bits long. Any addresses which match the specified address in the bits specified in the mask must be reachable directly via that interface, i.e., without going through other IP routers.

The OSI addressing scheme is used for OSI traffic, and the area structure is strongly linked to the OSI addresses, as in known OSI networks. In IP, there are several considerations. First, it is important to be flexible with the limited IP address space in order to cope with the anticipated growth of IP environments. Furthermore, dual-protocol routers may be installed in existing environments, which already have assigned IP and/or OSI addresses. Also, even if IP addresses are not already pre-assigned, the address limitations of IP will constrain what addresses may be assigned. Therefore, no specific relationship between IP addresses and the area structure is required.

As will be described below, greater efficiency and scaling of the routing algorithm can be achieved if there is some correspondence between the IP address assignment structure and the area structure.

To allow the area structure to be used for IP traffic, Level-2 routers include in their Level-2 LSPs a list of all [IP address, subnet mask] pairs reachable in their area.

In general, this information may be determined from the Level-1 LSPs from all routers in the area.

Ignoring resource constraints, it would be permissible for a Level-2 router to simply duplicate all [IP address, subnet mask] entries from all Level-1 routers in its local area, for inclusion in its Level-2 LSP. However, in order for hierarchical routing to scale to large routing domain sizes, it is highly desired to abbreviate the reachable address information.

This is accomplished by manual configuration of summary address entries. Each Level-2 router is configured with a set of [IP address, subnet mask] pairs for announcement in its Level-2 LSPs. In one embodiment, Level-2 routers are always required to announce these in Level-2 LSPs; alternatively, Level-2 routers may be allowed to leave out the summary addresses if there are no corresponding reachable Level-1 addresses in the area.

When the Level-2 LSP is generated, the set of reachable addresses for the Level-2 router's area (obtained from Level-1 LSPs from the area) is compared with the configured reachable addresses. Redundant information obtained from Level-1 LSPs is not included in Level-2 LSPs. Generally it is expected that the Level-2 configured information will include more inclusive addresses (corresponding to a subnet mask with less bits set to "1"). This will therefore allow one configured address/subnet mask pair to hierarchically supersede the information corresponding to multiple entries in the Level-1 LSPs.

However, any addresses obtained from the Level-1 LSPs which is are not superseded by the manually configured information are included in the Level-2 LSPs. In this case, the metric values announced in the Level-2 LSPs are calculated from the sum of the metric values announced in the corresponding Level-1 LSP, plus the distance from the Level-2 router to the appropriate Level-1 router. If this sum results in a metric value greater than the maximum value that can be reported in Level-2 LSPs, then the maximum value is reported.

In some cases, a configured internal reachable address may announce reachability to an address which does not correspond to any Level-1 reachable address information. This may be normal during startup, but if it persists it represents an error condition. This error can only be rectified by human intervention; network management must be aware of the possibility of this error condition and correct it if it occurs.

The reachable IP addresses obtained by a Level-2 router from Level-1 LSPs include addresses that it can reach directly via its own interfaces (i.e., those it would report in its own Level-1 LSPs). Similarly, addresses of Level-1 routers (determined from the IP Interface Address field in the corresponding Level-1 LSPs) also represent addresses which are reachable via Level-1 routing in the area, and therefore need to be announced as Reachable address entries in the Level-2 LSPs.

In general, the same [IP address, subnet mask] entry may be announced in the Level-1 LSPs sent by multiple Level 1 routers in the same area. In this case (assuming the entries are not superseded by a manually configured entry), then only one corresponding entry shall be included in the Level-2 LSP. The metric values announced in Level-2 LSPs correspond to the minimum of the metric value(s) that would be calculated for each of the Level-1 LSP entries.

There may be some IP addresses which match the manually configured summary address entries, but which are not reachable via Level-1 routing. If a Level-2 router receives an IP packet whose IP address matches a manually configured address which it is including in its Level-2 LSP, but which is not reachable via Level-1 routing in the area, then the packet must be discarded. In this case, an error report may be returned with the reason for discard specifying destination unreachable.

Figure 12:
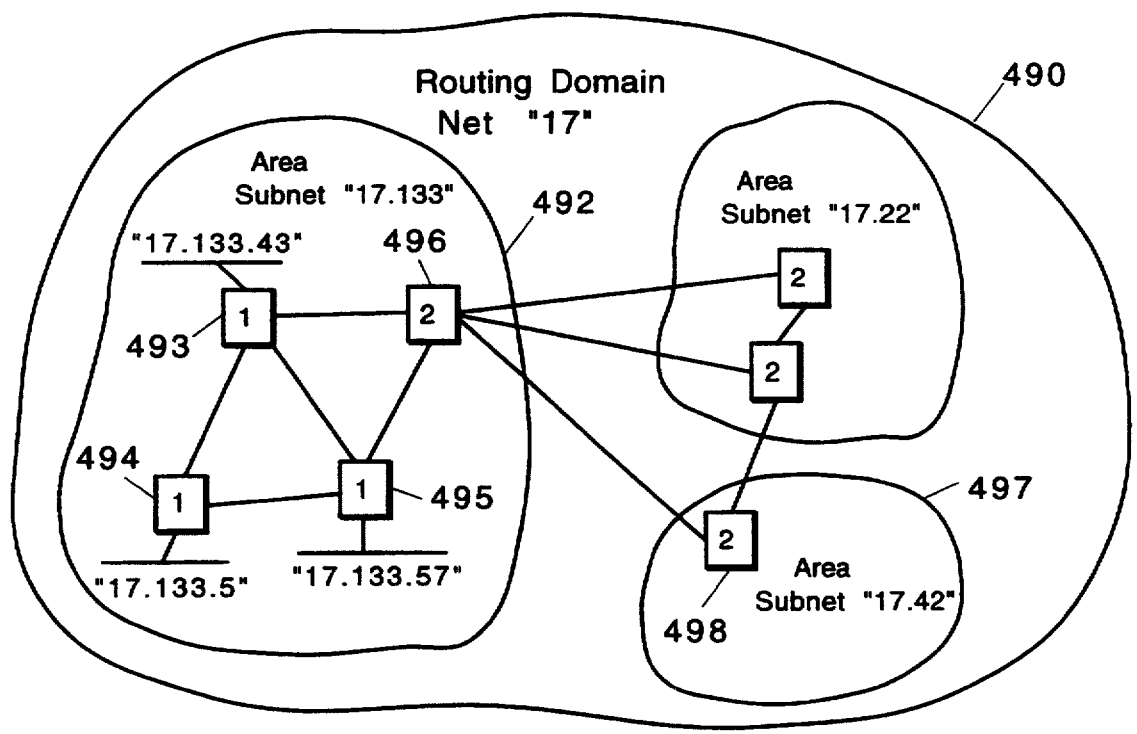
FIG. 12 illustrates a common area structure.

An example of the above scheme follows:

Referring to FIG. 12, assume that the network number for the entire TCP/IP domain 490 is "17" (a class A network). Also, assume each area is assigned a subnet number consisting of the next 8 bits. Each LAN in an area is assigned a subnet number consisting of 16 bits, giving each a 24 bit subnet mask. Finally 8 bits are left for the host field.

Now assume that area 492 (having subnet number "17,133") has a number of IPcapable Level-1 routers 493, 494, 495 announcing (in the special IP entry in their Level-1 LSPs) sub-nets "17,133.5" (for 494), "17.133.43" (for 493) and "17.133.57" (for 495). In this example, in order to save space in its Level-2 LSPs, the Level-2 router 496 of area 492 would be configured to announce subnet 7,133. Only this one address needs to be announced in Level-2 LSPs. Thus any IP user data packet destined for an address in subnet "17.133.5", "17.133.43", or "17.133.57" will be passed to this area by the other Level-2 routers. The inclusion of "17,133" in Level-2 LSPs means that the four subnet addresses starting with "17.133" do not all have to be listed separately in Level-2 LSPs.

If there is any traffic for an unreachable address, for example the address "17 133 124 7" this traffic will also be routed to area 492, because all Level-2 routers in domain 490 will incorrectly believe that area 492 can handle it. (This may happen if management makes a gross configuration error, or a system tries to send traffic to an address which doesn't exist.) Area 492 will have to discard this traffic.

However, suppose that subnet number "17.133,125" was actually reachable via some other area (for example, area 497). In this case, the Level-2 router 498 in area 497 would be announcing (in its Level-2 LSPs according to information taken from its received Level-1 LSPs), reachability to subnet "17,133,125". Due to the use of "best match" routing, this works correctly. All traffic from other areas destined to subnet "17.133.125" would be sent to Level-2 router 498, and all other traffic to subnet "17.333" (i.e.., traffic to any IP address starting with "17.133" but not starting with "17.133.125") would be sent to Level-2 router 496.

External Links

External links may be IP-only, or dual-protocol. In addition, in some cases it may be desirable to run encapsulated OSI over IP-only external links (because there may be a remote router which is ready to receive and decapsulate such OSI user data packets).

In general, which user data packets are sent in which manner over external links is highly dependent on both policy issues, and on the specific implementations in the remote external routers. It is therefore necessary to make use of considerable configuration information in controlling the use of such external links.

Encapsulated user data packets, if received at a Level-2 router to be forwarded outside of the domain, are first decapsulated. They are therefore treated just like unencapsulated IP user data packets which arrive at the same Level-2 router. If necessary, encapsulation of user data packets for transmission on links outside of the domain is independent of encapsulation of user data packets within the domain.

Currently there is no OSI standard for inter-domain routing. (However, it is expected that a protocol will be defined.) At the present time, manual configuration is used. The link is statically configured with the set of address prefixes reachable via that link, and with the method by which they can be reached (such as the DTE address to be dialed to reach that address, or the fact that the DTE address should be extracted from the Initial Domain Part (IDP) of the ISO address). Therefore fixed (manually updated tables are used for ISO inter-domain routing. This will be done only by Level-2 routers.

External links

IP will be run over external IP links only by Level-2 routers. This will make use normal IP external connectivity functions, for example as explained in RFC 1009 "Requirements for Internet Gateways".

There will be circumstances where it is necessary to interconnect different OSI domains using TCP/IP links. Architecturally this will be modelled as a normal external OSI connectivity, which just happens to use IP as the underlying subnet service. Regular external OSI links are manually configured. Therefore the same approach is used for TCP/IP links. No dynamic routing protocol will be run for the OSI link, and the availability of the remote OSI router will be assumed unless manually changed.

In order to reach the remote OSI router, it is necessary to know the IP address of the decapsulating router (i.e., of the OSI router which will remove the IP header). For this external link, it will therefore be necessary to manually configure the fact that this particular external OSI link makes use of an underlying IP service, and the IP address of the remote OSI router.

Note that, given the IP address to which the (encapsulated OSI) user data packet is to be sent, the resulting IP user data packet is forwarded externally just like any other IP user data packet. Thus, it will make use of the external IP information obtained as explained above.

There may be circumstances where it is necessary to interconnect different IP domains using external OSI links. Architecturally this will be modelled as a normal external IP connectivity, which just happens to use OSI as the underlying subnet service.

External IP reachability is determined by using EGP, RIP, BGP, or some other protocol. The same approach is used here. Part of the manual configuration of how to get to the remote IP gateway will include the underlying subnet address of the remote IP gateway. Since this is done in this case by encapsulating the user data packet in 8473, this address will simply be the OSI address.

Note that, given the OSI address to which the (encapsulated IP) user data packet is to be sent, the resulting 8473 user data packet is forwarded externally just like any other 8473 user data packet. Thus, it will make use of the external OSI information obtained as explained above.

TOS Routing

IP Type of Service (TOS) routing is provided through use of the Quality of Service (QOS) feature of 10589. Routing is done on the basis of throughput (the default metric), delay, expense, or residual error probability. Note that any particular user data packet may be routed on the basis of any one of these four metrics. Routing on the basis of general combinations of metrics is not supported.

The support for TOS is optional. If a particular user data packet calls for a specific TOS, and the correct path from the source to the destination is made up of routers all of which support that particular TOS, then the user data packet will be routed on the optimal path. However, if there is no path from the source to destination made up of routers which support the desired service, then the user data packet is forwarded using the default metric instead. This allows for QOS service in those environments where it is needed, while still providing acceptable service in the case where an unsupported QOS is requested.

The IP TOS field is mapped into the four QOS metrics as follows. The first two ("precedence") bits are not used to choose the route. The value of the last three bits (respectively, the "low delay", "throughput", and "reliability" bits) used to choose routes by mapping the following values to the indicated QOS metrics:

100: The QOS delay metric is used.
010: The default (throughput) QOS metric is used.
001: The QOS reliability metric is used.

All other combinations: The default metric is used. Note: The IETF Router Requirements Working Group is considering assigning one of the unused bits in the TOS field in the IP header to correspond to minimum cost routing. In this case, the type of service for a packet with the minimum cost bit set to 1, and the other three TOS bits set to 0, will be mapped onto the cost metric of 10589.

Order of Preference of Routes

In order to ensure correct interoperation of routers, it is necessary to clearly and unambiguously specify the order of preference of routes in the routing algorithm. In general, there are several ways in which this order may be specified. What is necessary is that all router implementations agree to use the same precise order. In the preferred embodiment, the following order is used:

Among routes in an area, if the specified destination address matches more than one [IP address, subnet mask] pair, then the more specific address (i.e., the one with more bits in the mask set to "1") is preferred.

Among routes in an area to equally specific address matches, routes on which the requested TOS (if any) is supported are always preferred to routes on which the requested TOS is not supported.

Among routes in the area of the same TOS to equally specific addresses, the shortest route is preferred. For determination of the shortest path, if a route on which the specified TOS is supported is available, then the specified TOS metric is used, otherwise the default metric is used. Among routes of equal cost, loadsplitting may be performed as specified in 10589.

If a given destination is reachable within an area, then the path within the area is preferred to the path outside of the area (via Level-2 routing). If a given destination is not reachable, then the user data packet is routed to a Level-2 router using the following criteria Among routes to Level-2 routers, routes on which the requested TOS (if any) is supported are preferred to routes on which the requested TOS is not supported.

Among routes to Level-2 routers having the same TOS, the shortest routes are preferred. For determination of the shortest path, if a route on which the specified TOS is supported is available, then the specified TOS metric is used; otherwise, the default metric is used. Among routes of equal cost, loadsplitting may be performed as specified in 10589.

In Level-2 routers, routes via Level-1 routing are always preferred to routes via Level-2 routing. Level-2 routes are chosen under the following criteria.

Routes using internal metrics are always preferred to routes using external metrics.

Among internal routes, the route with the most specific [IP address, subnet mask] pair is preferred. Among routes with equally specific address matches, routes on which the requested TOS (if any) are preferred. Among routes of the same TOS to equally specific addresses, the shortest route is preferred. The determination of the shortest path uses the requested TOS first (as described above), with loadsplitting among equal cost routes in accordance with 10589. (Note that internal routes and external routes are treated identically for the purposes of the Dijkstra calculation).

Among external routes, the route with the most specific matching [IP address, subnet mask] pair is preferred. (Note that, for external routes, the subnet mask will normally correspond precisely to the network number. This implies that there will always be equal length matching strings. However, this test is included to allow future, more general handling of external addresses.) Among routes with equally specific address matches, routes on which the requested TOS (if any) are preferred. (External routes are considered to support the requested TOS only if the internal route to the appropriate border gateway supports the requested TOS, and the external route reported by the border gateway also supports the requested TOS.) Among routes of the same TOS to equally specific addresses, the shortest route is preferred. In determining the shortest path, routes with a smaller announced external metric are preferred, and among routes with equal external metrics, routes with a shorter internal metric are preferred. Among routes of equal cost, loadsplitting is performed in accordance with 10589.

Where Level-2 routers are announcing manually configured summary addresses in the Level-2 LSPs, there will be IP addresses which match the manually configured addresses, but which do not match any addresses which are actually reachable via Level-1 routing in the area. The above scheme will handle user data packets addressed to such addresses as follows. If the specified destination is reachable via Level-1 routing, then in accordance with the above criteria, the packet will be delivered via Level-1 routing. If the specified destination is not reachable via Level-1 routing, but is reachable via Level-2 routing, and there are other Level-2 routers which offer more desireable routes according to the above rules (e.g., a route with a more specific match, or a route which has an equally specific match but supports the correct TOS), then the user data packet will be forwarded along the more desireable route. However, if the address cannot be reached via Level-1 routing, and the manually configured summary address is the most desireable Level-2 route, the address is unreachable and the user data packet must be discarded.

Encapsulation

IP user data packets are encapsulated directly in 8473 user data packets with a one-octet prepended NLPID value identifying that the encapsulated packet is IP. Inclusion of the NLPID allows encapsulated IP packets to be distinguished from encapsulated 8473 packets. The 8473 destination address indicates the address of the router to which the user data packet is being forwarded. The address to use (including SEL value) is included in the LSPs sent by dual-protocol routers.

The 8473 source address indicates the address of the router which does the encapsulation. When the destination 8473 address needs to be changed (such as when a Level-1 dual-protocol router encapsulates the user data packet with the address of a Level-2 router in its area, and the Level-2 router then needs to re-encapsulate with the address of a Level-2 router in the destination area), this is considered to be a new encapsulation and the source address is changed.

The SEL value used for the 8473 source address is left to each individual router. However, it is useful to use a different value from that to be used for the destination address. Use of a different SEL value here assures that, if an 8473 error report is returned to a router by a remote OSI router, such error reports will be very easy to distinguish from encapsulated IP user data packets.

An OSI user data packet is encapsulated directly in an IP user data packet with no intervening protocol. The IP destination address indicates the address of the router to which the user data packet is being forwarded. In this case, the user protocol field specifies that the contents of the data portion of the IP user data packet contains an encapsulated OSI user data packet. Here the IP source address indicates the address of the router which does the encapsulation.

Fragmentation, Segmentation, and Reassembly

Generally, data communications links have a "Maximum Transmission Unit" (MTU) which specifies the largest packet that can be transmitted on that link. In some cases, it may be necessary to transmit over a link a packet which is too large for that link (i.e., the length of the packet is larger than the MTU for that link). Many user data packet formats (including IP and 8473) provide for user data packets to be split into multiple packets for transmission over such links. DoD IP calls this function "fragmentation". OSI 8473 offers the same function, but calls it "segmentation". With either protocol, the destination for the user data packet is required to reassemble the packet before performing further processing of it.

When packets are encapsulated, we specify the address of a router as the destination in the encapsulating header. In one embodiment, the specified router is required to reassemble the encapsulated packet before performing decapsulation and forwarding the user data packet contained therein.

However, it is desirable (for performance and resource utilization reasons) to eliminate the need for reassembly of user data packets at routers. In another embodiment (applicable when only one encapsulating header will be required at any one time, such as the environment illustrated in FIG. 2A), the need for possible fragmentation or segmentation of the encapsulating packet is eliminated by performing fragmentation or segmentation of the original user data packet before encapsulation.

Where IP user data packets are to be encapsulated in OSI 8473 packets, manually configured information "MAX_IP_FRAGMENT_SIZE_IN_L1_AREA" for each area, and "MAX_IP_FRAGMENT_SIZE_IN_L2_BACKBONE" for the Level-2 backbone, specify the maximum IP fragment size which can be carried without requiring OSI segmentation. If an IP user data packet larger than this size is to be encapsulated, it must be fragmented before encapsulation, and the resulting OSI 8473 packets must specify "don't segment".

Similarly, where OSI 8473 user data packets are to be encapsulated in IP packets. Manually configured information "MAX_OSI_SEGMENT_SIZE_IN_Li_AREA" for each area, and "MAX_OSI_SEGMENT_SIZE_IN_L2_BACKBONE" for the Level-2 backbone, specify the maximum OSI segment size which can be carried without requiring IP fragmentation. If an OSI user data packet larger than this size is to be encapsulated, it must-be segmented before encapsulation, and the resulting IP packets must specify "don't fragment".

OSI 8473 and ICMP Error Message

Dual-protocol routers, when operating as IP gateways, must be able to send ICMP error messages (as specified in RFC 1009 "Requirements for Internet Gateways"; and RFC 792 "Internet Control Message Protocol", available from SRI International at the above address).

In addition, when a dual-protocol router encapsulates an IP user data packet in an 8473 header, it puts its own OSI address (including a special architectural constant SEL value) as the source address. In some error conditions, it therefore may receive an 8473 error report in response to the encapsulated user data packet. In some cases receipt of such 8473 error reports by an encapsulating router may require the sending of ICMP error reports, in other cases receipt of such 8473 error reports may signal the existence of an error condition, which is made available to network management. Similar situations occur where and OSI packet is encapsulated in and IP packet, and an ICMP error report is received.

Lifetime Control

For unencapsulated OSI 8473 and IP user data packets, lifetime is decremented exactly as if the user data packet was being forward by a pure OSI or pure IP router (respectively).

For IP user data packets which are encapsulated in OSI 8473 user data packets, we must consider the relationship between the lifetime field in each of the two packet headers.

The most straightforward approach would be to have the encapsulating router use an 8473 TTL value which is based on its notion of the "distance" to the decapsulating router. This would imply that the two lifetime fields are pretty much independent. However, there are several disadvantages of this approach: (i) this approach makes it possible for the encapsulated user data packet to loop for an extended period of time; (ii) it is not clear how the encapsulating router would pick the value; (iii) this approach defeats the intent that the lifetime field is measured in units of time (seconds or half seconds).

There is an alternate approach: In the encapsulation of an IP user data packet, the router will copy the value from the IP TTL field to the 8473 lifetime field. The field in the 8473 header will then be decremented by OSI routers in the normal manner. When the user data packet is decapsulated, the value of the lifetime field will be copied back from the 8473 header to the IP header. This approach allows the meaning and functionality of the lifetime field to be preserved between protocols.

Note that IP measures lifetime in seconds, where OSI measures lifetime in half seconds. In most cases, each hop will take less than a half second, and the same result (decrementing by one) will occur with either interpretation. In some cases, with encapsulated IP user data packets, this may result in over-decrementing (which is permissible), whereas with encapsulated OSI user data packets, this could result in underdecrementing by a factor of two. However, hops rarely take longer than a half second, this error condition is not likely to cause problems.

Error Reports

It is possible that, due to configuration errors, there may be times when a dual-protocol router forwards an IP packet to an OSI-only router, or forwards an OSI packet to an IP-only router. (Similarly, an IP-only router may forward an IP packet to an OSI-only router, or vice versa.) In this case, the packet must be discarded. An error report may be transmitted, in accordance with the IP or OSI 8473 specification (respectively). The reason for discard specified in the error report should specify "destination host unreachable" (for IP) or "destination unreachable" (for OSI). The number of packets discarded for this reason may be maintained as a network variable.

Congestion

One would like to avoid congesting dual-protocol routers as much as possible. For OSI packets, a congestion avoidance scheme is used to set the congestion indication bit in the network layer header when the router is "congested". The DoD TCP/IP protocol suite has, at this time, weaker congestion avoidance mechanisms (based on source quench, and packet dropping). This leads to the possibility that in the event of congestion, the ("better behaved") OSI end systems could suffer with respect to the ("less well behaved") TCP/IP end systems.

However, this is simply a special case of a more general problem: Since congestion avoidance is optional in 8473, even in a pure OSI system there will be some OSI end systems which implement congestion avoidance (and are therefore well behaved), and others which implement only congestion recovery (and are therefore moderately badly behaved), or implement no congestion backoff at all.

To harmonize these approaches, the following mechanism may be used: each router (i) may ignore the congestion avoidance mechanism altogether, and never set the congestion experienced bit; (ii) may provide a functional equivalent of dual queues, with those OSI packets making use of the congestion experienced field being queued separately from all other packets (i.e., OSI packets without this field, and all IP packets). Whether or not the congestion experienced bit is set on any particular packet depends only upon the level of traffic in the appropriate queue.

Brouters

Figure 13:
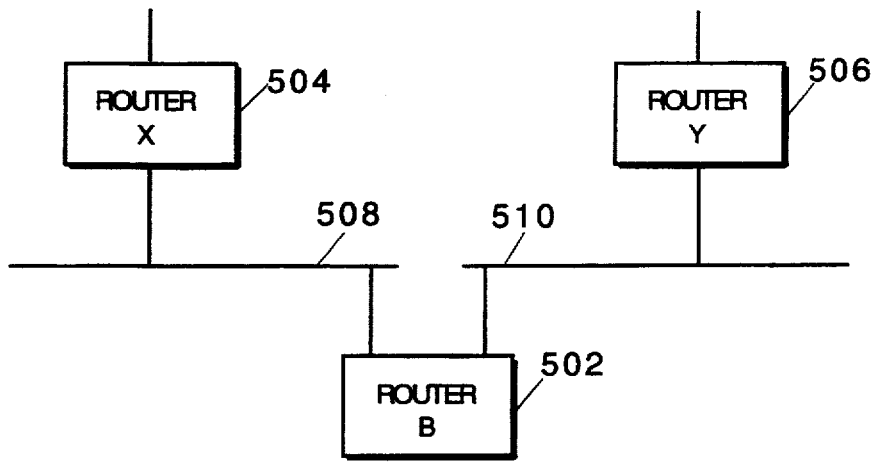
FIG. 13 illustrates a router.

Referring to FIG. 13, a so-called router 502 is a device which operates as both a bridge and a router. Suppose that two routers 504 and 506 are respectively connected to two Ethernets 508, 510, and router 502 is connected between the two Ethernets. Assume that the two routers implement the OSI (IS—IS) protocol and are both level 1 routers in the same domain. Also assume that router 502 is arranged to treat TCP/IP packets as if the router were a normal IP router and to treat all other packets as if the router were a bridge.

IS—IS hello packets sent by routers 504,506 are received and forwarded by router 502 using normal bridge functions. Routers 504, 506 also receive each other's link state packets. Thus, it appears to router 502 that routers 504, 506 are exchanging OSI packets and they are forwarded using normal bridge functions. It appears to routers 504, 506 that they are on the same local area network so they learn each other's 48-bit Ethernet addresses and exchange routing information.

Now suppose that router 504 receives an IP packet which it needs to forward via router 506. Because router 504 thinks that it and router 506 are on the same Ethernet, router 504 simply forwards the IP packet directly, using normal Ethernet encapsulation and using the 48-bit Ethernet address of router 506 in the Ethernet header. Then router 502, thinking as a bridge, would say "This is an IP packet. I don't forward this as a bridge". Then router 502, thinking as a router says, "This is an IP packet I know how to forward IP packets. However, this packet is sent to an Ethernet address which is not me, thus I will ignore it." The result is that the IP packet does not get forwarded as it should.

One solution to this problem is to have the router follow these rules:

1. For packets which are not IP packets, act as a bridge (as before).
2. For IP packets sent to an Ethernet broadcast or multicast address, act as an IP router (as before).
3. For IP packets went to the router's Ethernet 48-bit address, act as an IP router (as before)
4. For IP packets sent to a single station 48-bit address which is not the router's address, act as a bridge (unlike before).

Other Embodiments

The invention may be practiced with protocol suites other than OSI and TCP/IP.

Other embodiments are within the scope of the following claims.

What is claimed is:

Annex A: Dijkstra Calculation and Forwarding

Annex C.2 of ISO 10589 specifies the SPF (Diskstra) algorithm for calculating routes with the IS—IS routing protocol. This annex specifies modifications to the SPF algorithm for supporting IP and dual routing, and specifies a compatible method for forwarding IP packets. This will result in a suitable order of preference of routes.

A.1 SPF Algorithm for IP and Dual Use

This section specifies an SPF Algorithm for calculating routes with the IS—IS routing protocol, for support of both TCP/IP and OSI. This is based on an extention to the algorithm specified in annex C.2 of ISO 10589.

An algorithm invented by Dijkstra known as shortest path first (SPF) is used as the basis for the route calculation. It has a computational complexity of the square of the number of nodes, which can be decreased to the number of links in the domain times the log of the number of nodes for sparse networks (networks which are not highly connected).

A number of additional optimizations are possible:

1) If the routing metric is defined over a small finite field (as in this document), the factor of log n may be removed by using data structures which maintain a separate list of systems for each value of the metric rather than sorting the systems by logical distance.

2) Updates can be performed incrementally without requiring a complete recalculation. However, a full update must be done periodically to ensure recovery from data corruption, and studies suggest that with a very small number of link changes (perhaps 2) the expected computation complexity of the incremental update exceeds the complete recalculation. Thus, this annex specifies the algorithm only for the full update.

3) If only End System LSP information has changed, it is not necessary to re-compute the entire Dijkstra tree. If the proper data structures are used, End Systems (including IP reachability entries) may be attached and detached as leaves of the tree and their forwarding information base entries altered as appropriate.

The original SPF algorithm does not support load splitting over multiple paths. The algorithm in this annex does permit load splitting (in 2 protocol environments) by identifying a set of equal cost paths to each destination rather than a single least cost path.

A.1.1 Databases

PATHS—This represents an acyclic directed graph of shortest paths from the system S performing the calculation. It is stored as a set of triples of the form $<N,d(N),\{Adj(N)\}>$, where:

N is a system identifier. In the level 1 algorithm, N is a 6 octet ID for OSI end systems, a 7 octet ID for routers, or an 8 octet IP Internal Reachability Information entry. For a router which is not a pseudonode, it is the 6 octet system ID, with a 0 appended octet. For a pseudonode it is a true 7 octet quantity, comprised of the 6 octet Designated Intermediate System ID and the extra octet assigned by the Destinated Router. The IP Internal Reachability Information entries consist of a 4 octet IP address plus a 4 octet subnet mask.

In the level 2 algorithm, N is either a 7 octet router or pseudonode ID (as in the level 1 algorithm); a variable length OSI address prefix; an 8 octet IP Internal Reachability Information Entry, or an 8 octet IP External Reachability Information entry. The variable length OSI address prefixes, and 8 octet IP Reachability Information entries will always be a leaf, i.e., "End System" in PATHS. As above, the IP Reachability Information entries consist of an [IP address, subnet mask] combination.

$d(N)$ is N's distance from S (i.e., the total metric value from N to S).

$\{Adj(N)\}$ is a set of valid adjacencies that S may use for forwarding to N.

When a system is placed on PATHS, the path(s) designated by its position in the graph is guaranteed to be a shortest path.

TENT—This is a list of triples of the form $<N,d(N),\{Adj(N)\}>$, where N, $d(N)$, and $\{Adj(N)\}$ are as defined above for PATHS.

TENT can intuitively be thought of as a tentative placement of a system in PATHS. In other words, the triple $<N,x,\{A\}>$ in TENT means that if N were placed in PATHS, $d(N)$ would be x, but N cannot be placed on PATHS until is is guaranteed that no path shorter than x exists.

Similarly, the triple $<N,x,\{A,B\}>$ in TENT means that if N were placed in PATHS, then $d(N)$ would be x via either adjacency A or B.

Note: It is suggested that the implementation maintain the database TENT as a set of list of triples of the form $<*,Dist,*>$, sorted by distance Dist. In addition, it is necessary to be able to process those systems which are pseudonodes before any non-pseudonodes at the same distance Dist.

The 8 octet system identifiers which specify IP reachability entries must always be distinguishable from other system identifiers. As specified above, two IP reachability entries which differ only in the subnet mask are still considered to be separate, and will therefore have distinct system identifiers N. The SPF algorithm will therefore calculate routes to each such entry, and the correct entry will be selected in the forwarding process.

A.1.2 Use of Metrics in the SPF Algorithm

Internal metrics are not comparable to external metrics. For external routes (routes to destinations outside of the routing domain), the cost d(N) of the path from N to S may include both internal and external metrics. d(N) may therefore be maintained as a two-dimensional vector quantity (specifying internal and external metric values).

d(N) is initialized to [internal metric=0, external metric=0].

In incrementing d (N) by 1, if the internal metric value is less than the maximum value MaxPathMetric, then the internal metric value is incremented by one and the external metric value left unchanged; if the internal metric value is equal to the maximum value MaxPathMetric, then the internal metric value is set to 0 and the external metric value is incremented by 1. Note that this can be implemented in a straightforward manner by maintaining the external metric as the high order bits of the distance.

In the code of the algorithm below, the current path length is held in the variable "tentlength". This variable is a two-dimensional quantity tentlength=[internal metric, external metric], and is used for comparing the current path length with d(N) as described above. Tentlength is incremented in the same manner as d(N).

A.1.3 Overview of the Algorithm

The basic algorithm, which builds PATHS from scratch, starts out by putting the system doing the computation on PATHS (no shorter path to SELF can possibly exist). TENT is then pre-loaded from the local adjacency database.

Note that a system is not placed on PATHS unless no shorter path to that system exists. When a system N is placed on PATHS, the path to each neighbor M of N, through N, is examined, as the path to N plus the link from N to M. If <M,*,*> is in PATHS, this new path will be longer, and thus ignored.

If <M,*,*> is in TENT, and the new path is shorter, the old entry is removed from TENT and the new path is placed in TENT. If the new path is the same length as the one in TENT, then the set of potential adjacencies {Adj(M)} is set to the union of the old set (in TENT) and the new set {Adj(N)}. If M is not in TENT, then the path is added to TENT.

Next the algorithm finds the triple <N,x,{Adj(N)}> in TENT, with minimal x. Note: This is done efficiently because of the optimization described above. When the list of triples for distance Dist is exhausted, the algorithm then increments Dist until it finds a list with a triple of the form <*,Dist,*>.

N is placed in PATHS. We know that no path to N can be shorter than x at this point because all paths through systems already in PATHS have already been considered, and paths through systems in TENT still have to be greater than x because x is minimal in TENT.

When TENT is empty, PATHS is complete.

Note that external metrics can only occur in "IP External Reachability Information" entries, which correspond to a leaf (i.e., End System in PATHS). Any route utilizing an entry with an external metric will always be considered to be less desireable than any entry which uses an internal metric. This implies that in the addition of systems to PATHS, all systems reachable via internal routes are always added before any system reachable via external routes.

A.1.4 The Algorithm

The Decision Process Algorithm must be run once for each supported routing metric (i.e., for each supported Type of Service). A level 1 router runs the algorithm using the level 1 LSP database to compute level 1 paths (for those level 1 routers which are not level 2 routers, this includes the path to the nearest attached level 2 router). Level 2 routers also separately run the algorithm using the level 2 LSP database to compute level 2 paths. IP-capable level 2 routers must keep level 2 internal IP routes separate from level 2 external IP routes.

Note that this implies that routers which are both level 1 and level 2 routers, and which support all four routing metrics, must run the SPF algorithm 8 times (assuming partition repair is not implemented).

If this system is a Level 2 Router which supports the partition repair optional function the Decision Process algorithm for computing Level 1 paths must be run twice for the default metric. This first execution is done to determine which of the area's manualAreaAddresses are reachable in this partition, and to elect a Partition Designated Level 2 Router for the partition. The partition Designated Level 2 Router will determine if the area is partitioned and will create virtual Level 1 links to the other Partition Designated Level 2 Routers in the area in order to repair the Level 1 partition. This is further described in section 7.2.10 of 10589.

The SPF algorithm specified here will calculate routes for both OSI and IP. In particular, routes are calculated to all system identifiers N, where N may specify an OSI End System, the OSI address of a router, or an IP reachability entry (including the "IP interface address" advertised by IP-capable routers in their LSPs). In computing the forwarding database, it is an implementation specific issue whether the IP forwarding database is kept separately from the OSI forwarding database. Where appropriate, this annex will refer separately to entries in these two forwarding databases. This is not meant to preclude any specific implementation method.

OSI and IP use separate mechanisms to determine whether a packet is in the area (in particular, OSI makes use of area addresses, and IP determines that a destination is not in an area by looking in the level 1 forwarding database and determining that no entry exists for that destination within the area). The route to the nearest level 2 router will result in separate entries in the forwarding database for OSI and IP. For IP, the route to the nearest attached level 2 router may be entered in the forwarding database as a default route (i.e., a route with a subnet mask of all 0).

One approach would be to put the results of each Dijkstra algorithm in a separate forwarding database. For a router which supports both level 1 and level 2 routing (including level 2 internal and level 2 external routes), and which supports all four types of service, this would result in twelve separate forwarding databases for IP. Implementations may choose to minimize the number of forwarding databases by combining the information from the multiple Dijkstra calculations into a single database per supported TOS. This is discussed in section A.2 below.

The SPF algorithm specified in section C.2.3 of 10589 is amended to appear as follows:

Step 0: Initialize TENT and PATHS to empty. Initialize tentlength to [internalmetric=0, externalmetric=0] (tentlength is the pathlength of elements in TENT that we are examining).

1) Add $<$SELF, 0, W$>$ to PATHS, where W is a special value indicating traffic to SELF is passed up to internal processes (rather than forwarded).

2) Now pre-load TENT with the local adjacency database (Each entry made to TENT must be marked as being either an End System or a router to enable the check at the end of Step 2 to be made correctly—Note that each local IP reachability entry is included as an adjacency, and is marked as being an End System). For each adjacency Adj(N) (including level 1 OSI Manual Adjacencies, or level 2 OSI enabled reachable addresses, and IP reachability entries) on enabled circuits, to system N of SELF in state "Up" compute:

d(N)=cost of the parent circuit of the adjacency (N), obtained from $\text{metric}_k$, where k=one of {default metric, delay metric, monetary metric, error metric}

Adj (N) = the adjacency number of the adjacency to N

3) If a triple $<$N, x, {Adj (M)}$>$ is in TENT, then: If x=d(N), then {Adj(M)}←{Adj(M)} {Adj(N)}.

4) If N is a router or an OSI End System entry, and there are now more adjacencies in {Adj(M)} than maximumPathSplits, then remove excess adjacencies as described in Clause 7.2.7 of 10589. If N is an IP Reachability Entry, then excess adjacencies may be removed as desired. This will not effect the correctness of routing, but may eliminate the determinism for IP routes (i.e., IP packets still follow optimal routes within an area, but where multiple equally good routes exist, will not necessarily follow precisely the route that any one particular router would have anticipated).

5) If x$<$d(N), do nothing.

6) If x$>$d(N), remove $<$N,x,{Adj (M)}$>$ from TENT and add the triple $<$N,d(N),Adj(N)$>$.

7) If no triple $<$N,x,{Adj(M)}$>$ is in TENT, then add $<$N,d(N),Adj(N)$>$ to TENT.

8) Now add systems to which the local router does not have adjacencies, but which are mentioned in neighboring pseudonode LSPs. The adjacency for such systems is set to that of the designated router. Note that this does not include IP reachability entries from neighboring pseudonode LSPs. In particular, the pseudonode LSPs do not include IP reachability entries.

9) For all broadcast circuits in state "On", find the pseudonode LSP for that circuit (specifically, the LSP with number zero and with the first 7 octets of LSPID equal to $L_n$CircuitID for that circuit, where n is 1 (for level 1 routing) or 2 (level 2 routing)). If it is present, for all the neighbors N reported in all the LSPs of this pseudonode which do not exist in TENT add an entry $<$N,d(N),Adj(N)$>$ to TENT, where: d(N)=$\text{metric}_k$ of the circuit. Adj(N)=the adjacency number of the adjacency to the DR.

20) Go to Step 2.

Step 1: Examine the zeroeth link state PDU of P, the system just placed on PATHS (i.e., the LSP with the same first 7 octets of LSPID as P, and LSP number zero). If this LSP is present, and the "Infinite Hippity Cost" bit is clear, then for each LSP of P (i.e., all LSPs with the same first 7 octets of LSPID and P, irrespective of the value of LSP number) compute: dist (P,N)=d(P)+$\text{metric}_k$ (P,N) For each neighbor N (both End System and router) of the system P. If the "Infinite Hippity Cost" bit is set, only consider the End System neighbors of the system P. Note that the End Systems neighbors of the system P includes IP reachable address entries included in the LSPs from system P. Here, d(P) is the second element of the triple $<$P,d(P),{Adj(P)}$>$, and $\text{metric}_k$ (P, N) is the cost of the link from P to N as reported in P's link state PDU.

2) If dist(P,N)$>$MaxPathMetric, then do nothing.

3) If $<$N,d(N),{Adj(N)}$>$ is in PATHS, then do nothing. Note: d (N) must be less than dist (P, N), or else N would not have been put into PATHS. An additional sanity check may be done here to ensure that d(N) is in fact less than dist (P,N)

4. If a triple $<$N,x,Adj(N)}$>$ is in TENT, then:
  a) If x=dist (P,N), then {Adj(N)}←{Adj(N)} {Adj (P)}.
  b) If N is a router or an OSI end system, and there are now more adjacencies in {Adj (N)} than maximumPathSplits, then remove excess adjacencies, as described in clause 7.2.7 of 10589. For IP Reachability Entries, excess adjacencies may be removed as desired. This will not effect the correctness of routing, but may eliminate the determinism for IP routes (i.e., IP packets will still follow optimal routes within an area, but where multiple equally good routes exist, will not necessarily follow precisely the route that any one particular router would have anticipated).
  c) if x$<$dist (P,N), do nothing.
  d) if x$>$dist (P,N), remove $<$N,x,Adj(N)$>$ from TENT, and add $<$N,dist(P,N),{Adj(P)}$>$ 5) if no triple $<$N,x,{Adj(N)}$>$ is in TENT, then add $<$N,dist(P,N),{Adj(P)}$>$ to TENT.

Step 2: If TENT is empty, stop. Else find the element $<$P,x,{Adj(P)}$>$, with minimal x as follows:

1) If an element $<$*, tentlength, *$>$ remains in TENT in the list for tentlength, choose that element. If there are more than one elements in the list for tentlength, choose one of the elements (if any) for a system which is a pseudonode in preference to one for a non-pseudonode. If there are no more elements in the list for tentlength, increment tentlength and repeat Step 2.

2) Remove $<$P, tentlength, {Adj (P)}$>$ from TENT.

3) Add $<$P,d(P),{Adj(P)}$>$ to PATHS.

4) If this is the Level 2 Decision Process running, and the system just added to PATHS listed itself as Partition Designated Level 2 Intermediate system, then additionally add $<$AREA.P,d(P),{Adj(P)}$>$ to PATHS, where AREA.P is the Network Entity Title of the other end of the Virtual Link, obtained by taking the first AREA listed in P's LSP and appending P's ID.

5) If the system just added to PATHS was an end system, go to step 2. Else go to Step 1.

NOTE—In the level 2 context, the "End Systems" are the set of Reachable Address Prefixes (for OSI), the set of Area Addresses with zero cost (again, for OSI), plus the set of IP reachability entries (including both internal and external).

A.2 Forwarding of IP packets

The SPF algorithm specified in section A.1 may be used to calculate (logically) separate IP forwarding tables for each type of service, and for level 1, level 2 internal, and level 2 external routes. Section A.2.1 describes how to forward IP packets, based on these multiple forwarding databases. Section A.2.2 describes how the multiple forwarding databases can be combined into a single forwarding database per supported TOS.

A.2.1 Basic Method for Forwarding IP packets

For level 1-only routers:

Determine if the IP destination address matches any entry in the level 1 forwarding table for the specified TOS.

Determine if the IP destination address matches any entry in the level 1 forwarding table for the default TOS.

If default TOS resulted in more specific entry, forward according to default TOS.

If equally specific entries found, forward according to specified TOS

If no entry was found (which includes no default route entry), then destination is unreachable. Note: For level 1 only routers, the route to the nearest attached level 2 router will be entered into the forwarding database as a default route (i.e., a route with a subnet mask which is all 0). Thus this last event (no entry found) can occur only if there is no attached level 2 router reachable in the area.

For routers which are both level 1 and level 2 routers:

Determine if the IP destination address matches any entry in the level 1 forwarding table for the specified TOS.

Determine if the IP destination address matches any entry in the level 1 forwarding table for the default TOS.

If default TOS resulted in more specific entry (i.e., more bits in the subnet mask take the value 1), forward according to default TOS.

If equally specific entries found, forward according to specified TOS

If no entry found:

Determine if the IP destination address matches any entry in the level 2 internal forwarding table for the specified TOS.

Determine if the IP destination address matches any entry in the level 2 internal forwarding table for the default TOS.

If default TOS resulted in more specific entry, forward according to default TOS.

If equally specific entries found, forward according to specified TOS

If no entry found:

Determine if the IP destination address matches any entry in the level 2 external forwarding table for the specified TOS.

Determine if the IP destination address matches any entry in the level 2 external forwarding table for the default TOS.

If default TOS resulted in more specific entry, forward according to default TOS.

If equally specific entries found, forward according to specified TOS

If no entry is found, then destination is unreachable

For level 2-only routers, the above algorithm can be used, except since there is no level 1 forwarding database, the corresponding steps can be skipped.

As discussed earlier, for level 2 routers which are announcing manually configured summary addresses in their level 2 LSPs, in some cases there will exist IP addresses which match the manually configured addresses, but which do not match any addresses which are reachable via level 1 routing in the area. Packets to such addresses are handled according to the rules specified above. This may be accomplished by adding the manually configured [IP address, subnet mask] entry to the level 2 forwarding database (for the appropriate TOS), with a special "next hop" address which specifies that packets for which this entry is selected are to be discarded. This will work correctly because more desireable entries (such as delivering the packet via level 1 routing to the correct destination, or a more specific level 2 route) will automatically take precedence according to the forwarding rules specified above. Less desireable routes (such as using a level 2 external route to the "default route" entry) are not possible because other level 2 routers will believe the summary addresses advertised by this router.

A.2.2 Reduction of IP Forwarding Databases

The multiple forwarding databases used in the basic forwarding method in section A.2.1 can be reduced, by combining the multiple databases into one database for each supported TOS.

For reduction of IP forwarding databases, it is assumed that for any two overlapping address entries, either the entries are identical, or one range contains the other. In other words, for any two [IP address, subnet mask] entries A and B, if there is at least one IP address which matches both entries, then either: (i) the two entries are identical; or (ii) entry A contains entry B (i.e., any IP address which matches entry B also matches entry A); or (iii) entry B contains entry A (any IP address which matches entry A also matches entry B).

Non-contiguous subnet masks can be configured to violate this assumption. For example, consider the two entries:

A = [address = "01010101-00000101-00000000-00000000", mask = "11111111-00001111-00000000-00000000]

B = [address = "01010101-01010000-00000000-00000000", mask = "11111111-11110000-00000000-00000000"]

In this case neither entry contains the other. Specifically;

there are IP addresses which match both A and B (e.g., "01010101-01010101-xxxxxxxx-xxxxxxxx"), there are IP addresses which match A but not B (e.g., "01010101-11110101-xxxxxxxx-xxxxxxxx")

there are IP addresses which match B but not A (e.g., "01010101-01011111-xxxxxxxx-xxxxxxxx").

The reduction of the multiple forwarding databases for each TOS to a single database for each TOS is based on the use of "best match" routing, combined with reduction of the entries placed in the forwarding database in order to eliminate entries which are not to be selected (based on the order of preference of routes specified above). The specific algorithm for creation of the IP forwarding database can be described as follows:

1) Make use of the the Dijkstra algorithm described in section A.1 to create separate forwarding databases for each supported TOS for level 1 routes, level 2 internal routes, and level 2 external routes. (Note that each entry in the forwarding database will specify an [IP address, subnet mask] combination, as well as the next hop router for IP packets which match that entry).

2) For each level 1 route entry which has been placed in the level 1 IP forwarding database for a specific TOS, copy that entry into the overall IP forwarding database for that TOS.

3) For each route entry X which has been placed in the level 2 internal IP forwarding database for a specific TOS, search for overlapping entries in the level 1 IP forwarding database for the specific TOS, and also for the default TOS:
- a) If there is any overlapping entry Y in the level 1 forwarding database (for the specfic TOS, or for the default TOS) such that either (i) Y contains X; or (ii) Y is identically specific to X; then ignore entry X.
- b) Otherwise, copy entry X into the overall IP forwarding database for the specific TOS.

4) For each route entry X which has been placed in the level 2 external IP forwarding database for a specific TOS, search for overlapping entries in the level 1 IP forwarding database for the specific TOS, and for the default TOS, and the level 2 internal IP forwarding database for the specific TOS, and for the default TOS.
- a) If there is an overlapping entry Y such that either (i) Y contains X; or (ii) Y is identically specific to X; then ignore entry X.
- b) Otherwise, copy entry X into the overall IP forwarding database for the specific TOS.

This method will result in one forwarding database for each supported TOS. The forwarding of packets can then be simplified to be as follows:
1) For IP packets which map to the default TOS metric (or to an unsupported TOS metric), search the default TOS forwarding database and select the entry which has the most specific match. Forward the packet accordingly.
2) aFor packets which map to a specific (non-default) TOS metric, search the specific TOS forwarding database and select the entry j which has the most specific match. Also search the default TOS forwarding database and select the entry k which has the most specific match. Forward the packet as follows:
- a) If k is more specific than j, forward using entry k
- b) If j and k are equally specific, forward using entry j
- c) If j is more specific than k, forward using entry j

I claim:

1. A method of enabling user data packets to be forwarded from one local area network to another by a device which is capable of acting as a router to recognize and forward to and from end systems user data packets which conform to a first protocol suite and is capable of acting as a bridge to recognize and forward between networks user data packets which conform to at least a second protocol suite, said method comprising
for a user data packet which conforms to said first protocol suite and is addressed to a single address which is not an address of the device, causing the device to act as a bridge rather than as a router.

2. The method of claim 1 wherein said first protocol suite comprises a TCP/IP protocol suite.

3. The method of claim 2 further comprises causing said device to act as an IP router when forwarding IP packets.

4. The method of claim 1 wherein said second protocol suite comprises an OSI protocol suite.

5. A device which is capable of acting as a router to forward to and from end systems user data packets and is capable of acting as a bridge to forward between networks user data packets, said device comprising
router circuitry causing said device to act as a router recognizing and forwarding user data packets conforming to a first protocol suite,
bridge circuitry causing said device to act as a bridge recognizing and forwarding user data packets conforming to at least a second protocol suite,
control circuitry causing said device to act as a bridge rather than as a router for a user data packet which conforms to said first protocol suite and is addressed to a single address which is not an address of the device.

6. The device of claim 5 wherein said first protocol suite comprises a TCP/IP protocol suite.

7. The device of claim 6 wherein said router circuitry causes said device to act as an IP router when forwarding IP packets.

8. The device of claim 5 wherein said second protocol suite comprises an OSI protocol suite.

* * * * *

UNITED STATES PATENT AND TRADEMARK OFFICE
CERTIFICATE OF CORRECTION

PATENT NO. : 5,430,727
DATED : July 4, 1995
INVENTOR(S) : Callon, et. al.

It is certified that error appears in the above-indentified patent and that said Letters Patent is hereby corrected as shown below:

Title page, item [75], inventors: should read-- Ross W. Callon; Radia J. Perlman; Eric C. Rosen and John Harper--.

Signed and Sealed this

Twenty-first Day of November, 1995

Attest:

BRUCE LEHMAN

Attesting Officer

Commissioner of Patents and Trademarks